United States Patent
Levien et al.

(10) Patent No.: US 9,451,200 B2
(45) Date of Patent: Sep. 20, 2016

(54) STORAGE ACCESS TECHNIQUE FOR CAPTURED DATA

(75) Inventors: Royce A. Levien, Lexington, MA (US); Robert W. Lord, Seattle, WA (US); Mark A. Malamud, Seattle, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 999 days.

(21) Appl. No.: 11/594,695

(22) Filed: Nov. 7, 2006

(65) Prior Publication Data

US 2007/0120981 A1 May 31, 2007

Related U.S. Application Data

(63) Continuation-in-part of application No. 11/143,970, filed on Jun. 2, 2005, and a continuation-in-part of application No. 11/190,516, filed on Jul. 26, 2005, and a continuation-in-part of application No. 11/263,587, (Continued)

(51) Int. Cl.
*H04N 5/765* (2006.01)
*H04N 5/77* (2006.01)
(Continued)

(52) U.S. Cl.
CPC .......... *H04N 5/772* (2013.01); *H04N 1/00132* (2013.01); *H04N 1/00137* (2013.01); *H04N 1/00153* (2013.01); *H04N 1/00156* (2013.01); *H04N 5/765* (2013.01); *H04N 5/781* (2013.01); *H04N 5/85* (2013.01); *H04N 5/907* (2013.01); *H04N 9/7921* (2013.01); *H04N 9/8205* (2013.01); *H04N 2201/0084* (2013.01)

(58) Field of Classification Search
CPC .............. H04N 1/00132; H04N 1/00137; H04N 1/00169; H04N 1/00209; H04N 1/00244
USPC .............. 713/153, 163, 183, 193, 340, 164; 714/38, 49, 48, 35, 37; 726/22, 14, 13, 726/11, 34, 25, 26, 27; 380/42, 55, 58, 46; 382/225, 581
See application file for complete search history.

(56) References Cited

U.S. PATENT DOCUMENTS 4,124,871 A 11/1978 Morrin, II
4,249,218 A 2/1981 Davis et al.
(Continued)

FOREIGN PATENT DOCUMENTS

EP 0940711 B1 11/2003
JP 5064225 3/1993
(Continued)

OTHER PUBLICATIONS

2tiff.com; "Introduction of 2TIFF"; pp. 1-3; located at http://www.2tiff.com/help/; bearing a date of 2004; printed on Feb. 16, 2005.
(Continued)

*Primary Examiner* — Jeffrey Pwu
*Assistant Examiner* — Nega Woldemariam

(57) ABSTRACT

A technique processes captured data on a device, wherein selected captured data of a given quality resolution is transferred via a communication link to a separate storage location for future availability. A storage protocol may include different storage organization categories. A possible aspect includes an identifier record to enable future accessibility to selected captured data by one or more authorized parties or approved devices.

55 Claims, 45 Drawing Sheets

Related U.S. Application Data filed on Oct. 31, 2005, and a continuation-in-part of application No. 11/264,701, filed on Nov. 1, 2005, and a continuation-in-part of application No. 11/376,627, filed on Mar. 15, 2006, now abandoned, and a continuation-in-part of application No. 11/397,357, filed on Apr. 3, 2006.

(51) Int. Cl.
| | |
|---|---|
| *H04N 1/00* | (2006.01) |
| *H04N 5/781* | (2006.01) |
| *H04N 5/85* | (2006.01) |
| *H04N 5/907* | (2006.01) |
| *H04N 9/79* | (2006.01) |
| *H04N 9/82* | (2006.01) |

(56) References Cited

U.S. PATENT DOCUMENTS

| | | |
|---|---|---|
| 4,763,146 A | 8/1988 | Niikura |
| 4,788,565 A | 11/1988 | Masuda et al. |
| 4,829,384 A | 5/1989 | Iida et al. |
| 4,862,280 A | 8/1989 | Iida et al. |
| 5,001,504 A | 3/1991 | Okada |
| 5,034,759 A | 7/1991 | Watson |
| 5,150,215 A | 9/1992 | Shi |
| 5,164,831 A | 11/1992 | Kuchta et al. |
| 5,341,192 A | 8/1994 | Wally, Jr. et al. |
| 5,388,197 A | 2/1995 | Rayner |
| 5,410,343 A | 4/1995 | Coddington et al. |
| 5,444,476 A | 8/1995 | Conway |
| 5,467,288 A | 11/1995 | Fasciano et al. |
| 5,485,553 A | 1/1996 | Kovalick et al. |
| 5,485,554 A | 1/1996 | Lowitz et al. |
| 5,493,353 A | 2/1996 | Chen |
| 5,546,145 A | 8/1996 | Bernardi et al. |
| 5,561,883 A | 10/1996 | Landry et al. |
| 5,588,029 A | 12/1996 | Maturi et al. |
| 5,612,715 A | 3/1997 | Karaki et al. |
| 5,629,778 A | 5/1997 | Reuman |
| 5,633,678 A | 5/1997 | Parulski et al. |
| 5,655,144 A | 8/1997 | Milne et al. |
| 5,659,662 A | 8/1997 | Wilcox et al. |
| 5,675,789 A | 10/1997 | Ishii et al. |
| 5,689,343 A | 11/1997 | Loce et al. |
| 5,689,442 A | 11/1997 | Swanson et al. |
| 5,701,163 A | 12/1997 | Richards et al. |
| 5,715,487 A | 2/1998 | McIntyre et al. |
| 5,738,522 A | 4/1998 | Sussholz et al. |
| 5,751,338 A | 5/1998 | Ludwig, Jr. |
| 5,764,800 A | 6/1998 | Yamagata |
| 5,793,630 A | 8/1998 | Theimer et al. |
| 5,796,879 A | 8/1998 | Wong et al. |
| 5,809,161 A | 9/1998 | Auty et al. |
| 5,825,506 A | 10/1998 | Bednar et al. |
| 5,852,753 A | 12/1998 | Lo et al. |
| 5,867,614 A | 2/1999 | Ito |
| 5,889,895 A | 3/1999 | Wong et al. |
| 5,892,509 A | 4/1999 | Jakobs et al. |
| 5,915,135 A | 6/1999 | Fiorentini |
| 5,917,958 A | 6/1999 | Nunally et al. |
| 5,917,962 A | 6/1999 | Chen et al. |
| 5,926,605 A | 7/1999 | Ichimura |
| 5,949,484 A | 9/1999 | Nakaya et al. |
| 5,956,081 A | 9/1999 | Katz et al. |
| 5,959,622 A | 9/1999 | Greer et al. |
| 5,977,867 A | 11/1999 | Blouin |
| 5,991,799 A | 11/1999 | Yen et al. |
| 5,995,095 A | 11/1999 | Ratakonda |
| 6,011,901 A | 1/2000 | Kirsten |
| 6,021,403 A | 2/2000 | Horvitz et al. |
| 6,028,585 A | 2/2000 | Ishii et al. |
| 6,034,786 A | 3/2000 | Kwon |
| 6,046,762 A | 4/2000 | Sonesh et al. |
| 6,107,918 A | 8/2000 | Klein et al. |
| 6,115,341 A | 9/2000 | Hirai |
| 6,122,003 A | 9/2000 | Anderson |
| 6,122,411 A | 9/2000 | Shen et al. |
| 6,134,345 A | 10/2000 | Berman et al. |
| 6,154,771 A | 11/2000 | Rangan et al. |
| 6,157,406 A | 12/2000 | Iura et al. |
| 6,157,935 A | 12/2000 | Tran et al. |
| 6,167,350 A | 12/2000 | Hiramatsu et al. |
| 6,167,469 A | 12/2000 | Safai et al. |
| 6,188,383 B1 | 2/2001 | Tamura |
| 6,198,526 B1 | 3/2001 | Ohtsuka |
| 6,222,465 B1 | 4/2001 | Kumar et al. |
| 6,229,565 B1 | 5/2001 | Bobry |
| 6,229,850 B1 | 5/2001 | Linzer et al. |
| 6,275,260 B1 | 8/2001 | Anderson |
| 6,282,377 B1 | 8/2001 | Lawther et al. |
| 6,285,794 B1 | 9/2001 | Georgiev et al. |
| 6,332,666 B1 | 12/2001 | Ikeda |
| 6,333,792 B1 | 12/2001 | Kimura |
| 6,351,762 B1 | 2/2002 | Ludwig et al. |
| 6,359,649 B1 | 3/2002 | Suzuki |
| 6,366,577 B1 | 4/2002 | Donovan |
| 6,380,972 B1 | 4/2002 | Suga et al. |
| 6,384,862 B1 | 5/2002 | Brusewitz et al. |
| 6,400,848 B1 | 6/2002 | Gallagher |
| 6,434,398 B1 | 8/2002 | Inselberg |
| 6,437,797 B1 | 8/2002 | Ota |
| 6,445,822 B1 | 9/2002 | Crill et al. |
| 6,446,095 B1 | 9/2002 | Mukai |
| 6,452,974 B1 | 9/2002 | Menon et al. |
| 6,453,336 B1 | 9/2002 | Beyda et al. |
| 6,456,339 B1 | 9/2002 | Surati et al. |
| 6,476,858 B1 | 11/2002 | Ramirez Diaz et al. |
| 6,493,028 B1 | 12/2002 | Anderson et al. |
| 6,499,016 B1 | 12/2002 | Anderson |
| 6,509,931 B1 | 1/2003 | Mizosoe et al. |
| 6,512,541 B2 | 1/2003 | Dunton et al. |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,535,228 B1 | 3/2003 | Bandaru et al. |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,577,311 B1 | 6/2003 | Crosby et al. |
| 6,577,336 B2 | 6/2003 | Safai |
| 6,587,602 B2 | 7/2003 | Wakisawa et al. |
| 6,611,293 B2 | 8/2003 | Tarnoff et al. |
| 6,629,104 B1 | 9/2003 | Parulski et al. |
| 6,633,309 B2 | 10/2003 | Lau et al. |
| 6,646,676 B1 | 11/2003 | DaGraca et al. |
| 6,650,366 B2 | 11/2003 | Parulski et al. |
| 6,650,704 B1 | 11/2003 | Carlson et al. |
| 6,654,543 B2 | 11/2003 | Ando et al. |
| 6,657,667 B1 | 12/2003 | Anderson |
| 6,678,413 B1 | 1/2004 | Liang et al. |
| 6,680,748 B1 | 1/2004 | Monti |
| 6,687,877 B1 | 2/2004 | Sastry et al. |
| 6,698,021 B1 | 2/2004 | Amini et al. |
| 6,701,845 B2 | 3/2004 | Ohmura |
| 6,710,809 B1 | 3/2004 | Niikawa |
| 6,714,192 B1 | 3/2004 | Torres |
| 6,734,911 B1 | 5/2004 | Lyons |
| 6,735,253 B1 | 5/2004 | Chang et al. |
| 6,738,155 B1 | 5/2004 | Rosenlund et al. |
| 6,741,864 B2 | 5/2004 | Wilcock et al. |
| 6,750,902 B1 | 6/2004 | Steinberg et al. |
| 6,757,008 B1 | 6/2004 | Smith |
| 6,757,431 B2 | 6/2004 | Loce et al. |
| 6,757,480 B1 | 6/2004 | Moon et al. |
| 6,757,684 B2 | 6/2004 | Svendsen et al. |
| 6,762,791 B1 | 7/2004 | Schuetzle |
| 6,766,036 B1 | 7/2004 | Pryor |
| 6,775,406 B1 | 8/2004 | Watson |
| 6,801,717 B1 | 10/2004 | Hofer |
| 6,801,719 B1 | 10/2004 | Szajewski et al. |

(56) References Cited

U.S. PATENT DOCUMENTS

| | | |
|---|---|---|
| 6,813,312 B2 | 11/2004 | Tullberg et al. |
| 6,816,071 B2 | 11/2004 | Conti |
| 6,816,468 B1 | 11/2004 | Cruickshank |
| 6,822,660 B2 | 11/2004 | Kim |
| 6,823,092 B1 | 11/2004 | Sato |
| 6,832,009 B1 | 12/2004 | Shezaf et al. |
| 6,871,010 B1 | 3/2005 | Taguchi et al. |
| 6,879,731 B2 | 4/2005 | Kang et al. |
| 6,885,395 B1 | 4/2005 | Rabbani et al. |
| 6,898,173 B2 | 5/2005 | McPherson et al. |
| 6,903,763 B1 | 6/2005 | Noguchi et al. |
| 6,928,230 B2 | 8/2005 | Squibbs |
| 6,930,707 B2 | 8/2005 | Bates et al. |
| 6,940,545 B1 | 9/2005 | Ray et al. |
| 6,947,075 B1 | 9/2005 | Niikawa |
| 6,954,224 B1 | 10/2005 | Okada et al. |
| 6,961,083 B2 | 11/2005 | Obrador et al. |
| 6,961,087 B1 | 11/2005 | Yoshida |
| 6,967,780 B2 | 11/2005 | Hillis et al. |
| 6,978,047 B2 | 12/2005 | Montgomery |
| 6,987,528 B1 | 1/2006 | Nagahisa et al. |
| 6,999,626 B2 | 2/2006 | Andrew |
| 7,015,949 B1 | 3/2006 | Sah |
| 7,015,954 B1 | 3/2006 | Foote et al. |
| 7,023,469 B1 | 4/2006 | Olson |
| 7,031,700 B1 | 4/2006 | Weaver et al. |
| 7,046,273 B2 | 5/2006 | Suzuki |
| 7,046,292 B2 | 5/2006 | Ziemkowski |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,025 B1 | 9/2006 | Loui et al. |
| 7,110,027 B2 | 9/2006 | Wyman |
| 7,163,151 B2 | 1/2007 | Kiiskinen |
| 7,196,317 B1 | 3/2007 | Meissner, II et al. |
| 7,203,648 B1 | 4/2007 | Ostermann et al. |
| 7,218,792 B2 | 5/2007 | Raskar et al. |
| 7,219,365 B2 | 5/2007 | Sato et al. |
| 7,221,863 B2 | 5/2007 | Kondo et al. |
| 7,227,569 B2 | 6/2007 | Maruya |
| 7,236,690 B2 | 6/2007 | Matsukawa |
| 7,257,317 B2 | 8/2007 | Ohnishi |
| 7,287,088 B1 | 10/2007 | Anderson |
| 7,292,229 B2 | 11/2007 | Morag et al. |
| 7,327,385 B2 | 2/2008 | Yamaguchi |
| 7,327,387 B2 | 2/2008 | Tanaka et al. |
| 7,333,134 B2 | 2/2008 | Miyamoto |
| 7,339,623 B2 | 3/2008 | Kawai |
| 7,340,766 B2 | 3/2008 | Nagao et al. |
| 7,362,968 B2 | 4/2008 | Kim |
| 7,366,979 B2 | 4/2008 | Spielberg et al. |
| 7,379,116 B2 | 5/2008 | Okamura |
| 7,383,508 B2 | 6/2008 | Toyama et al. |
| 7,411,623 B2 | 8/2008 | Shibutani |
| 7,417,667 B2 | 8/2008 | Shibutani |
| 7,444,593 B1 | 10/2008 | Reid |
| 7,448,063 B2 | 11/2008 | Freeman et al. |
| 7,460,495 B2 | 12/2008 | Li |
| 7,460,781 B2 | 12/2008 | Kanai et al. |
| 7,504,942 B2 | 3/2009 | Marman |
| 7,525,568 B2 | 4/2009 | Raghunath |
| 7,529,411 B2 | 5/2009 | Haupt et al. |
| 7,535,491 B1 | 5/2009 | Kumagai et al. |
| 7,551,787 B2 | 6/2009 | Marks |
| 7,576,770 B2 | 8/2009 | Metzger et al. |
| 7,587,674 B2 | 9/2009 | Broeksteeg |
| 7,612,804 B1 | 11/2009 | Marcu et al. |
| 7,612,806 B2 | 11/2009 | Kazami et al. |
| 7,626,614 B1 | 12/2009 | Marcu |
| 7,626,733 B2 | 12/2009 | Kodama et al. |
| 7,647,614 B2 | 1/2010 | Krikorian et al. |
| 7,650,058 B1 | 1/2010 | Garoutte |
| 7,733,371 B1 | 6/2010 | Monroe |
| 7,751,628 B1 | 7/2010 | Reisman |
| 7,782,365 B2 | 8/2010 | Levien et al. |
| 7,860,319 B2 | 12/2010 | Obrador et al. |
| 7,872,675 B2 | 1/2011 | Levien et al. |
| 7,904,814 B2 | 3/2011 | Errico et al. |
| 7,924,324 B2 | 4/2011 | Fujita |
| 7,945,935 B2 | 5/2011 | Stonedahl |
| 8,026,944 B1 | 9/2011 | Sah |
| 8,098,287 B2 | 1/2012 | Misawa et al. |
| 8,350,946 B2 | 1/2013 | Jung et al. |
| 8,528,019 B1 | 9/2013 | Dimitrova et al. |
| 8,593,555 B1 | 11/2013 | Chun et al. |
| 2001/0015756 A1 | 8/2001 | Wilcock et al. |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0031005 A1 | 10/2001 | Nister et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2001/0050875 A1 | 12/2001 | Kahn et al. |
| 2002/0012071 A1 | 1/2002 | Sun |
| 2002/0015094 A1 | 2/2002 | Kuwano et al. |
| 2002/0028026 A1 | 3/2002 | Chen et al. |
| 2002/0028060 A1 | 3/2002 | Murata et al. |
| 2002/0030749 A1 | 3/2002 | Nakamura et al. |
| 2002/0054232 A1 | 5/2002 | Inagaki |
| 2002/0069036 A1 | 6/2002 | Mizokawa |
| 2002/0090217 A1 | 7/2002 | Limor et al. |
| 2002/0145622 A1 | 10/2002 | Kauffman et al. |
| 2002/0149677 A1 | 10/2002 | Wright |
| 2002/0171737 A1 | 11/2002 | Tullis |
| 2002/0171747 A1 | 11/2002 | Niikawa et al. |
| 2002/0176016 A1 | 11/2002 | Misawa et al. |
| 2002/0176508 A1 | 11/2002 | Boyce et al. |
| 2002/0186668 A1 | 12/2002 | Thomason |
| 2002/0191952 A1 | 12/2002 | Fiore et al. |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0021591 A1 | 1/2003 | Grosvenor et al. |
| 2003/0026596 A1 | 2/2003 | Betti et al. |
| 2003/0037111 A1 | 2/2003 | Yoshioka |
| 2003/0058265 A1 | 3/2003 | Robinson et al. |
| 2003/0063114 A1* | 4/2003 | Nishida ............... 345/700 |
| 2003/0063211 A1 | 4/2003 | Watanabe et al. |
| 2003/0069898 A1 | 4/2003 | Christodoulou et al. |
| 2003/0070174 A1 | 4/2003 | Solomon |
| 2003/0072491 A1 | 4/2003 | Sirivara et al. |
| 2003/0080878 A1 | 5/2003 | Kirmuss |
| 2003/0081140 A1 | 5/2003 | Furukawa |
| 2003/0090690 A1 | 5/2003 | Katayama et al. |
| 2003/0093790 A1 | 5/2003 | Logan et al. |
| 2003/0095191 A1 | 5/2003 | Saito |
| 2003/0103144 A1 | 6/2003 | Sesek et al. |
| 2003/0103670 A1 | 6/2003 | Schoelkopf et al. |
| 2003/0112261 A1 | 6/2003 | Zhang |
| 2003/0112354 A1 | 6/2003 | Ortiz et al. |
| 2003/0113014 A1 | 6/2003 | Katoh |
| 2003/0117505 A1 | 6/2003 | Sasaki et al. |
| 2003/0117642 A1 | 6/2003 | Haraguchi |
| 2003/0131002 A1* | 7/2003 | Gennetten et al. ............ 707/10 |
| 2003/0151679 A1 | 8/2003 | Amerson et al. |
| 2003/0152263 A1 | 8/2003 | Kawano et al. |
| 2003/0160870 A1 | 8/2003 | Ziemkowski |
| 2003/0162556 A1 | 8/2003 | Libes |
| 2003/0185302 A1 | 10/2003 | Abrams, Jr. |
| 2003/0189654 A1 | 10/2003 | Kage et al. |
| 2003/0197794 A1 | 10/2003 | Sakata |
| 2003/0206232 A1 | 11/2003 | Suzuki et al. |
| 2003/0222998 A1 | 12/2003 | Yamauchi et al. |
| 2003/0226023 A1 | 12/2003 | Peters |
| 2003/0227560 A1 | 12/2003 | Mattsson et al. |
| 2003/0229894 A1 | 12/2003 | Okada et al. |
| 2003/0234953 A1 | 12/2003 | Dawson et al. |
| 2003/0236674 A1 | 12/2003 | Henry, Jr. |
| 2003/0236831 A1 | 12/2003 | Ortiz et al. |

(56) References Cited

U.S. PATENT DOCUMENTS

| | | |
|---|---|---|
| 2003/0236832 A1 | 12/2003 | McIntyre et al. |
| 2004/0001145 A1 | 1/2004 | Abbate |
| 2004/0001161 A1 | 1/2004 | Herley |
| 2004/0017333 A1 | 1/2004 | Cooper et al. |
| 2004/0032517 A1 | 2/2004 | Walmsley et al. |
| 2004/0037540 A1 | 2/2004 | Frohlich et al. |
| 2004/0042679 A1 | 3/2004 | Yamada |
| 2004/0046885 A1 | 3/2004 | Regan et al. |
| 2004/0056960 A1 | 3/2004 | Hayashi |
| 2004/0066968 A1 | 4/2004 | Glickman |
| 2004/0070586 A1 | 4/2004 | Taubin |
| 2004/0070678 A1 | 4/2004 | Toyama et al. |
| 2004/0071445 A1 | 4/2004 | Tarnoff et al. |
| 2004/0075750 A1 | 4/2004 | Bateman |
| 2004/0080537 A1 | 4/2004 | Adler |
| 2004/0085456 A1 | 5/2004 | Kwag et al. |
| 2004/0095474 A1 | 5/2004 | Matsufune |
| 2004/0108995 A1 | 6/2004 | Hoshino et al. |
| 2004/0119733 A1 | 6/2004 | Morimoto et al. |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0145657 A1 | 7/2004 | Yamamoto et al. |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0166930 A1 | 8/2004 | Beaulieu et al. |
| 2004/0172440 A1 | 9/2004 | Nakajima et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0179545 A1 | 9/2004 | Erola et al. |
| 2004/0183903 A1 | 9/2004 | Pedersen |
| 2004/0183915 A1 | 9/2004 | Gotohda et al. |
| 2004/0187583 A1 | 9/2004 | Ogawa |
| 2004/0189856 A1 | 9/2004 | Tanaka |
| 2004/0196399 A1 | 10/2004 | Stavely |
| 2004/0201683 A1 | 10/2004 | Murashita et al. |
| 2004/0201690 A1 | 10/2004 | Bryant et al. |
| 2004/0201709 A1 | 10/2004 | McIntyre et al. |
| 2004/0201748 A1 | 10/2004 | Goldstein et al. |
| 2004/0216173 A1 | 10/2004 | Horoszowski et al. |
| 2004/0218894 A1 | 11/2004 | Harville et al. |
| 2004/0221063 A1 | 11/2004 | Mogul |
| 2004/0233308 A1 | 11/2004 | Elliott et al. |
| 2004/0233621 A1 | 11/2004 | Maeoka et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0252230 A1 | 12/2004 | Winder |
| 2004/0257462 A1 | 12/2004 | Goris et al. |
| 2004/0263609 A1 | 12/2004 | Otsuki et al. |
| 2004/0263658 A1 | 12/2004 | Cozier et al. |
| 2005/0005308 A1 | 1/2005 | Logan et al. |
| 2005/0007471 A1 | 1/2005 | Walmsley et al. |
| 2005/0010531 A1 | 1/2005 | Kushalnagar et al. |
| 2005/0013602 A1 | 1/2005 | Ogawa |
| 2005/0017947 A1 | 1/2005 | Shahoian et al. |
| 2005/0018053 A1 | 1/2005 | Suga et al. |
| 2005/0028221 A1 | 2/2005 | Liu et al. |
| 2005/0033991 A1 | 2/2005 | Crane |
| 2005/0036033 A1 | 2/2005 | Imai |
| 2005/0046707 A1 | 3/2005 | Takane |
| 2005/0047676 A1 | 3/2005 | Kang et al. |
| 2005/0050043 A1 | 3/2005 | Pyhalammi et al. |
| 2005/0057687 A1 | 3/2005 | Irani et al. |
| 2005/0058321 A1 | 3/2005 | Buehler |
| 2005/0084037 A1 | 4/2005 | Liang |
| 2005/0086391 A1 | 4/2005 | Chu et al. |
| 2005/0088417 A1 | 4/2005 | Mulligan |
| 2005/0093980 A1 | 5/2005 | Nonaka et al. |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0113136 A1 | 5/2005 | Gosieski, Jr. |
| 2005/0125843 A1 | 6/2005 | Okezie et al. |
| 2005/0130717 A1 | 6/2005 | Gosieski, Jr. et al. |
| 2005/0131905 A1* | 6/2005 | Margolus et al. ............. 707/10 |
| 2005/0140803 A1 | 6/2005 | Ohtsuka et al. |
| 2005/0150362 A1 | 7/2005 | Uehara |
| 2005/0158015 A1 | 7/2005 | Nakayama et al. |
| 2005/0162533 A1 | 7/2005 | Noguchi et al. |
| 2005/0162965 A1 | 7/2005 | Fukuda et al. |
| 2005/0169367 A1 | 8/2005 | Venetianer et al. |
| 2005/0185062 A1 | 8/2005 | Hillis et al. |
| 2005/0187901 A1 | 8/2005 | Maritzen et al. |
| 2005/0193421 A1 | 9/2005 | Cragun |
| 2005/0195285 A1 | 9/2005 | Ide |
| 2005/0203930 A1* | 9/2005 | Bukowski et al. ........... 707/100 |
| 2005/0207487 A1 | 9/2005 | Monroe |
| 2005/0210267 A1 | 9/2005 | Sugano et al. |
| 2005/0210516 A1 | 9/2005 | Pettinato |
| 2005/0212912 A1 | 9/2005 | Huster |
| 2005/0212950 A1 | 9/2005 | Kanai |
| 2005/0231625 A1 | 10/2005 | Parulski et al. |
| 2005/0237388 A1 | 10/2005 | Tani |
| 2005/0237422 A1 | 10/2005 | Kido |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayar et al. |
| 2006/0008254 A1 | 1/2006 | Seo |
| 2006/0023066 A1 | 2/2006 | Li et al. |
| 2006/0034533 A1 | 2/2006 | Batchvarov |
| 2006/0044398 A1 | 3/2006 | Foong et al. |
| 2006/0044416 A1 | 3/2006 | Miyazaki et al. |
| 2006/0048057 A1 | 3/2006 | Herberger et al. |
| 2006/0050785 A1 | 3/2006 | Watanabe et al. |
| 2006/0055788 A1 | 3/2006 | Kawabe |
| 2006/0056326 A1 | 3/2006 | Croome |
| 2006/0068824 A1 | 3/2006 | Inselberg |
| 2006/0072028 A1 | 4/2006 | Hong |
| 2006/0072837 A1 | 4/2006 | Ralston et al. |
| 2006/0083298 A1 | 4/2006 | Wang et al. |
| 2006/0083440 A1 | 4/2006 | Chen |
| 2006/0085534 A1 | 4/2006 | Ralston et al. |
| 2006/0087559 A1 | 4/2006 | Huberman et al. |
| 2006/0088276 A1 | 4/2006 | Cho et al. |
| 2006/0092291 A1 | 5/2006 | Bodie |
| 2006/0098112 A1 | 5/2006 | Kelly |
| 2006/0104483 A1 | 5/2006 | Harel et al. |
| 2006/0104600 A1 | 5/2006 | Abrams |
| 2006/0109349 A1 | 5/2006 | Takashima |
| 2006/0119711 A1 | 6/2006 | Ejima et al. |
| 2006/0125922 A1 | 6/2006 | Albert et al. |
| 2006/0136998 A1 | 6/2006 | Oowaki et al. |
| 2006/0143665 A1 | 6/2006 | Meek et al. |
| 2006/0173756 A1 | 8/2006 | Benight |
| 2006/0173972 A1 | 8/2006 | Jung et al. |
| 2006/0174204 A1* | 8/2006 | Jung et al. .................... 715/751 |
| 2006/0174206 A1 | 8/2006 | Jung et al. |
| 2006/0176392 A1 | 8/2006 | Rainier et al. |
| 2006/0177150 A1 | 8/2006 | Uyttendaele et al. |
| 2006/0187860 A1 | 8/2006 | Li |
| 2006/0192887 A1 | 8/2006 | Miyamaki et al. |
| 2006/0195322 A1 | 8/2006 | Broussard et al. |
| 2006/0197839 A1 | 9/2006 | Senior et al. |
| 2006/0203099 A1 | 9/2006 | Omata |
| 2006/0209089 A1 | 9/2006 | Date |
| 2006/0226298 A1 | 10/2006 | Pierson |
| 2006/0230123 A1 | 10/2006 | Simmons et al. |
| 2006/0242164 A1 | 10/2006 | Evans et al. |
| 2006/0268117 A1 | 11/2006 | Loui et al. |
| 2006/0274165 A1 | 12/2006 | Levien et al. |
| 2006/0288273 A1 | 12/2006 | Erol et al. |
| 2006/0288374 A1 | 12/2006 | Ferris et al. |
| 2007/0013776 A1 | 1/2007 | Venetianer et al. |
| 2007/0097214 A1 | 5/2007 | Jung et al. |
| 2007/0100533 A1 | 5/2007 | Jung et al. |
| 2007/0100606 A1 | 5/2007 | Rogers |

(56) References Cited

U.S. PATENT DOCUMENTS

| | | |
|---|---|---|
| 2007/0100621 A1 | 5/2007 | Jung et al. |
| 2007/0100860 A1 | 5/2007 | Jung et al. |
| 2007/0113250 A1 | 5/2007 | Logan et al. |
| 2007/0120980 A1 | 5/2007 | Jung et al. |
| 2007/0217761 A1 | 9/2007 | Chen et al. |
| 2007/0274705 A1 | 11/2007 | Kashiwa et al. |
| 2008/0023232 A1 | 1/2008 | Morag et al. |
| 2008/0037749 A1 | 2/2008 | Metzger et al. |
| 2008/0120325 A1 | 5/2008 | Davis |
| 2008/0162668 A1 | 7/2008 | Miller |
| 2008/0192129 A1 | 8/2008 | Walker et al. |
| 2008/0228296 A1 | 9/2008 | Eilam et al. |
| 2008/0298796 A1 | 12/2008 | Kuberka et al. |
| 2008/0303909 A1 | 12/2008 | Watanabe et al. |
| 2009/0215388 A1 | 8/2009 | Karaoguz et al. |
| 2010/0017289 A1 | 1/2010 | Sah et al. |
| 2011/0270916 A1 | 11/2011 | Shih et al. |
| 2012/0105716 A1 | 5/2012 | Jung et al. |
| 2013/0176341 A1 | 7/2013 | Jung et al. |
| 2014/0146205 A1 | 5/2014 | Xu et al. |

FOREIGN PATENT DOCUMENTS

| | | |
|---|---|---|
| JP | H09-018762 | 1/1997 |
| JP | 10023303 A | 1/1998 |
| JP | 2001086383 | 3/2001 |
| JP | 2001-309236 A | 11/2001 |
| JP | 2002-083280 A | 3/2002 |
| JP | 2002-094862 A | 3/2002 |
| JP | 2003-009044 A | 1/2003 |
| WO | WO 2005/045807 A1 | 5/2005 |
| WO | WO 2005/078597 A1 | 8/2005 |
| WO | WO 2005/112437 A1 | 11/2005 |

OTHER PUBLICATIONS about.com; "Image Size and Resolution"; pp. 1-3; located at http://graphicssoft.about.com/od/resolution/; bearing a date of 2005; printed on Feb. 16, 2005.

adobe.com; "Share images with Photo Mail (Win only)"; pp. 1-4; located at http://www.adobe.com/tips/phsel3photomail/main.html; printed on Jan. 26, 2005.

Bockaert, Vincent; "Interpolation"; pp. 1-4; located at http://www.dpreview.com/learn/?/Glossary/Digital_Imaging/Interpolation_01.htm; bearing a date of 1998-2005; printed on Feb. 16, 2005.

canon.ca; "Print/Share Button"; pp. 1-2; located at http://www.canon.ca/digitalphotography/english/ctech_article.asp?id=174&tid=6; bearing a date of Jan. 26, 2005; printed on Jan. 26, 2005.

cg.its.tudelft.nl; Delft University of Technology; "Shared cameras"; pp. 1; located at http://www.cg.its.tudelft.nl/~spiff/descSC.html; printed on Jan. 27, 2005.

Chainstyle.Com; "Resolution and Image Size"; pp. 1-9; located at http://www.chainstyle.com/photoshop/webhelp/tutorials/basics/resolution_and_image_size.htm; printed on Feb. 16, 2005.

Chastain, Sue; "Q. Is it better to use in-camera digital zoom or crop and resample with software?"; pp. 1-2; located at http://graphicssoft.about.com/cs/digitalimaging/f/digitalzoom.htm; bearing a date of 2005; printed on Feb. 17, 2005.

Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.

co-array.org; "A Brief Overview of Co-Array Fortran"; pp. 1-3; located at http://www.co-array.org/caf_intro.htm; printed on May 3, 2005.

Dave; "How Many Pixels? A reasoned approach to digicam specifications"; pp. 1-5; located at http://www.imaging-resource.com/ARTS/HOWBIG/HOWBIG.HTM; bearing a date of 1999; printed on Feb. 16, 2005.

debian.org; "GNUstep application for digital still cameras"; pp. 1-2; located at http://packages.debian.org/unstable/graphics/camera.app; bearing a date of Jan. 26, 2005; printed on Jan. 27, 2005.

Digital Photography Review; "Kodak EasyShare One"; pp. 1-5; located at http://www.dpreview.com/news/0501/05010605kodakeasyshareone.asp; bearing a date of Jan. 6, 2005; printed on Jan. 26, 2005.

Ekdahl, Lars; "Image Size and resolution"; pp. 1-5; located at http://www.ekdahl.org/kurs/resolution/resolution2_eng.htm; bearing a date of 2002; printed on Feb. 16, 2005.

geocities.com; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.

gizmodo.com; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.

Har-Peled, Sariel; Koltun, Vladlen; Song, Dezhen; Goldberg, Ken; CiteSeer.Ist:; "Efficient Algorithms for Shared Camera Control"; pp. 1-2; located at http://citeseer.ist.psu.edu/har-peled02efficient.html; bearing a date of 2002; printed on Jan. 26, 2005.

Hernandez, J.R.; Perez-Gonzalez, F.; Rodriguez, J.M.; "Coding and Synchronization: A Boost and a Bottleneck for the Development of Image Watermarking"; pp. 1-7; Dept. Tecnologias de las Comunicaciones, ETSI Telecom., Universidad de Vigo, 36200 Vigo, Spain.

Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.

home.iprimus.com.au; "Digital Cameras and Resampling"; pp. 1-2; located at http://home.iprimus.com.au/painless/resample.htm; printed on Feb. 16, 2005.

hp.com; "HP Image Zone Express step-by-step: HP Instant Share"; pp. 1-4; located at http://www.hp.com/united-states/ize/steps_instant_share.html; printed on Jan. 26, 2005.

Hua, Zhigang; Xie, Xing; Lu, Hanqing; Ma, Wei-Ying; Research.Microsoft.com; "COBO: Building Cooperative Environment for Cross-Device Image Sharing"; pp. 1; located at http://research.microsoft.com/research/pubs/view.aspx?type=technical+report&id=823; bearing a date of Nov. 2004; printed on Jan. 25, 2005.

Imaging resource.com; "The Imaging Resource Quick Review"; pp. 1-22; located at http://www.imaging-resource.com/PRODS/I700/I70A.HTM; bearing a date of 2001; printed on Feb. 16, 2005.

intel.com; "Instantly Capture and Share your World with an Intel® PC Camera"; pp. 1-2; located at http://www.intel.com/pccamera/; printed on Jan. 27, 2005.

Jain, Anil K.; "Fundamentals of Digital Image Processing"; 1989; pp. 1-569; Prentice-Hall, Inc.; Englewood Cliffs, NJ U.S.A.

kodak.com; "Frequently Asked Questions"; pp. 1; located at http://www.kodak.com/global/en/service/knowledgebase/digital-camera-faqs.jhtml?pq-path=1396/5759; bearing a date of Jan. 6, 2005; printed on Jan. 26, 2005.

Koren, Norman; "Understanding image sharpness: Digital cameras vs. film, part 2"; pp. 1-16; located at http://www.normankoren.com/Tutorials/MTF7A.html; bearing a date of 2000-2004; printed on Feb. 3, 2005.

LTL Imagery; "About Resolution Understanding Digital Image Resolution"; pp. 1-10; located at http://www.ltlimagery.com/resolution.html; bearing a date of 2000-2004; printed on Feb. 16, 2005.

Mahmoud, Qusay H.; "Getting Started with Data Synchronization Using SyncML"; pp. 1-6; located at http://developers.sun.com/techtopics/mobility/midp/articles/syncml/; bearing dates of Sep. 2004 and 1994-2005; printed on May 3, 2005.

Mobilemag; "Nikon D2H WiFi Digital Camera"; pp. 1-2; located at http://www.mobilemag.com/content/100/336/C2502/; bearing a date of Feb. 20, 2004; printed on Jan. 25, 2005.

CNNMoney; "Playboy coming to iPod"; pp. 1-2; located at http://money.cnn.com/2005/01/05/technology/personaltech/playboy_ipod/index.htm; bearing a date of Jan. 5, 2005; printed on Jan. 26, 2005.

National Instruments Corporation; "Advanced Analog Triggering and Synchronization Techniques"; pp. 1-2; located at http://zone.

(56) References Cited

OTHER PUBLICATIONS ni.com/devzone/conceptd.nsf/webmain/A387B5C0AC6F6F4E86256C87005FCDDF?opendocument&node=dz00000_us; bearing a date of 2005; printed on May 3, 2005.

National Instruments Corporation; "Genlocking Multiple JAI CV-M1 Cameras"; pp. 1-5; located at http://zone.ni.com/devzone/conceptd.nsf/webmain/7a6b5853548850e886256c21005b1413; bearing a date of 2005; printed on May 3, 2005.

National Instruments Corporation; "Multi-Camera Acquisition"; pp. 1-3; located at http://zone.ni.com/devzone/conceptd.nsf/webmain/D91BAC1317 F9D0A686256C9300769A0D; bearing a date of 2005; printed on May 3, 2005.

Rains, Nick; "Vietnam Travel Photography The Digital Way"; pp. 1-7; located at http://www.luminous-landscape.com/locations/vietnam.shtml; bearing a date of 2003;.printed on Feb. 3, 2005.

ritzcamera.com; "Canon—Powershot A85 Digital Camera"; pp. 1-8; located at http://www.ritzcamera.com/webapp/wcs/stores/servlet/ProductDisplay?storeId=10001&catalogId=10001&langId=-1&productId=13176854; printed on Jan. 26, 2005.

roadcasting.org; "A new type of radio"; "Final Design"; "Process"; "Conclusions"; "Recognition"; "How Roadcasting Works"; "Download"; pp. 1-15; located at www.roadcasting.org; printed on Jun. 2, 2005.

Ross, Suzanne; Research.Microsoft.com; "The Life of a Digital Photo"; pp. 1-5; located at http://research.microsoft.com/displayArticle.aspx?id=605; printed on Jan. 25, 2005.

Sciannamea, Michael; "WiFi-Enabled Digital Cameras About to Tap a Growing Marketplace"; pp. 1-5; located at http://wifi.weblogsinc.com/entry/7312187118786387/; bearing a date of Oct. 12, 2004; printed on Jan. 25, 2004.

Sellen, Abigail; Fleck, Rowanne; Kindberg, Tim; Spasojevic, Mirjana; Research.Microsoft.com; "How and Why People Use Camera Phones"; pp. 1-16; located at http://research.microsoft.com/research/pubs/view.aspx?type=technical+report&id=823 bearing a date of Nov. 2004; printed on Jan. 25, 2005.

starbursthomepage.com; "Life is all about Sharing"; p. 1; located at http://www.starbursthomepage.com/flashpointx.htm; printed on Jun. 29, 2005.

starbursthomepage.com; "Sharing-On-The-Go Technology"; pp. 1-3; located at http://www.starbursthomepage.com/fsotg.htm; printed on Jun. 29, 2005.

starbursthomepage.com; "Specifications and Data Transfer Information"; pp. 1-5; located at http://www.starbursthomepage.com/fspec.htm; printed on Jun. 29, 2005.

starbursthomepage.com; "What are FlashPoint ShareDrives"; pp. 1-4; located at http://www.starbursthomepage.com/fproducts.htm; printed on Jun. 29, 2005.

Sutherland, ED; "CSR Intros Low-Cost, Single-Chip WiFi"; pp. 1-3; located at http://www.wi-fiplanet.com/news/article.php/3434131; bearing a date of Nov. 10, 2004; printed on Jan. 25, 2005.

swgc.mun.ca; "About image size and resolution"; pp. 1-7; located at http://www.swgc.mun.ca/vart2600/resolution.html; printed on Feb. 16, 2005.

Colbert, Martin; Voglimacci, Catherine; Finkelstein, Anthony; "Live, Audio-Visual Communication Systems for Distance Learning: Experience, Heuristics and ISDN"; pp. 1-40.

Cummins, Fred; "Synchronization Among Speakers Reduces Macroscopic Temporal Variability"; pp. 1-6.

Dodd, George; "Music Performance Venues-keeping them in tune with modern requirements"; pp. 1-11.

El Saddik, Abdulmotaleb Dr.; "Multimedia Communications: Multimedia Technologies & Applications"; Multimedia Communications Research Laboratory, School of Information Technology and Engineering, University of Ottawa, Ottawa, Ontario, Canada; 22 slides; pp. 1-8.

physorg.com; "World's First Built-In Wi-Fi-Enabled Digital Cameras"; pp. 1-3; located at http://www.physorg.com/news6183.html; bearing a date of Sep. 2, 2005; printed on Sep. 7, 2005.

Seifert, Eric; Eligator, Ron; "Acoustical Design Considerations at Universal Studios CityWalk™, Orlando, Florida"; Acoustics at City Walk; pp. 1-5; located at http://www.acousticdimensions.com/tech_CityWalk.htm; bearing dates of Apr. 23, 1999 and Apr. 24, 1999; printed on Jul. 20, 2005.

"Soundaround: Get cinema quality surround sound through two speakers"; RAM: Soundaround by Xitel; pp. 1-7; located at http://www.ramelectronics.net/html/soundaround.html; printed on Jul. 20, 2005.

"Yamaha Internet 'MidLive vol. 3': An Open Experiment: The First MidLive to Feature Synchronized Streaming of MIDI and Audio Data"; Yamaha News Release: wMid Live vol. 3x; pp. 1-5; located at http://www.yamaha.co.jp/english/news/97121101.html; bearing a date of Dec. 1997 printed on Jul. 19, 2005.

U.S. Appl. No. 12/290,538, Jung et al.
U.S. Appl. No. 12/284,202, Jung et al.
U.S. Appl. No. 12/283,420, Jung et al.

"About Flickr"; bearing a date of 2006; pp. 1-2; located at http://www.flickr.com/about/.

"About the SD Memory Card"; bearing a date of 2004; pp. 1-3; located at http://www.sdcard.org/sd_memorycard/index.html; SD Card Association; printed on Mar. 7, 2006.

"Auto Exposure Bracketing (AEB Mode)"; PowerShot G3 Digital Camera; bearing a date of 2004; pp. 1-4; located at http://web.canon.jp/Imaging/PSG3/PSG3_129-e.html; Canon Inc., printed on Sep. 7, 2006.

Darlin, Damon; "Why Do-It-Yourself Photo Printing Doesn't Add Up"; bearing a date of Oct. 8, 2005; pp. 1-3; located at http://www.nytimes.com/2005/10/08/technology_08photo.ready.html; The New York Times; printed on Aug. 28, 2006.

"Digital Cameras Glossary"; pp. 1-3; located at http://www.crutchfieldadvisor.com/ISEO-rgbtcspd/learningcenter/home/digitalcameras_glossary.html; printed on Mar. 8, 2006.

"Digital Cameras: Hoe to Choose"; pp. 1-3; located at http://www.crutchfieldadvisor.com/ISEO-rgbtcspd/learningcenter/home/digitalcameras.html; printed on Mar. 8, 2006.

"Fujifilm, Summus Collaborate to Provide Wireless Photo Services"; bearing a date of Feb. 18, 2004; pp. 1-2; located at http://phx.corporate-ir.net/phoenix.zhtml?c=131111&p=irol-newsArticle&ID=807972&highlight=; Oasys Mobile, Inc.; printed on Mar. 17, 2006.

"JVC Everio GZMG77 2.0MP CCD 30GB HDD Camcorder with 10x Optical Zoom"; bearing a date of 1996-2006; pp. 1-8; located at http://www.amazon.com/gp/product/B000E1332W/ref=pd_cp_title/103-4351641-1963832; Amazon.com; printed on Apr. 25, 2006.

Kim, Jeong; Zimmerman, John; "Cherish: Smart Digital Photo Frames for Sharing Social Narratives at Home"; bearing a date of Apr. 22-28, 2006; pp. 1-6; located at http://www.cs.cmu.edu/~johnz/pubs/2006_CHI_cherish.pdf#search=%22cherish%3B%20smart%20digital%20photo%20frames%20for%20sharing%20social%20narratives%20at%20home%22.

"Kodak's dual-lens camera"; bearing a date of Jan. 2, 2006; pp. 1; located at http://news.com/2300.com/2300-1041_3-6014914-2.htnl?tag=ne.gall.pg; c/net.news.com; printed on Mar. 7, 2006.

"Kodak Unveils Worlds First Dual-Lens Digital Camera; Combines Ultra-Wide Angle and Zoom Lenses in Compact Body"; bearing a date of Jan. 2, 2006; pp. 1-2; Kodak; located at: http://www.kodak.com/cknee/PageQuerierjhtml?pg-path=2709&pg-locale=en_US&gpcid=0900688a80465805; printed on Mar. 7, 2006.

"Leading Edge Eyecam Extreme High Resolution Wireless Color Video Camera System"; pp. 1-2; located at: http://parts.rctoys.com/rc-toys-hobbies/Items/329769%20-%20(S); Draganfly Parts Warehouse; printed on Mar. 9, 2006.

Lyons, Max; "Max Lyons Digital Image Gallery"; bearing a date of 2000-2005; pp. 1-3; located at http://www.tawbaware.com/maxlyons/; printed on Apr. 18, 2006.

Mills, Elinor; "HD camera, new monitor attract crowds"; bearing a date of 1995-2006; pp. 1; located at http://news.com.com/2102-7353_3-6023300.html?tag=st.util.print; c/net news.com; printed on Mar. 7, 2006.

"Multiple Camera Acquisition"; bearing a date of 2006; pp. 1; located at http://sine.ni.com/apps/we/niepd_web_display.display_epd4?p_guid=B45EACE3E80B56A4E034080020E74861&p_

(56) References Cited

OTHER PUBLICATIONS node=DZ52489&p_source=external; National Instruments Corporation; printed on Aug. 29, 2006.

"New High Capacity SD Memory Card Specification Under Final Review by SD Card Association"; bearing a date of Jan. 4, 2006; pp. 1-2; SD Card Association News Release.

NG et al.; "light Field Photography with a Hand-Held Plenoptic Camera"; bearing date of 2004-2005; pp. 1-3; located at http://graphics.stanford.edu/papers/lfcamera/; printed on Sep. 7, 2006.

Nicholls, Kyle; "Non-photorealistic Camera—Depth Edge Detection and Rendering using Muli-Flash Imaging"; bearing dates of 2000-2006; pp. 1-3; located at http://photo.net/learn/tehnology/mflash/merl-non-photo.html; printed on Apr. 18, 2006.

"Ok*IP Video...Anywhere Solar Powered!*Protecting Critical Government Infrastructure Military and Homeland Surveillance"; pp. 1-8; Located at http://www.oksolar.com/ip_anywhere/; printed on Mar. 9, 2006.

Raymond, Emily; "Kodak Digital Cameras: Kodak EasyShare V570 Digital Camera Review"; pp. 1-2; bearing a date of Jan. 22, 2006; located at http://www.digitalcamerainfo.com/content/Kodak-EasyShare-V570; printed on Apr. 19, 2006.

Reichmann, Mchael; "Understanding Raw Files"; Luminous-landscape.com; pp. 1-9; located at http://www.luminous-landscape.com/tutorials/understanding-series/u-raw-files.shtml; printed on Oct. 25, 2005.

"Sanyo Xacti VPC-HD1 5.1MP MPEG4 High Definition Camcorder x/10x Optical Zoom: Product Description"; bearing dates of 1996-2006; pp. 1-5; located at: http://www.amazon.com/gp/product/product-description/B000E0E6YC/ref=dp_nav_2/002-0210595-1654445?%5Fencoding=UTF8&n=502394&s=photo; Amazon.com; printed on Mar. 7, 2006.

"Secure Digital Card"; Wikipedia, pp. 1-6; located at http://en.wikipedia.org/wiki/Secure_Digital; Wikipedia; printed on Mar. 7, 2006.

Skillings, Jonathan; "Kodak packs two lenses in latest camera"; bearing a date of Feb. 7, 2006; pp. 1; located at http://news.com.com/2102-1041_3-6014939.html?tag=st.util.print; c/net news.com; printed on Mar. 7, 2006.

"Sony DCR-DVD405 3MP DVD Handycam Camcorder with 10x Optical Zoom"; pp. 1-12; Amazon.com; located at: http://www.amazon.com/gp/product/B000E0DU7G/ref=pd_cp_title/103-4351641-196383; printed on Apr. 25, 2006.

"Storage device—A Word Definition From the Webopedia Computer Dictionary"; bearing dates of Oct. 30, 2001 and 2005; pp. 1-4; located at http://www.webopedia.com/TERMS/storage_device.htm; Webopedia.com; printed on Oct. 25, 2005.

"VisualStream: Digital Multimedia USB 1.1 High Resolution PC Camera"; bearing a date of 2002; pp. 1-4; D-Link Systems, Inc.; Irvine, CA.

"What is Flickr?", bearing a date of 2006; pp. 1-6; located at http://www.flickr.com/learn_more.gne; printed on Aug. 28, 2006.

Woodrow, E.; Heinzelman, W.; "SPIN-IT: a data centric routing protocol for image retrieval in wireless networks"; bearing dates of Jun. 24-28, 2002; pp. 1-5; Image Processing 2002, Proceedings. 2002 International Conference; vol. 3; pp. 913-916; located at http://ieeexplore.ieee.org/xpl/absprintf.jsp?arnumber=1039121&pag; printed Mar. 19, 2006.

U.S. Appl. No. 12/806,060, Royce A. Levien et al.

"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.

"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

\* cited by examiner

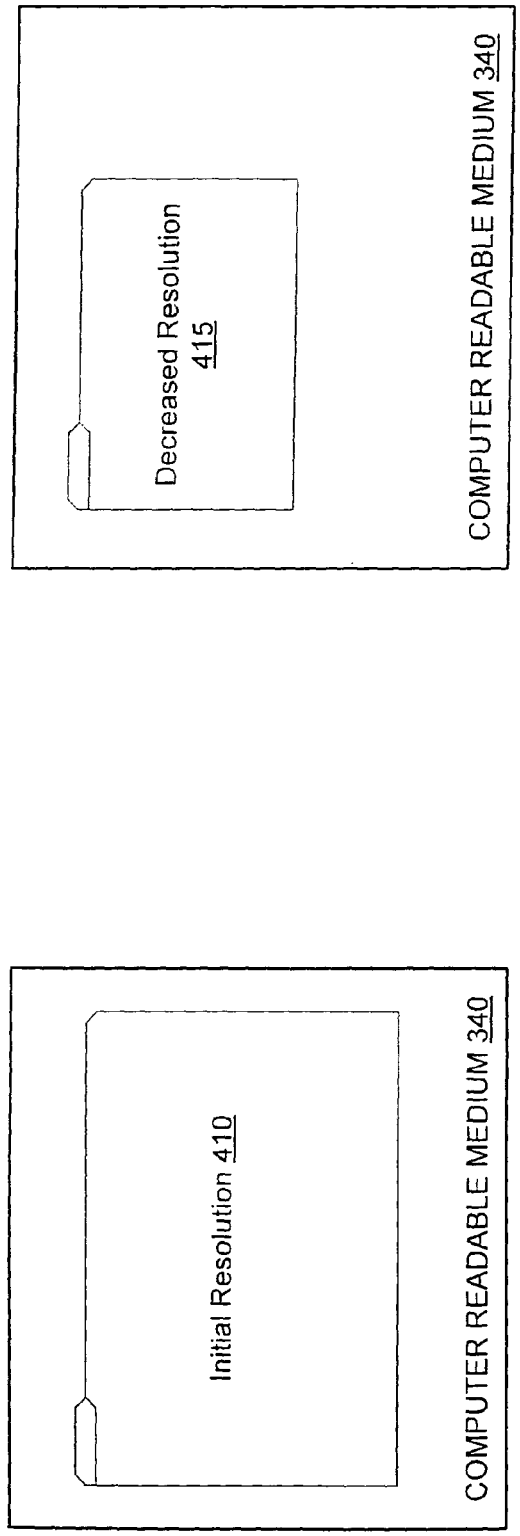
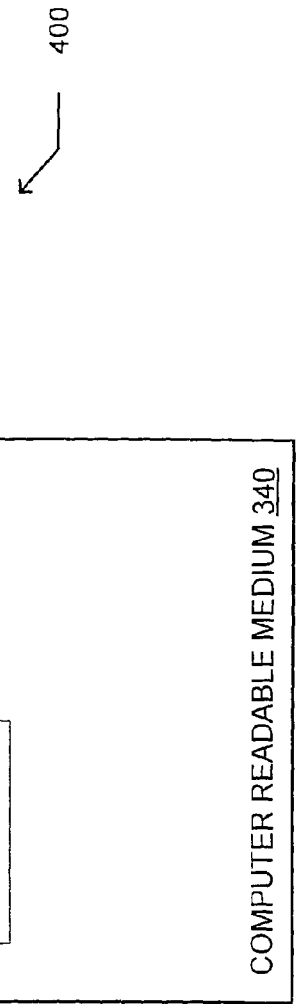
FIG. 4A
FIG. 4B
FIG. 4C

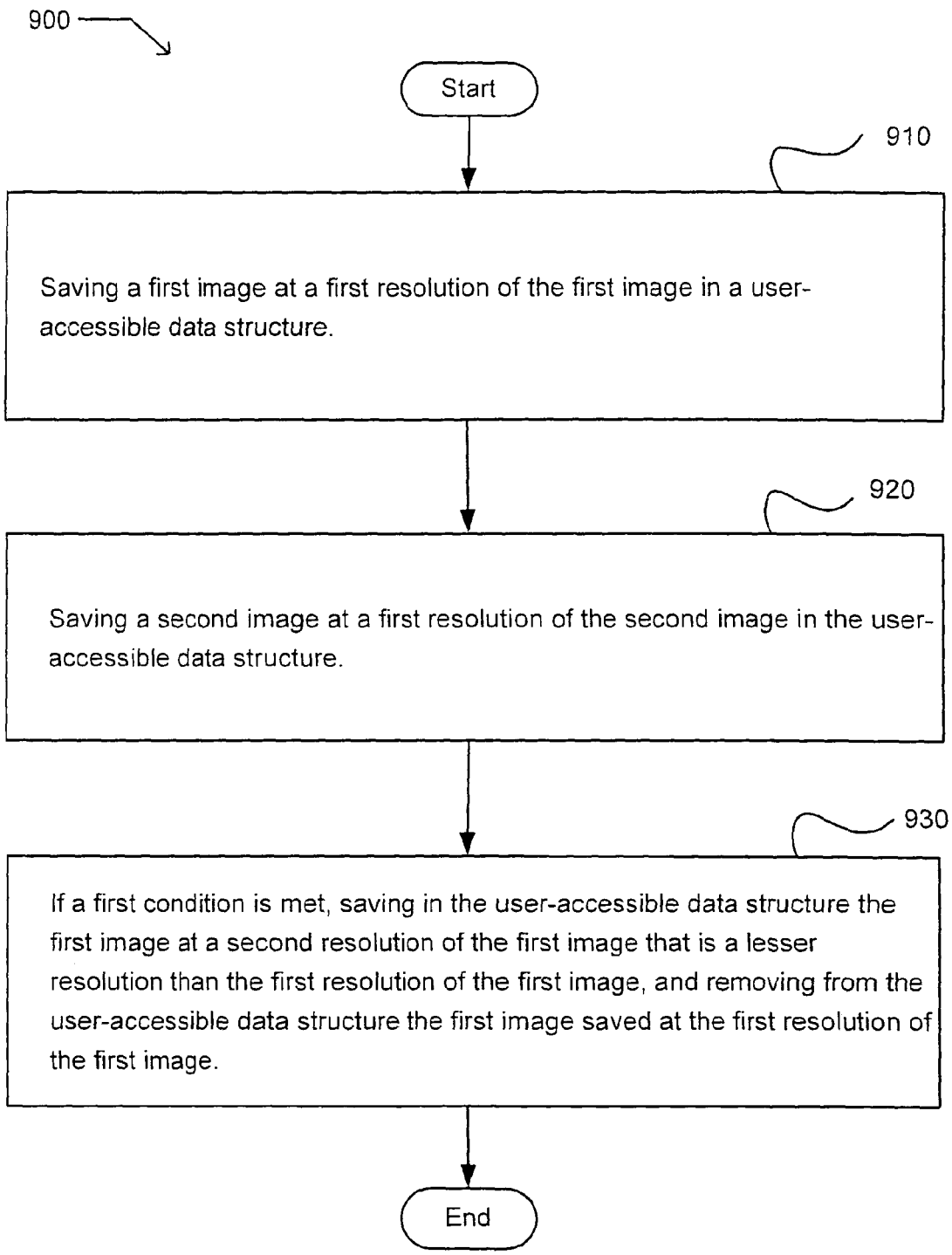

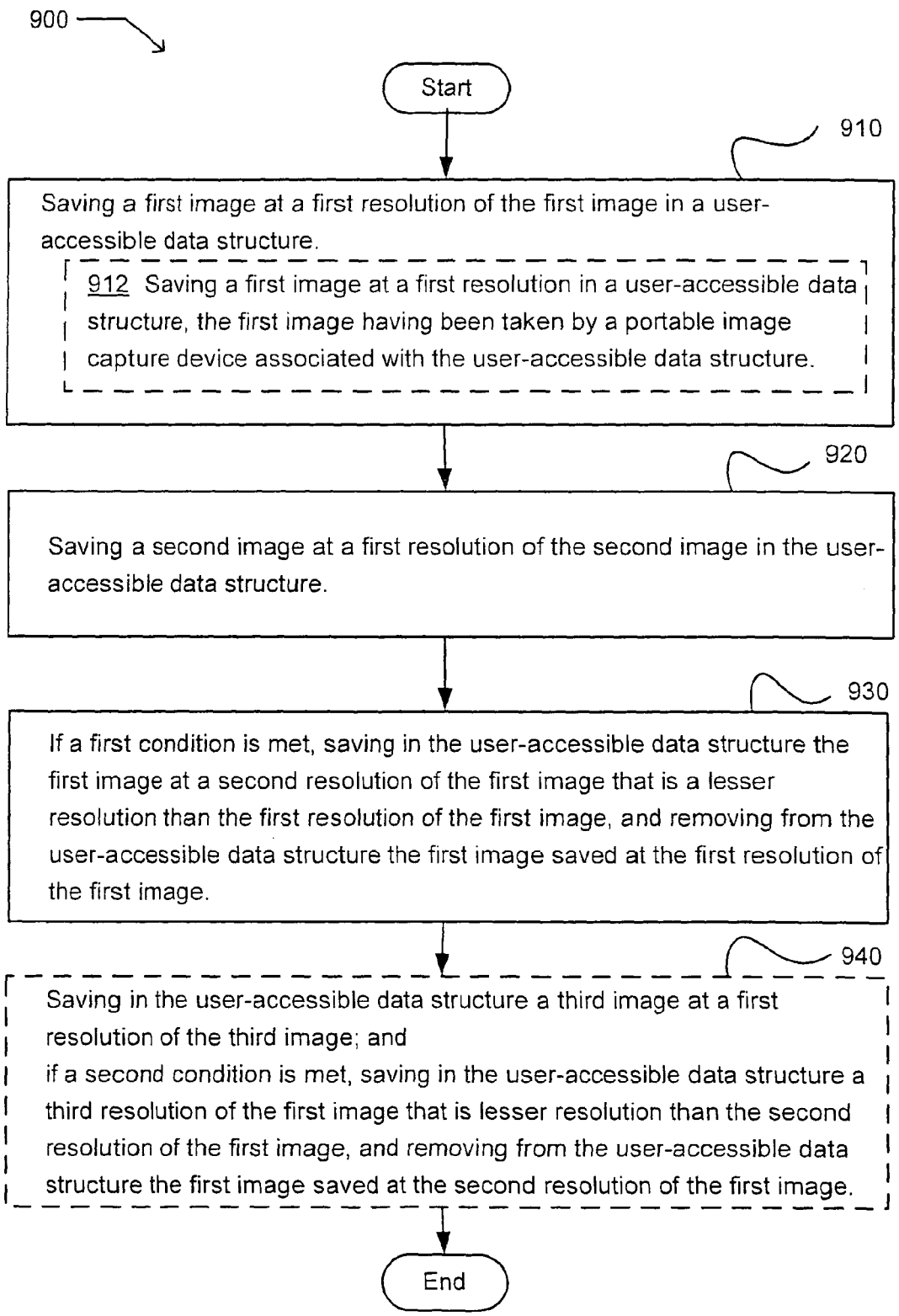

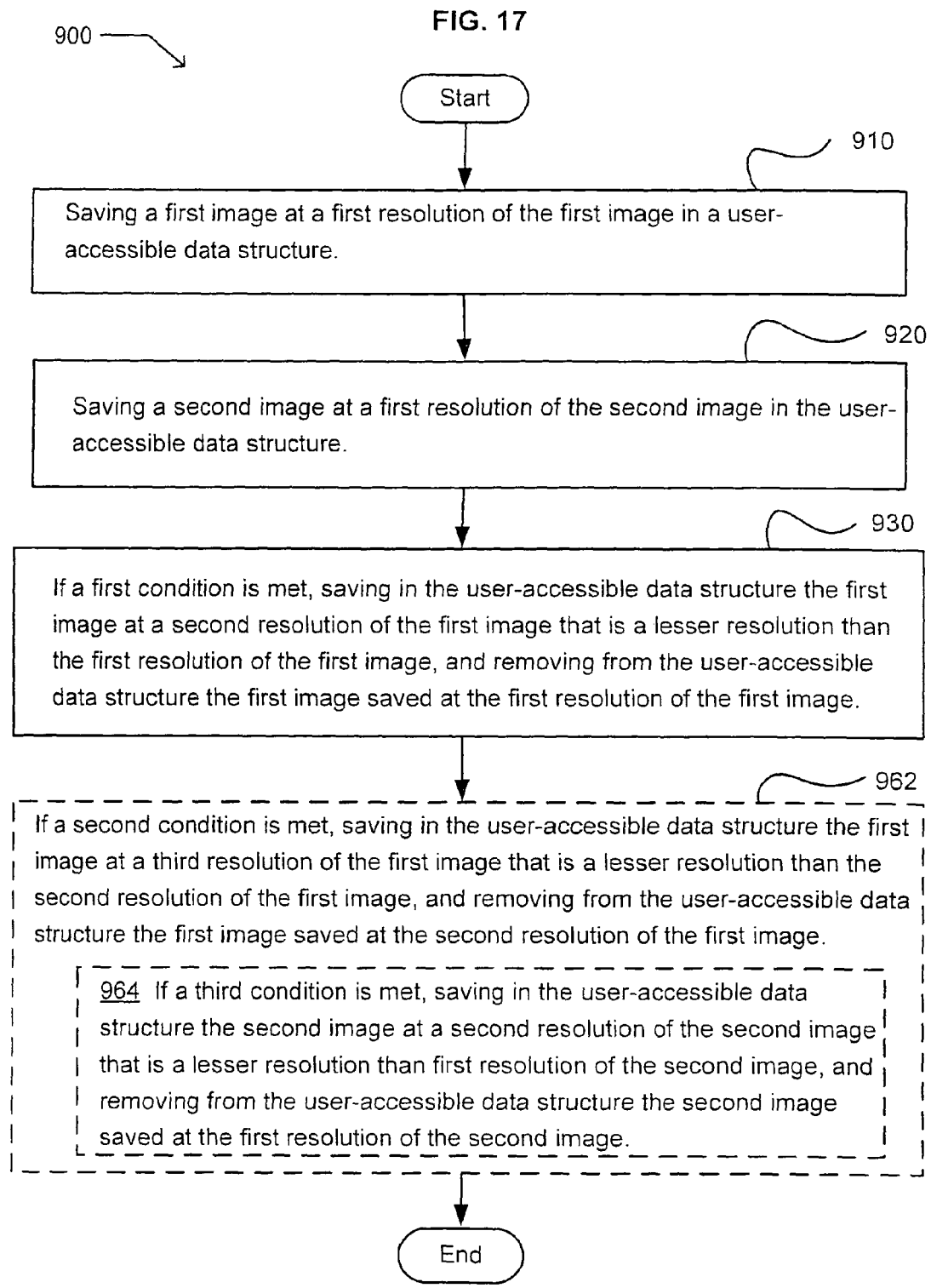

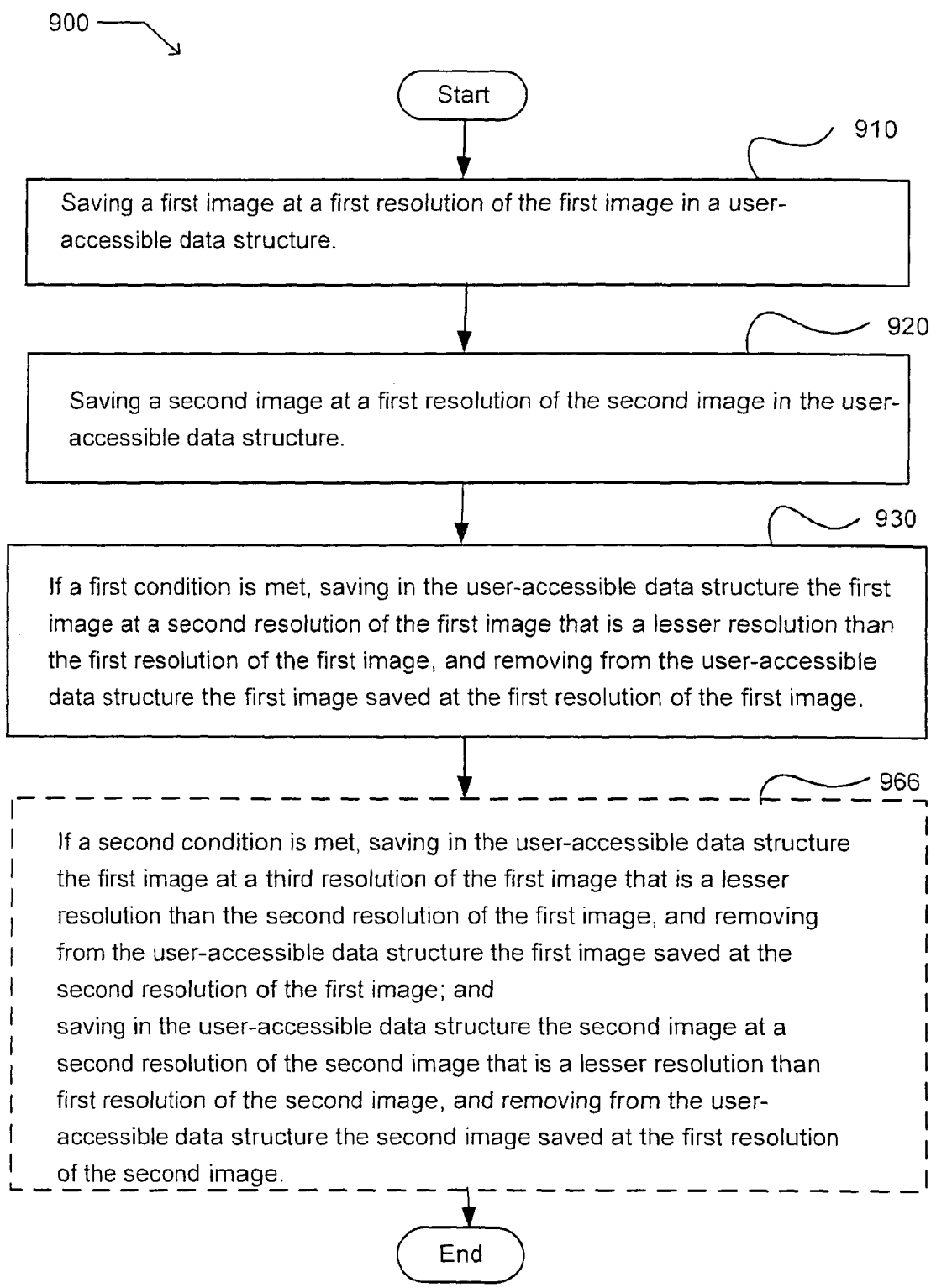

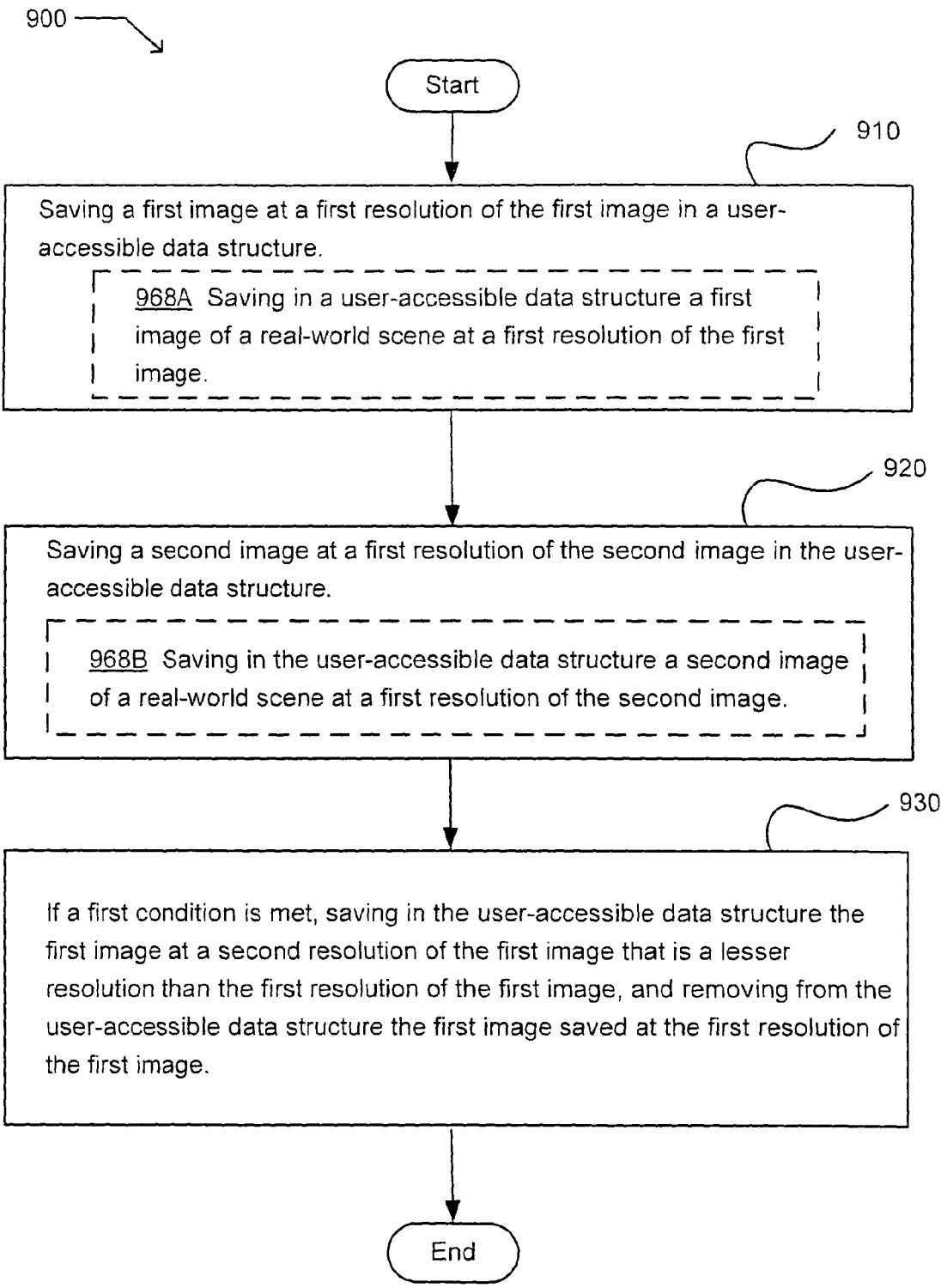

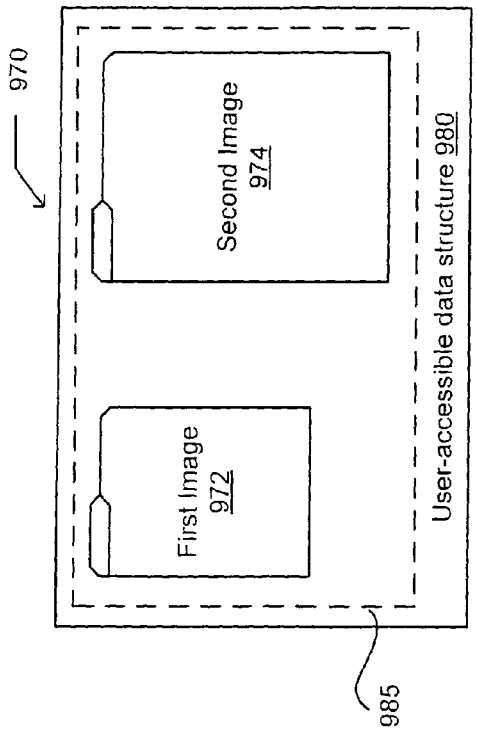
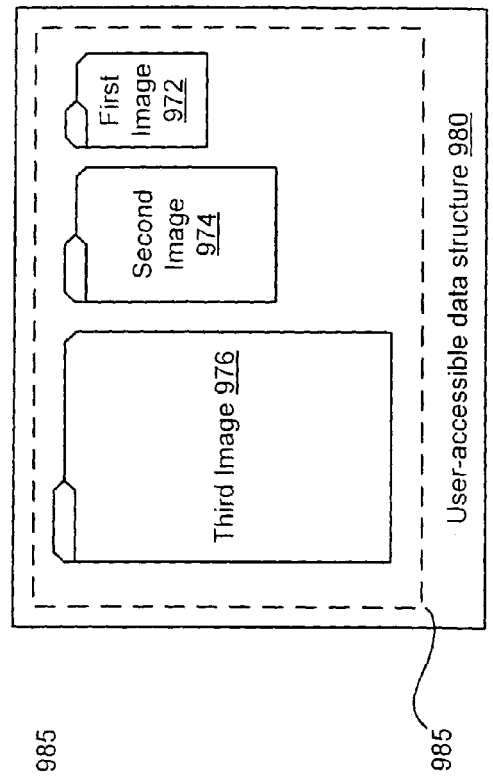
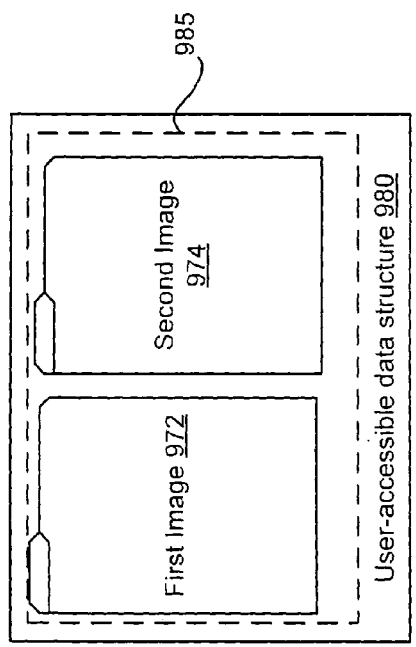
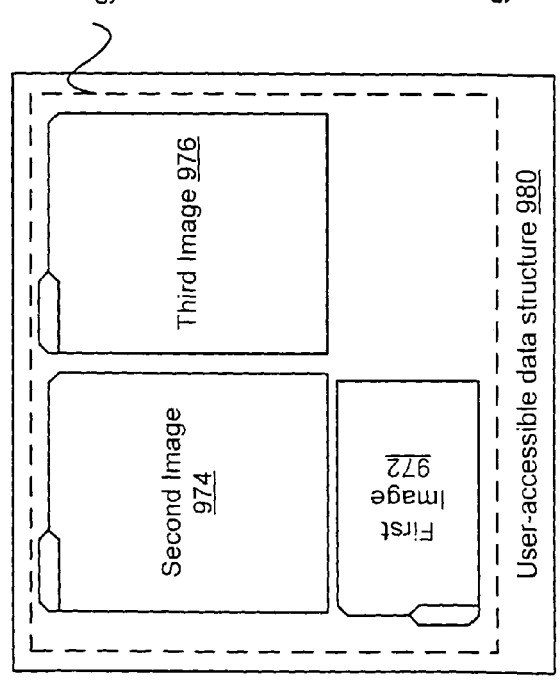
FIG. 20A
FIG. 20B
FIG. 20C
FIG. 20D

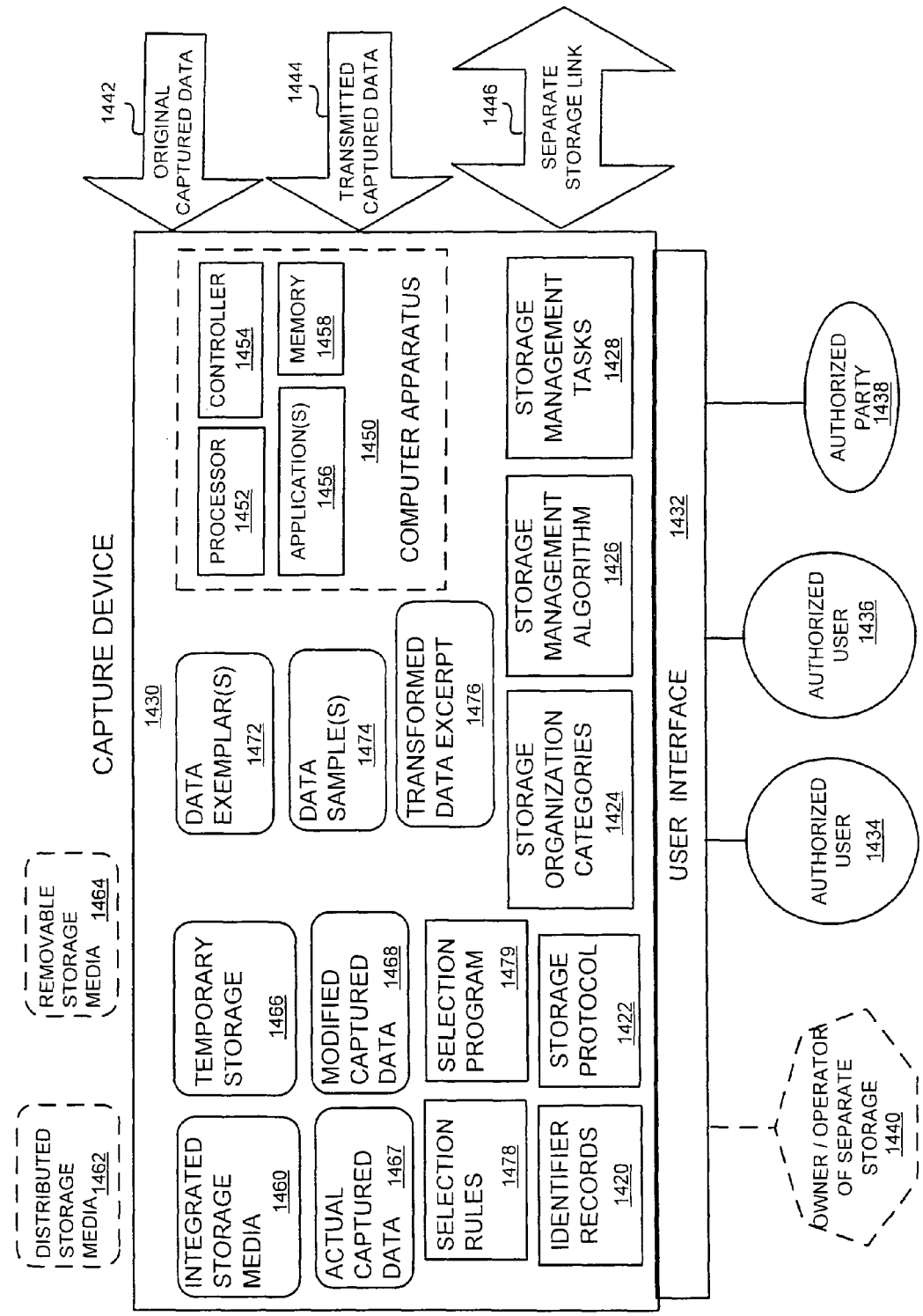

STORAGE ACCESS TECHNIQUE FOR CAPTURED DATA

PRIORITY CLAIM, CROSS-REFERENCE TO RELATED APPLICATION, AND INCORPORATION BY REFERENCE

The present application is related to and claims the benefit of the earliest available effective filing date(s) from the following listed application(s) (the "Related Applications") (e.g., claims earliest available priority dates for other than provisional patent applications or claims benefits under 35 USC §119 (e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation in part of U.S. patent application entitled ESTIMATING SHARED IMAGE DEVICE OPERATIONAL CAPABILITIES OR RESOURCES, naming Edward K. Y. Jung, Royce A. Levien, Robert W. Lord, Mark A. Malamud, and John D. Rinaldo, Jr. as inventors, filed Jun. 2, 2005, Ser. No. 11/143,970, which is currently co-pending, or is an application of which a currently co-pending application listed as a Related Application is entitled to the benefit of the filing date;

For purposes of the USPTO extra-statutory requirements, the present application constitutes a continuation in part of U.S. patent application entitled SHARED IMAGE DEVICE DESIGNATION, naming Edward K. Y. Jung, Royce A. Levien, Robert W. Lord, Mark A. Malamud, and John D. Rinaldo, Jr. as inventors, filed Jul. 26, 2005, Ser. No. 11/190,516, which is currently co-pending, or is an application of which a currently co-pending application listed as a Related Application is entitled to the benefit of the filing date;

For purposes of the USPTO extra-statutory requirements, the present application constitutes a continuation in part of United States patent application entitled SAVED-IMAGE MANAGEMENT, naming Royce A. Levien, Robert W. Lord, and Mark A. Malamud, as inventors, filed Oct. 31, 2005, Ser. No. 11/263,587, which is currently co-pending, or is an application of which a currently co-pending application listed as a Related Application is entitled to the benefit of the filing date.

For purposes of the USPTO extra-statutory requirements, the present application constitutes a continuation in part of U.S. patent application entitled CONDITIONAL ALTERATION OF A SAVED IMAGE, naming Royce A. Levien, Robert W. Lord, and Mark A. Malamud, as inventors, filed Nov. 1, 2005, Ser. No. 11/264,701 which is currently co-pending, or is an application of which a currently co-pending application listed as a Related Application is entitled to the benefit of the filing date.

For purposes of the USPTO extra-statutory requirements, the present application constitutes a continuation in part of U.S. patent application entitled DATA MANAGEMENT OF A DATA STREAM, naming Edward K. Y. Jung, Royce A. Levien, Robert W. Lord, Mark A. Malamud, and John D. Rinaldo, Jr. as inventors, filed Mar. 15, 2006, Ser. No. 11/376,627 which is currently co-pending, or is an application of which a currently co-pending application listed as a Related Application is entitled to the benefit of the filing date For purposes of the USPTO extra-statutory requirements, the present application constitutes a continuation in part of United States patent application entitled STORAGE ACCESS TECHNIQUE FOR CAPTURED DATA, naming Royce A. Levien, Robert W. Lord, and Mark A. Malamud as inventors, filed 3 Apr. 2006, Ser. No. 11/397,357 which is currently co-pending, or is an application of which a currently co-pending application listed as a Related Application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior—Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

Various computerized system embodiments for implementing a data storage management technique may include a data capture device wherein captured data has a given high quality resolution; a communication link for transferring some or all of the captured data to a separate storage location for future availability, wherein selected captured data that is initially received at the separate storage location has a given high quality resolution; and a storage protocol for keeping a saved version of the selected captured data at the storage location, which storage protocol includes different storage organization categories. Another possible component may include an identifier record maintained at the capture device and/or at the separate storage location to enable future accessibility to the selected captured data by one or more authorized parties or approved devices.

Some exemplary embodiments disclosed herein provide a method for data management including obtaining captured data on a device, which captured data has a given high quality resolution; and transferring some or all of the captured data via a communication link to a separate storage location for future availability, wherein selected captured data is initially received at the separate storage location without a significant loss of the high quality resolution. Further possible aspects may include confirming a storage protocol for keeping a saved version of the selected captured data at the storage location, which storage protocol includes different storage organization categories; and maintaining an_ identifier record to enable future accessibility to the selected captured data by one or more authorized parties or approved devices.

Exemplary computer program product embodiments having one or more computer programs may be provided for executing a process that includes transferring captured data having a given high quality resolution via a communication link from a capturing device to a separate storage location for future availability; and implementing a storage protocol for keeping a saved version of selected captured data at the separate storage location, which storage protocol includes different organization categories. A further possible process feature may include maintaining an identifier record to enable future accessibility to the selected captured data pursuant to the storage protocol.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A-C illustrates an exemplary operation that decreases the resolution of the saved captured image in the computer readable medium;

FIG. 15 illustrates an exemplary operational flow;

FIG. 16 illustrates another embodiment of the exemplary operational flow of FIG. 15;

FIG. 17 illustrates a further embodiment of the exemplary operational flow of FIG. 15;

FIG. 18 illustrates a further embodiment of the exemplary operational flow of FIG. 15;

FIG. 19 illustrates another embodiment of the exemplary operational flow of FIG. 15;

FIGS. 20A-D illustrates an embodiment of the exemplary operational flow of FIG. 16;

FIG. 45 schematically illustrates other possible features incorporated in an exemplary capture device.

DETAILED DESCRIPTION

Figure 1:
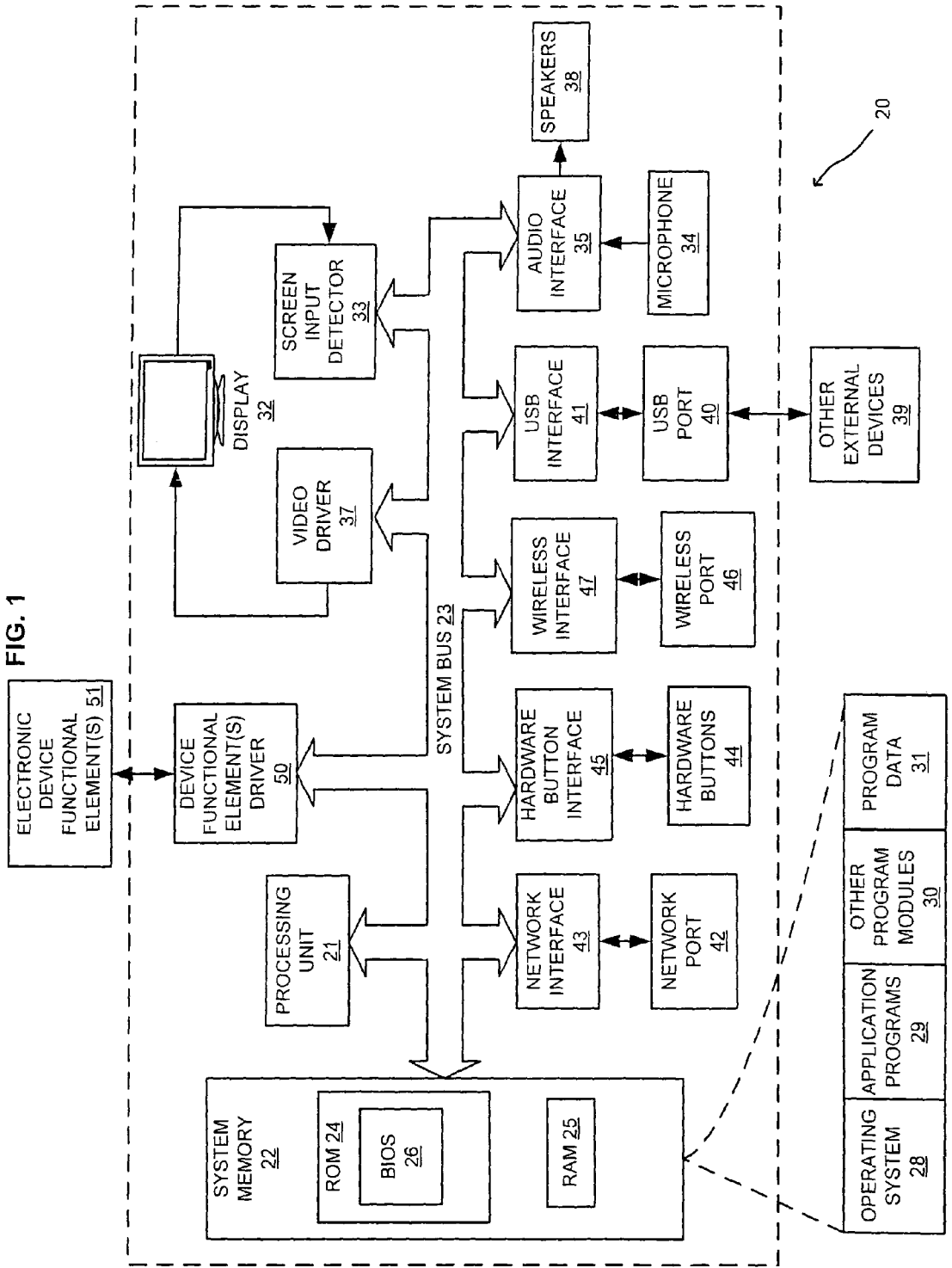
FIG. 1 illustrates the exemplary system that includes a thin computing device 20 that may interface with an electronic device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 provides a brief, general description of an illustrative and/or suitable exemplary environment in which embodiments may be implemented. In FIG. 1, as in the other figures, the figure is an example of an environment and does not suggest any limitation as to the structure, scope of use, or functionality of an embodiment. An embodiment should not be interpreted as having any dependency or requirement relating to any one or combination of components illustrated in an exemplary environment. For example, in certain instances, elements of an environment and/or a method may be deemed not necessary and omitted. In other instances, other elements may be deemed necessary and added.

FIG. 1 illustrates the exemplary system that includes a thin computing device 20 that may interface with an electronic device (not shown). The electronic device may include one or more functional elements 51. For example, the electronic device may include any item having electrical and/or electronic components playing a role in a functionality of the item, such as a limited resource computing device, a game console, a digital camera, a cell phone, a printer, a refrigerator, a car, and an airplane. The thin computing device includes a processing unit 21, a system memory 22, and a system bus 23 that couples various system components including the system memory to the processing unit. The system bus may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device, such as during start-up, is stored in the ROM. A number of program modules may be stored in the ROM and/or RAM, including an operating system 28, one or more application programs 29, other program modules 30, and program data 31.

A user may enter commands and information into the computing device 20 through user input devices, such as a number of switches and buttons, illustrated as hardware buttons 44, which may be associated with the electronic device and connected via a suitable interface 45. Input devices may further include a touch-sensitive display screen 32 with suitable input detection circuitry 33. The output circuitry of the touch-sensitive display screen is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner, an external computer readable medium, or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device may further include or be capable of a connection with a network through a network port 42 and network interface 43, and/or through wireless port 46 and corresponding wireless interface 47. Such a connection may be provided to facilitate communication with other peripheral devices, including other computers, printers, and so on (not shown). It will be appreciated that the various components and connections shown are exemplary and other components and means of establishing communications links may be used.

The computing device 20 may be designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device may be designed to include a user interface having a physical keyboard (not shown).

The device functional elements 51 are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and/or a camera capturing and saving an image.

In the description that follows, certain embodiments may be described with reference to acts and symbolic representations of operations that are performed by one or more computing devices, such as the thin computing device 20 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Embodiments may be implemented with numerous other general-purpose or special-purpose computing devices, computing system environments, and/or configurations. Examples of well-known computing systems, environments, and/or configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Figure 2:
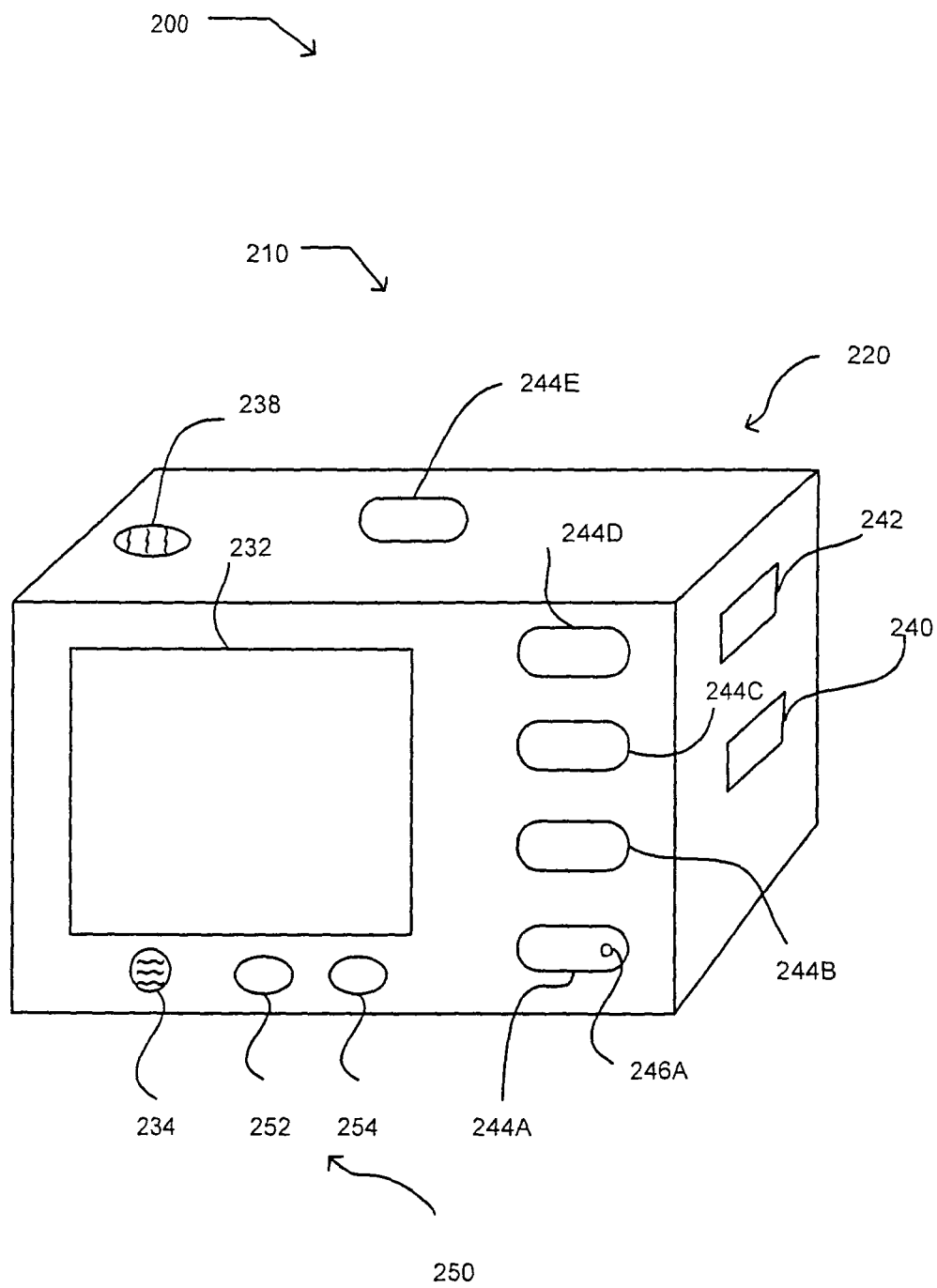
FIG. 2 illustrates an exemplary system in which embodiments may be implemented.

FIG. 2 illustrates an exemplary system 200 in which embodiments may be implemented. The system includes a digital camera 210 having image capture and image storage functionality. The digital camera 210 includes a computing device (not shown), such as the thin computing device 20 described in conjunction with FIG. 1, that is operable to interact with functional elements of the digital camera. The digital camera also includes a plurality of user interfaces 220. The plurality of interfaces 220 includes a display 232. In alternative embodiments, the display may provide a textual, a visual display, and/or a graphical display. In a further embodiment, the display may include touch screen functionality operable to accept a user input. The plurality of user interfaces of the camera also includes a microphone 234, a speaker 238, and a plurality of tangible buttons 244A-244E. One or more of the tangible buttons may include a light emitter, such as a light emitting device 246A. Further, one or more of the tangible buttons 244A-244E may include a vibrator operable to provide a tactile display. The display 232 and the tangible buttons 244A-244E may have any functionality appropriate to the digital camera. For example, the button 244E may be assigned to operate a camera element, such as a shutter function. The button 244A may be assigned an "enter" function, and buttons 244B and 244C may be respectively assigned a scroll up and scroll down function relative to a menu displayed on the display 232. The button 244D may be assigned to operate another camera element, such as a lens zoom function. The digital camera also includes context sensors 250, which may be selected, for example, to produce relevant information about an environment extrinsic to the digital camera. The context sensors are illustrated as an external temperature sensor 252 and a light intensity sensor 254. The digital camera further includes a USB port 240, a network port 242, and/or a wireless port (not shown).

In addition, the digital camera 210 includes a lens (not shown) and an image acquisition module (not shown). The image acquisition module controls the lens, a shutter, an aperture, and/or other elements as necessary to capture an image through the lens. In an embodiment, capturing images using digital cameras or camcorders may be equated with photography as performed by conventional film cameras. A captured image may be processed, stored, viewed, and/or distributed by the digital camera. The digital camera also includes a system memory (not shown), such as the system memory 22 of the thin computing device 20 of FIG. 1. The system memory includes saved operating systems and programs necessary to operate the digital camera. In addition, the digital camera may include a computer readable media (not shown), such as the computer readable medium described in conjunction with FIG. 3 below.

The digital camera 210 includes operability to receive a user input through an interface of the plurality of interfaces 220. For example, in an embodiment, detecting a user touch to the button 244D may be received as an instruction and/or a selection. Another detected user touch to another user interface of the plurality of user interfaces 220 may be received as another instruction and/or a selection. The user touch may be detected by a user interface physically incorporated in the aspect of the digital camera 210 or proximate thereto. In an alternative embodiment, a user input may be received by detecting a signal responsive to a sound or voice received by the microphone 234. For example, a detection and recognition of a signal responsive to a spoken command to the microphone 234 may be received as an instruction to activate a program associated with the digital camera. Further, a detection of a signal responsive to a sound or voice may be received by the microphone 234.

Figure 3:
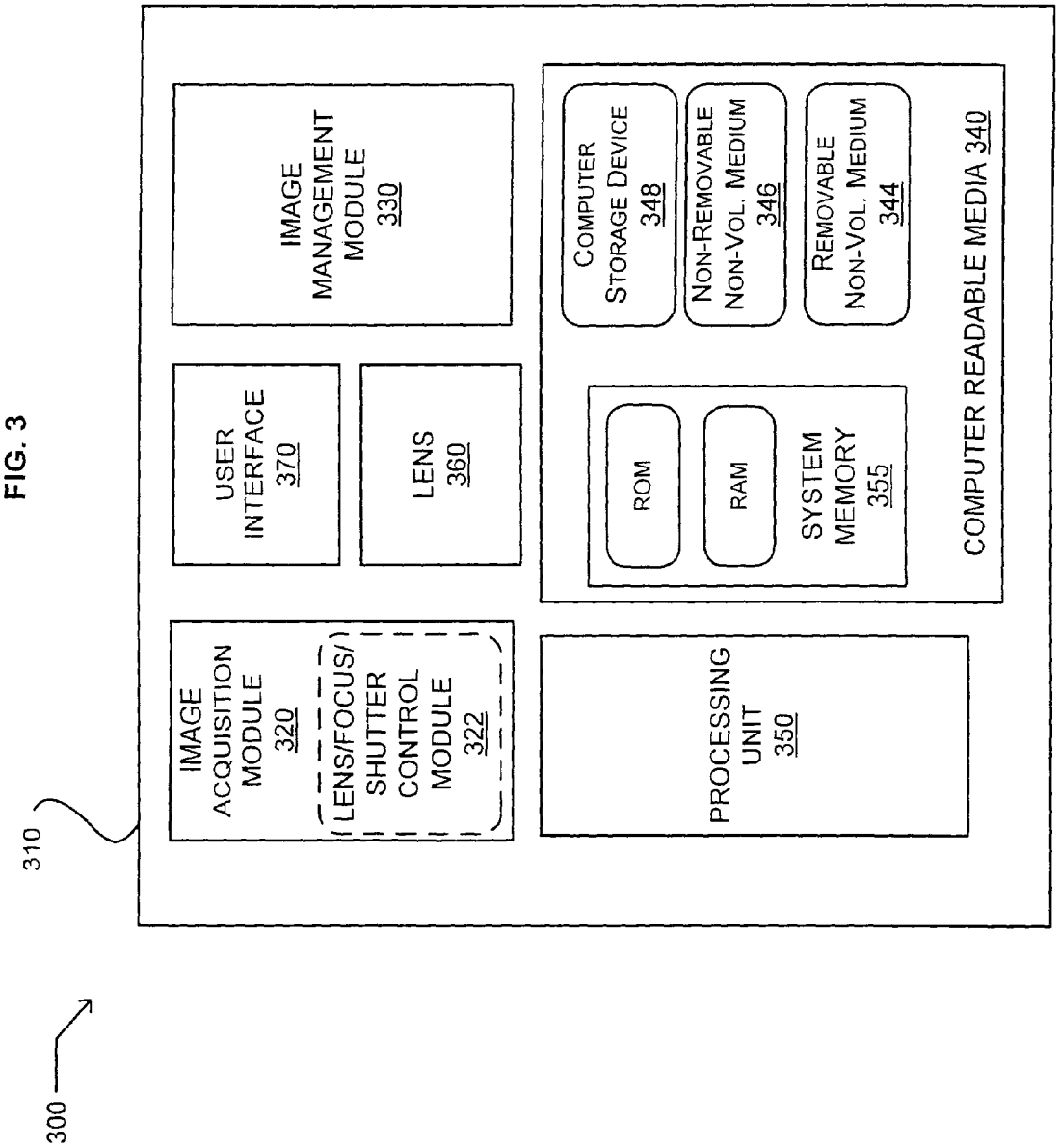
FIG. 3 illustrates an exemplary system in which embodiments may be implemented.

FIG. 3 illustrates an exemplary system 300 in which embodiments may be implemented. The system includes a digital camera 310. The digital camera includes an image acquisition module 320 operable to capture an image, an image management module 330, and a computer readable medium, illustrated as computer readable media 340.

In an embodiment, the digital camera 310 may include a computing device (not expressly shown) that handles any required processing. For example, the computing device may include at least a part of the system described in conjunction with FIG. 1, including the thin computing device 20, that may interface with at least one functional element of the digital camera. In an embodiment, the digital camera may include a processing unit, illustrated as a processing unit 350, and a system memory 355, which may be substantially similar to the processing unit 21 and the system memory 22 respectively of FIG. 1. In another embodiment, the digital camera may include at least a part of the exemplary system 200 and/or the digital camera 210 described in conjunction with FIG. 2.

The image management module 330 includes an operability to save a captured image at a resolution in the computer readable medium 340 and in a user-accessible form. In an embodiment, the operability to save the captured image at a resolution in the computer readable medium and in a user-accessible form includes an operability to save a captured image in a format at least substantially suitable for presentation by a visual display of the digital camera 310, such as a display screen. For example, the operability to save a captured image at a resolution in the computer readable medium and in a user-accessible form may include an operability to save a captured image at a resolution in a JPEG format, a GIF format, a TIFF format, or a PDF format. In another embodiment, the operability to save the captured image at a resolution in the computer readable medium and in a user-accessible form includes an operability to save the captured image at a resolution in the computer readable medium after data representative of the captured image has been decoded and processed from a raw format. Typically, the raw data is decoded and/or processed from a raw format, i.e., raw image data, into a JPEG format, a GIF format, a TIFF format, or a PDF format. In a further embodiment, the operability to save the captured image at a resolution in the computer readable medium and in a user-accessible form includes an operability to save the captured image in a form accessible to a user of the digital camera in the computer readable medium. For example, the form accessible to a user of the digital camera may include a JPEG format, a GIF format, a TIFF format, a PDF format, or a raw format where the digital camera allows a user access to a saved captured image in a raw format.

In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device such as, for example, the digital camera 30. Certain embodiments of a streaming image may include a video that may be captured by the digital camera, such as, for example, a digital camcorder camera.

The term "resolution" may include an indication of a measurement of image detail, such as may be expressed as pixels per inch, dots per inch, or samples per inch, etc. In certain embodiments, a file size of an image is a function of its resolution, and in certain embodiments of relatively limited storage-capability cameras, relatively few high-resolution images can be saved.

In another embodiment, a "user-accessible form" may include at least one of a location in the computer readable medium that allows a user to access a file saved therein, a file formatted to allow a user of the digital camera 310 to view and/or manipulate the captured image, a property of the captured image written to the computer readable medium, and/or an organization of the computer readable medium that allows a user to access a file saved therein. For example, data indicative of the captured image written to a hard drive in a JPEG format generally allows a user to view and/or manipulate the captured image. In an embodiment, a user-accessible storage medium may include all or any portion of any computer readable storage medium that allows a user, typically through a user interface, to act with respect to and/or interact with the image, such as viewing the image, manipulating the image, and/or directing the image to another location.

The image management module 330 also includes an operability to decrease the resolution of the saved captured image in the computer readable medium if a condition is met. In an embodiment, the condition may include a condition corresponding in part or whole to a state of the computer readable medium, a presence and/or absence of a predetermined content of the saved captured image, a characteristic of the saved image, an image storage administrative criterion, and/or a temporal criterion. In a further embodiment, a condition does not include an automatic or standing condition that normally occurs upon completion of a processing, for example, completion of decoding raw image data into a more machine usable and/or user viewable format.

Examples of decreasing a resolution of a saved captured image include, but are not limited to changing a resolution of a saved captured image, resampling a saved captured image, adjusting an exposure of a saved captured image, adjusting some image content of a saved captured image, and/or adjusting image composition of a saved captured image. As described within this document, certain embodiments of the decreasing a resolution of a saved captured image are configurable to decrease the resolution of the image such as by utilizing pixel-combination and/or combination of multiple images. The decreasing a resolution of a saved captured image may include altering image intensity and/or color values. The decreasing a resolution of a saved captured image may in certain embodiments, but not others, be equated to sizing the resolution of an image downward, and may other embodiments be implemented by removing pixels from the saved captured image. The decreasing a resolution of a saved captured image may pertain in certain embodiments, but not others, to altering the color values and/or the color intensities of a particular image. The decreasing a resolution of a saved captured image may pertain to decreasing the density of the pixels forming the image. During a resolution decreasing process, in certain embodiments of a display or projector, a footprint of pixels may be suitably altered to effectively change the resolution of the at least one image.

In an embodiment, the computer readable media 340 may include a variety of computer readable media products. The computer readable media may include any storage media accessible by a computing device, and includes both removable and non-removable media. By way of example, and not of limitation, computer-readable media may include any computer storage media. Computer storage media includes removable and non-removable media implemented in any method or technology for storage of information such as computer-readable instructions, data structures, program modules, or other data. Computer storage media may include, but are not limited to, magnetic devices, such as magnetic disk storage, magnetic cassettes, magnetic tape, or other magnetic storage devices; optical devices, such as CD-ROM, digital versatile disks (DVD), or other optical disk storage; memory cards, such a flash memory card; and/or any other medium which may be used to store the captured information and which can be accessed by a computing device. Combinations of any of the above may also be included within the scope of a computer-readable medium.

FIG. 3 illustrates an embodiment where the computer readable media 340 includes at least one instance of a computer readable medium. Illustrated instances of a computer readable medium include a computer storage device 348, a non-removable non-volatile medium 346, and/or a removable non-volatile medium 344. In an embodiment, the computer storage device may include any device capable of storing data, such as, for example, a mass storage device, a disk drive, and/or a tape drive. In another embodiment, the non-removable non-volatile medium may include a non-volatile magnetic disk or other medium. In a further embodiment, the removable non-volatile medium may include an optical disk such as a CD ROM, magnetic tape cassettes, flash memory cards, DVDs, and/or digital video tape.

In an embodiment, the computer readable medium 340 includes a non-volatile computer storage device. In another embodiment, the computer readable medium includes a non-volatile computer readable medium. In a further embodiment, the computer readable medium includes a removable non-volatile computer readable medium.

In an embodiment, the image acquisition module 320 operable to capture an image includes an image acquisition module operable to capture a still image, an image stream, and/or a combination of a still image and an image stream. In another embodiment, the image acquisition module operable to capture an image includes an image acquisition module operable to capture at least one of a visual image, an audio image, and/or a combination of a visual image and an audio image. In a further embodiment, the image acquisition module operable to capture an image includes an image acquisition module operable to capture an image in response to a received instruction from another digital device. The received instruction from another digital device may include an instruction received from another digital camera. The received instruction may direct capture of the image, or may include data responsive to which the image acquisition module captures the image.

In an embodiment, the image management module 330 operable to save a captured image at a resolution in a computer readable medium and in a user-accessible form includes an image management module operable to save a captured image at a resolution in the computer readable medium and in a user-accessible album of images stored in a computer readable medium. In another embodiment, the image management module operable to save a captured image at a resolution in a computer readable medium includes an image management module operable to save a captured image at a resolution in the computer readable medium and in a user-accessible collection of images stored in a computer readable medium. In a further embodiment, the image management module operable to save a captured image at a resolution in the computer readable medium and in a user-accessible form includes an image management module operable to save a captured image at a resolution in a user-accessible data structure.

In an embodiment, the image management module 330 operable to decrease the resolution of the saved captured image in the computer readable medium if a condition is met includes an image management module operable to decrease the resolution of the saved captured image in the computer readable medium using a lossy compression algorithm if a condition is met. In another embodiment, the image management module operable to decrease the resolution of the saved captured image in the computer readable medium if a condition is met includes an image management module operable to decrease the resolution of the saved captured image in the computer readable medium if a time exceeds a preselected time threshold. The preselected time threshold may exceed five seconds. The preselected time threshold may exceed at least a selected one of ten seconds, thirty seconds, one minute, thirty minutes, ninety minutes, five hours, twelve hours, one day, one week, one month, or one year.

In a further embodiment, the image management module 330 operable to decrease the resolution of the saved captured image in the computer readable medium if a condition is met includes an image management module operable to decrease the resolution of the saved captured image in the computer readable medium if a time value is inside a preselected time window. In an embodiment, the image management module operable to decrease the resolution of the saved captured image in the computer readable medium if a condition is met includes an image management module operable to decrease the resolution of the saved captured image in the computer readable medium if a condition is met where the condition corresponds to at least one of a storage space availability in the computer readable medium, a user established parameter, a preselected content of the image, and/or a parameter established by a storage management algorithm. In another embodiment, the image management module operable to decrease the resolution of the saved captured image in the computer readable medium if a condition is met includes an image management module operable to decrease the resolution of the saved captured image in the computer readable medium if a condition independent of the operation to save a captured image at a resolution in the computer readable medium is met. In a further embodiment, the image management module operable to decrease the resolution of the saved captured image in the computer readable medium if a condition is met includes an image management module operable to decrease the resolution of the saved captured image in the computer readable medium if a condition responsive to an examination of at least one other captured image saved in the computer readable medium is met. For example, a condition responsive to an examination of at least one other captured image saved in the computer readable medium may include examining a content and/or context of the at least one or more other saved captured images for a repetition and/or duplication. If at least one other saved captured image is examined and found to be repetitive and/or duplicative of the saved captured image, the condition would be met and the image management module would operate to reduce the resolution of the saved captured image. In an alternative embodiment, the image management module may include an operability to reduce the resolution of the at least one other saved image in response to the condition being met.

In an embodiment, the image management module 330 may further include an image management module operable to further decrease the resolution of the captured image saved in the computer readable medium if another condition is met.

FIGS. 4A-C illustrate an exemplary operation 400 that decreases the resolution of the saved captured image in the computer readable medium. The operation is described using the exemplary system 300 and the digital camera 310 of FIG. 3 as an example. In operation of an embodiment of the exemplary system, a user may compose a picture by orientating the lens 360 toward a subject in a scene. The user may communicate their preferences about the intended picture to the digital camera using elements of the user interface 370. Upon shutter activation, an imaging chip 322 of the image acquisition module 320 generates electrical signals corresponding to the scene in a raw-format. A processing unit 350 and/or an image management module 330 of the digital camera decodes and/or processes the raw-format image of the scene into a format, such as a JPEG format, a GIF format, a TIFF format, or a PDF format. The decoding and/or processing typically involve the system memory 355 of FIG. 3. The image management module 330 then saves the captured image in a post-decoded/processed format, such as the JPEG format, at an initial resolution 410 in the computer readable medium 340. FIG. 4A illustrates the saved captured image in the post-decoded/processed format, such as a JPEG format, in the file at, at the initial resolution 410 in the computer readable medium. Typically, the file will have an initial file size measured in bytes.

If a condition is met, the image management module 330 decreases the resolution of the saved captured image in the computer readable medium 340 from the initial resolution 410 to a decreased resolution 415. For example, a condition may include whether a user has not caused the digital camera 310 to display the captured saved image at the initial resolution 410 for more than ten seconds in the 30 days immediately after the image was captured. The image management module monitors for the condition being met. If the condition is met, i.e., a user has not caused the digital camera to display the saved captured image at the initial resolution for more than 10 seconds during the 30 days after the image was captured, the image management module decreases the resolution of the saved captured image in the computer readable medium. The resolution of the saved captured image is decreased from the initial resolution 410 to a lesser or decreased resolution, illustrated as the decreased resolution 415.

If another condition is met, the image management module 330 may further decrease the decreased resolution 415 of the saved captured image in the computer readable medium 340. For example, a condition may include whether a user has not caused the digital camera 30 to display the captured saved image at its decreased resolution 415 for more than ninety seconds during the 90 days after the resolution was reduced from the file 410. If the condition is met, i.e., a user has not caused the digital camera to display the saved captured image for more than ninety seconds during the 90 days after the saved captured image was reduced, the image management module further decreases the resolution of the written captured image in the computer readable medium. The resolution is decreased from the decreased resolution 415 to a further decreased resolution, illustrated as a further decreased resolution 420. In an embodiment, each decreased resolution is selected to use less file storage space in the computer readable medium than its predecessor does. In an embodiment, less viewed or lower user-valued files have their resolution degraded over time to maximize available storage capacity for newly captured images and/or frequently viewed images.

Figure 5:
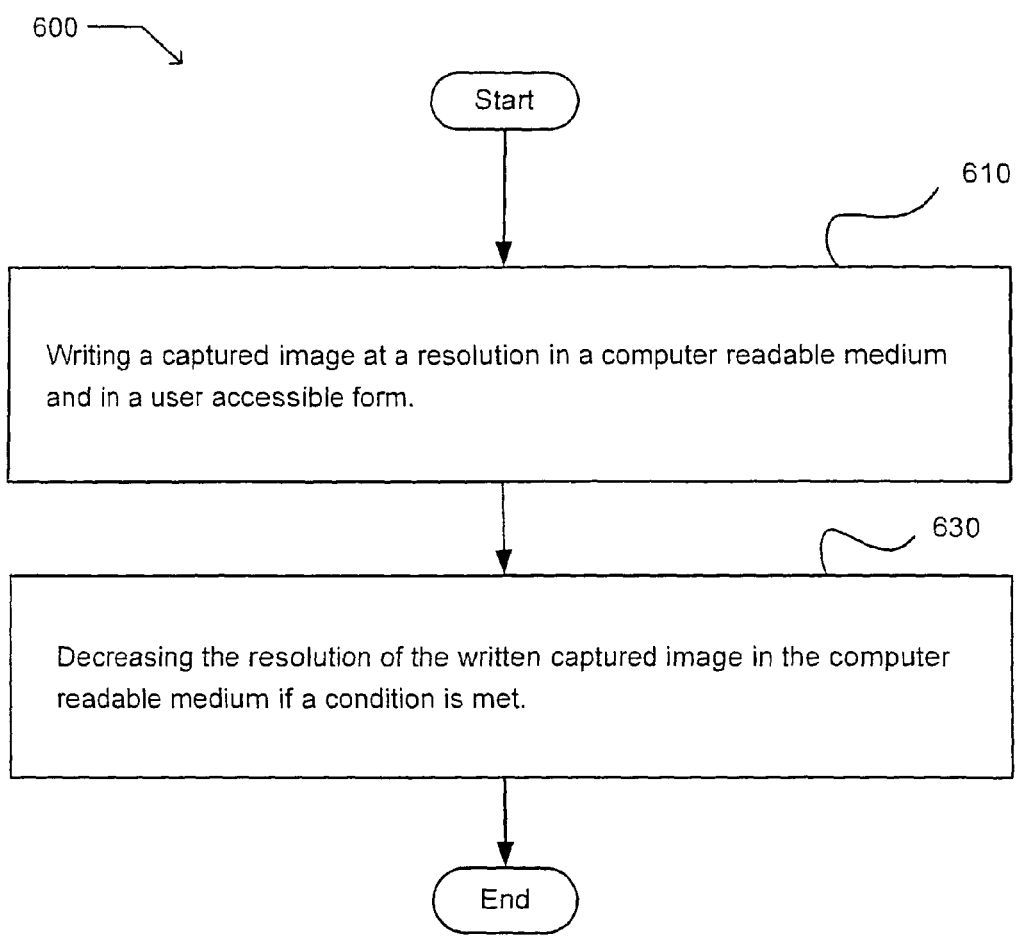
FIG. 5 illustrates an exemplary operational flow.

FIG. 5 illustrates an exemplary operational flow 600. The exemplary operational flow may be implemented in the exemplary system 300 described in conjunction with FIG. 3. After a start operation, a storage operation 610 writes a captured image at a resolution in a computer readable medium and in a user-accessible form. A transformation operation 630 decreases the resolution of the written captured image in the computer readable medium if a condition is met. The operational flow then proceeds to an end operation.

Figure 6:
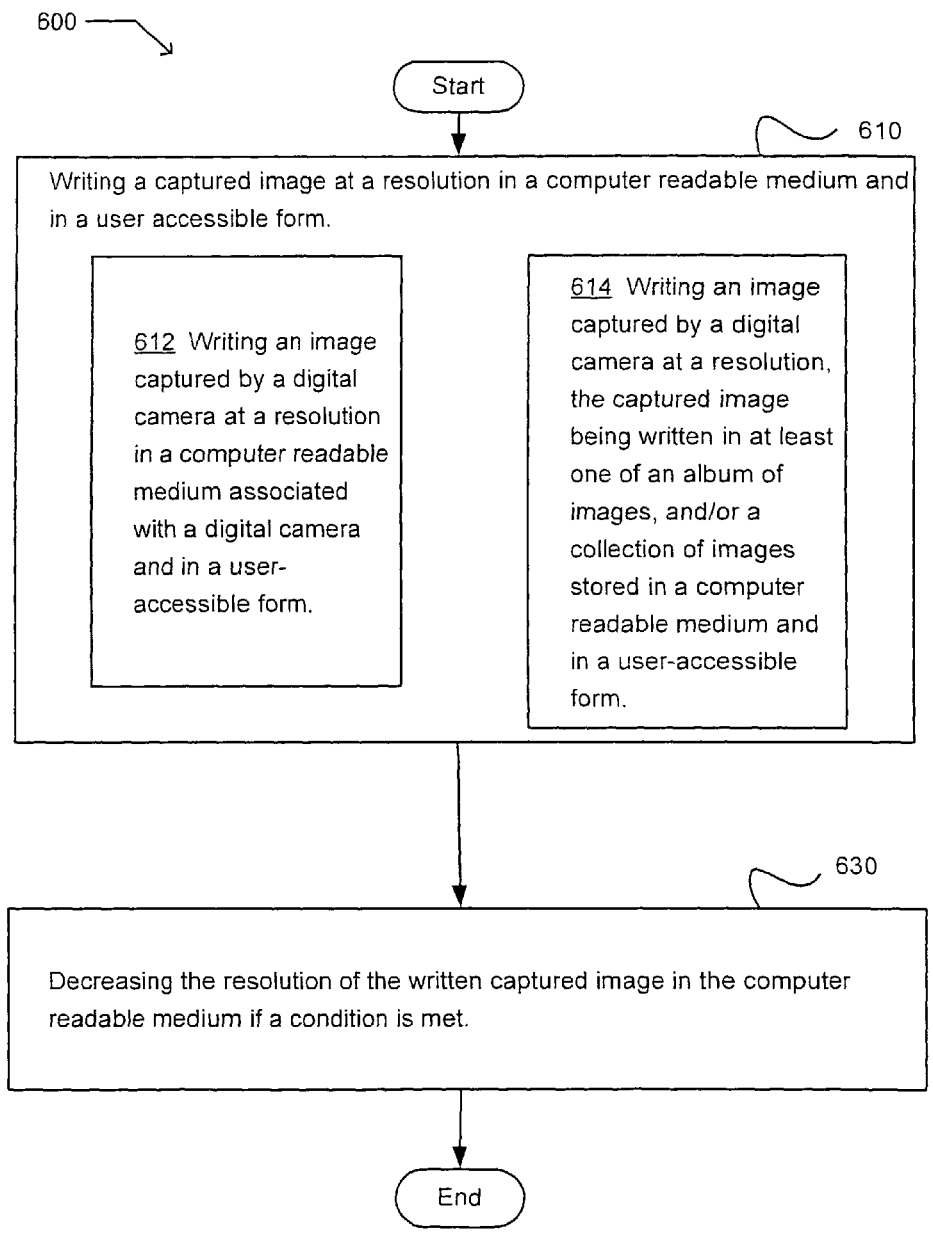
FIG. 6 illustrates an alternative embodiment of the exemplary operational flow of FIG. 5.

FIG. 6 illustrates an alternative embodiment of the exemplary operational flow 600 of FIG. 5. The storage operation 610 may include at least one additional operation. The at least one additional operation may include an operation 612, and/or an operation 614. The operation 612 writes an image captured by a digital camera at a resolution in a computer readable medium associated with a digital camera and in a user-accessible form. The operation 614 writes an image captured by a digital camera at a resolution and in a user-accessible form, the captured image being written in at least one of an album of images, and/or a collection of images stored in a computer readable medium.

Figure 7:
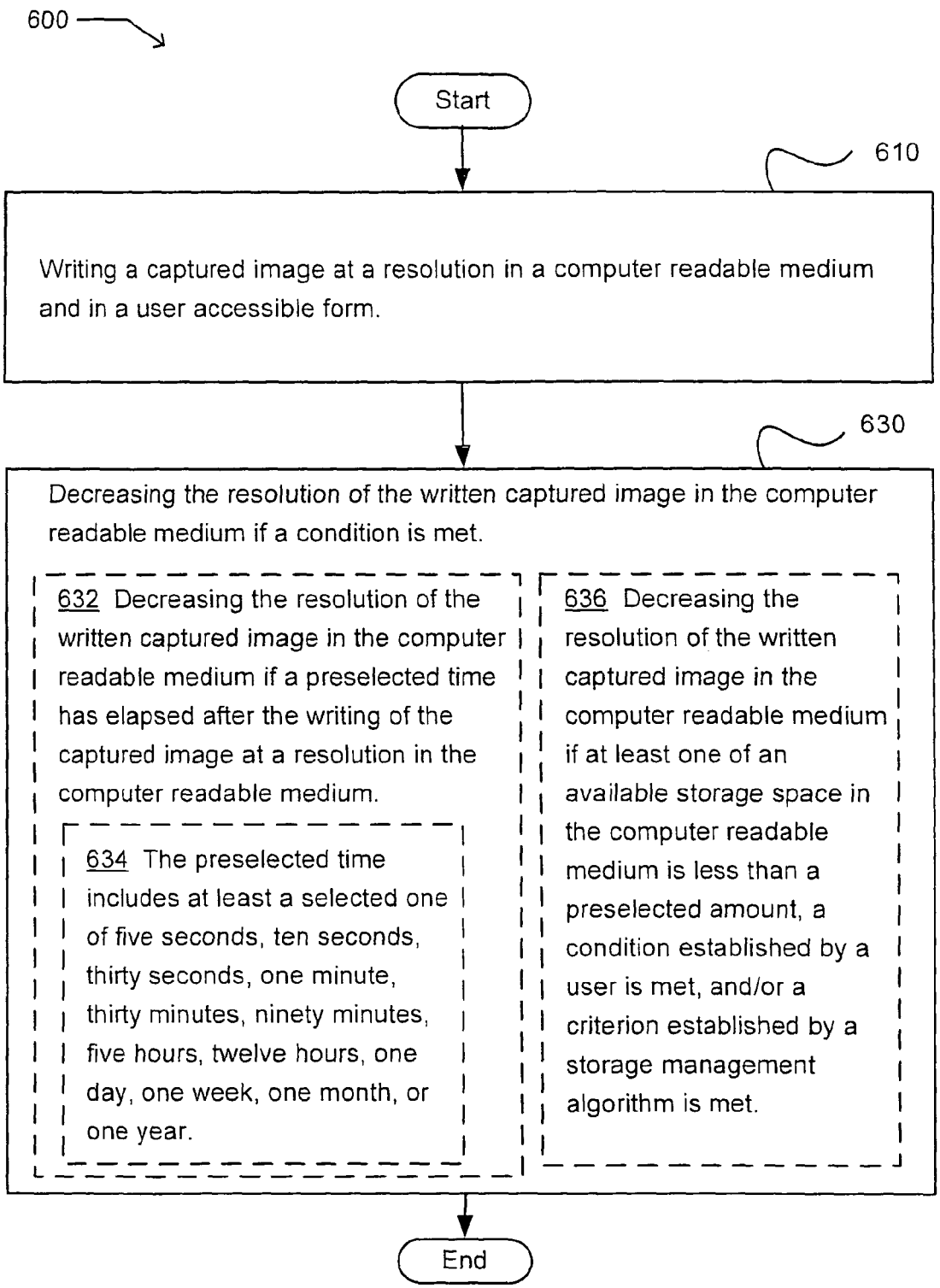
FIG. 7 illustrates an alternative embodiment of the exemplary operational flow of FIG. 5.

FIG. 7 illustrates an alternative embodiment of the exemplary operational flow 600 of FIG. 5. The transformation operation 630 may include at least one additional operation.

The at least one additional operation may include an operation 632, and/or an operation 636. The operation 632 decreases the resolution of the written captured image in the computer readable medium if a preselected time has elapsed after the writing of the captured image at a resolution in the computer readable medium. The operation 632 may include at least one additional operation, such as the operation 634. At the operation 634, the preselected time includes at least a selected one of five seconds, ten seconds, thirty seconds, one minute, thirty minutes, ninety minutes, five hours, twelve hours, one day, one week, one month, or one year. The operation 636 decreases the resolution of the written captured image in the computer readable medium if at least one of an available storage space in the computer readable medium is less than a preselected amount, a condition established by a user is met, and/or a criterion corresponding to a storage management algorithm is met.

Figure 8:
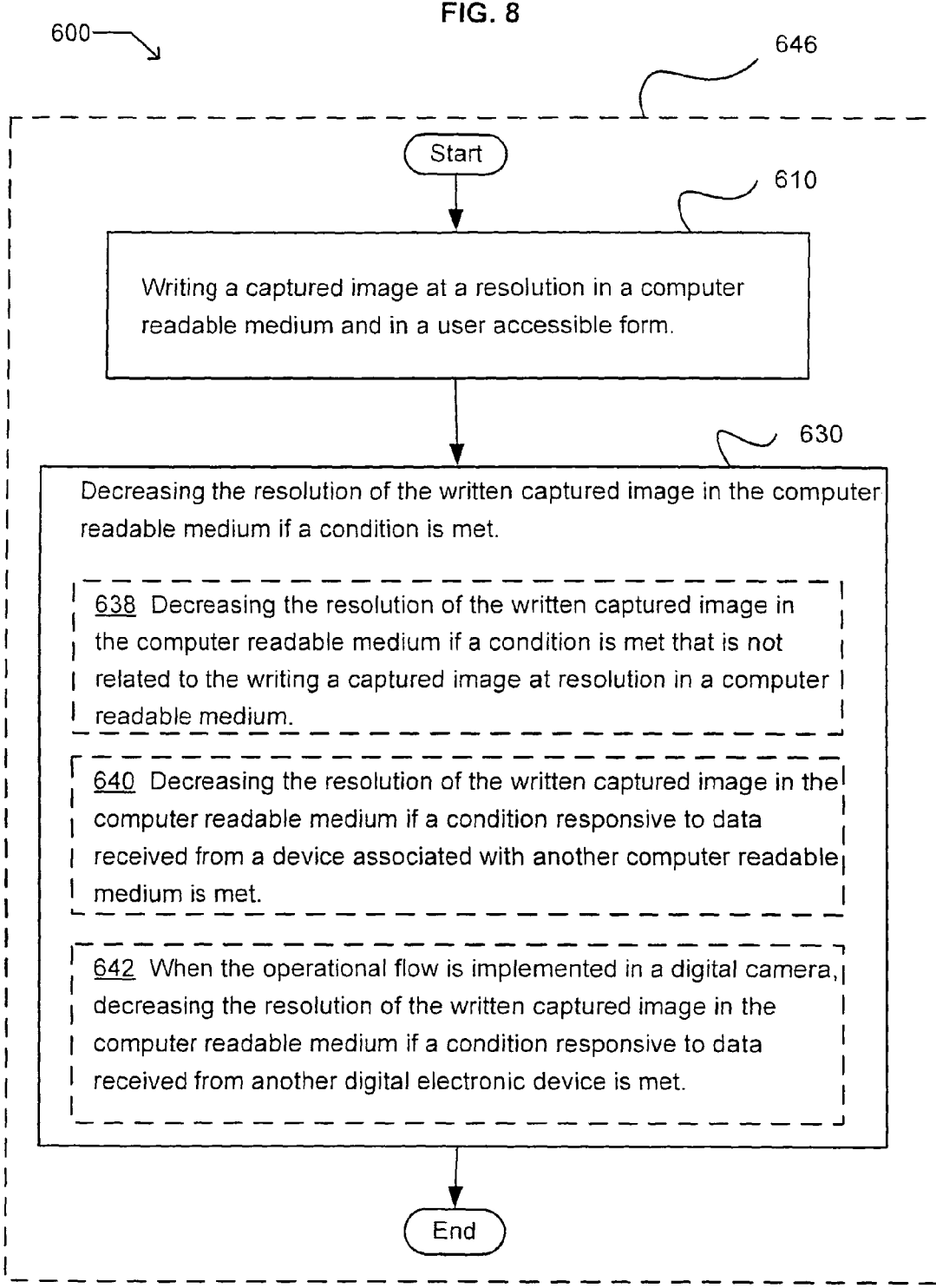
FIG. 8 illustrates an alternative embodiment of the exemplary operational flow of FIG. 5.

FIG. 8 illustrates an alternative embodiment of the exemplary operational flow 600 of FIG. 5. The operational flow may be implemented in a handheld digital camera 646. The transformation operation 630 may include at least one additional operation. The additional operation may include an operation 638, an operation 640, and/or an operation 642. The operation 638 decreases the resolution of the written captured image in the computer readable medium if a condition is met that is not related to the writing a captured image at resolution in a computer readable medium. The operation 640 decreases the resolution of the written captured image in the computer readable medium if a condition responsive to data received from a device associated with another computer readable medium is met. When the operational flow is implemented in a digital camera, the operation 642 decreases the resolution of the written captured image in the computer readable medium if a condition responsive to data received from another digital device is met.

Figure 9:
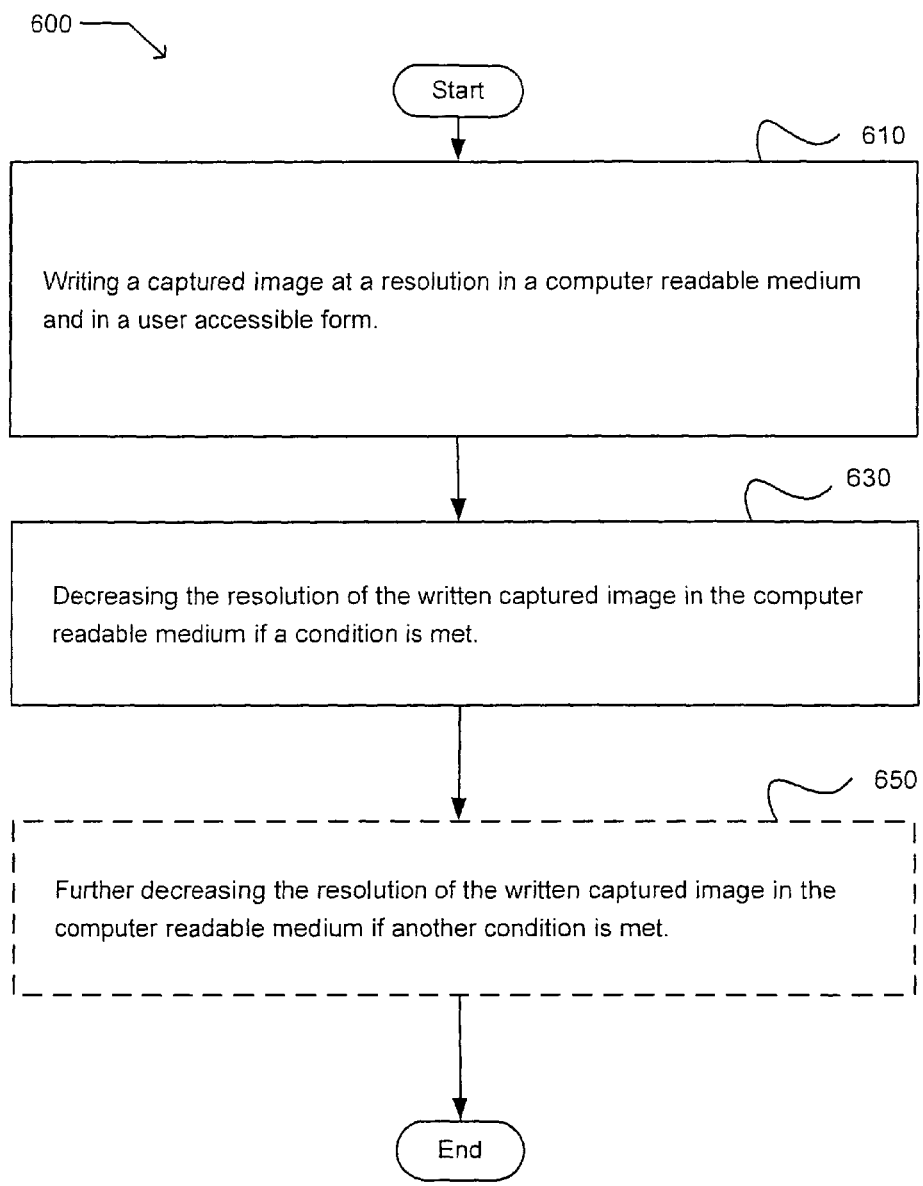
FIG. 9 illustrates an alternative embodiment of the exemplary operational flow of FIG. 5.

FIG. 9 illustrates an alternative embodiment of the exemplary operational flow 600 of FIG. 5. The operational flow may include at least one additional operation, such as an operation 650. The operation 650 further decreases the resolution of the written captured image in the computer readable medium if another condition is met.

Figure 10:
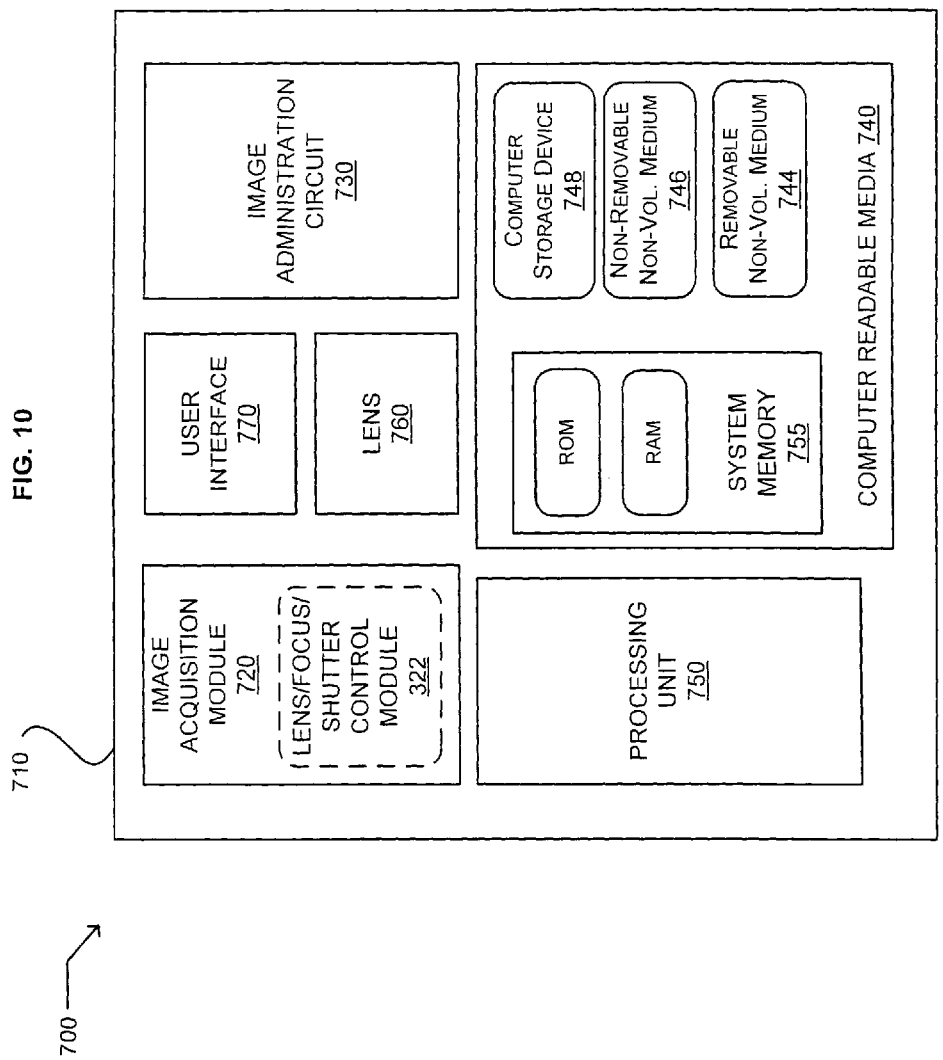
FIG. 10 illustrates an exemplary environment in which embodiments may be implemented.

FIG. 10 illustrates an exemplary environment 700 in which embodiments may be implemented. The exemplary environment includes a device 710, which may include elements that are at least substantially similar to the digital camera 310 of FIG. 3. The device includes an image acquisition module 720 operable to capture an image, a computer readable medium, illustrated as a computer readable media 740, and an image administration circuit 730. The image administration circuit includes an image administration circuit for saving a captured image at a first resolution in the computer readable medium. The image administration circuit also includes a image administration circuit for saving the captured image in the computer readable medium at a second resolution that is less than the first resolution, and for removing the captured image saved at the first resolution from the computer readable medium, both if a condition is met.

In an embodiment, the image administration circuit 730 for saving a captured image in the computer readable medium at a first resolution includes an image administration circuit for saving a captured image at a first resolution in at least one of a nonvolatile, a removable, and/or non-removable media implemented in any method and/or technology for storage of digital information. In another embodiment, the image acquisition module 720 operable to capture an image includes an image acquisition module operable to capture at least one of a still image, an image stream, and/or a combination of a still image and an image stream. In a further embodiment, the image acquisition module operable to capture an image includes an image acquisition module operable to capture at least one of visual image, an audio image, and/or a combination of a visual image and an audio image.

In an embodiment, the image acquisition module 720 operable to capture an image includes an image acquisition module operable to capture a real-world image. In another embodiment, the image administration circuit 730 for saving a captured image at a first resolution in the computer readable medium includes an image administration circuit for saving a captured real-world image at a first resolution in the computer readable medium. In a further embodiment, the image acquisition module operable to capture an image includes an image acquisition module operable to capture a virtual-world image. In another embodiment, the image administration circuit for saving a captured image at a first resolution in the computer readable medium includes an image administration circuit for saving a captured virtual-world image at a first resolution in the computer readable medium.

In another embodiment, the image administration circuit 730 for saving a captured image at a first resolution in the computer readable medium includes an image administration circuit for saving a captured image at a first resolution in the computer readable medium and in a user-accessible form. In a further embodiment, the image administration circuit for saving a captured image at a first resolution in the computer readable medium and in a user-accessible form includes an image administration circuit for saving a captured image at a first resolution in the computer readable medium and in a user-accessible location. In an embodiment, the image administration circuit for saving a captured image at a first resolution in the computer readable medium and in a user-accessible form includes an image administration circuit for saving a captured image at a first resolution in a computer readable medium that allows user access to the saved captured image. In a further embodiment, the image administration circuit for saving a captured image at a first resolution in the computer readable medium and in a user-accessible form includes an image administration circuit for saving a captured image at a first resolution in a computer readable medium configured for user access to the saved captured image.

In an embodiment, the image administration circuit 730 for saving the captured image in the computer readable medium at a second resolution that is less than the first resolution includes an image administration circuit for saving the captured image in the computer readable medium at a resolution reduced from the first resolution. In another embodiment, the image administration circuit for saving the captured image in the computer readable medium at a second resolution that is less than the first resolution if a condition is met includes an image administration circuit for saving the captured image in the computer readable medium at a second resolution where at least a portion of the saved captured image has a resolution less than the first resolution. In a further embodiment, the image administration circuit for saving the captured image in the computer readable medium at a second resolution that is less than the first resolution includes an image administration circuit for reducing the resolution of the captured image from the first resolution into the second resolution and for saving the captured image in the computer readable medium at the second resolution. In an embodiment, the image administration circuit for saving the captured image in the computer readable medium at a second resolution that is less than the first resolution includes an image administration circuit for reducing the resolution of at least one selected frame of a streaming captured image from the first resolution into the second resolution and not reducing at least one other selected frame of the streaming captured image.

In an embodiment, the image administration circuit 730 for removing the captured image saved at the first resolution from the computer readable medium includes an image administration circuit for deleting the captured image saved at the first resolution from the computer readable medium. In another embodiment, the image administration circuit for removing the captured image saved at the first resolution from the computer readable medium includes an image administration circuit for communicating the captured image saved at the first resolution to another computer readable medium. In an embodiment, the another computer readable medium may be physically associated with the device. In further embodiment, the another computer readable medium may not physically associated with the device.

In an embodiment, the image administration circuit 730 for communicating the captured image saved at the first resolution to another computer readable medium includes an image administration circuit for communicating the captured image saved at the first resolution to another computer readable medium and acquiring a track-back link to the communicated captured image. In another embodiment, the image administration circuit for removing the captured image saved at the first resolution from the computer readable medium includes an image administration circuit for communicating the captured image saved at the first resolution to at least one of another computer readable medium that is a less accessible computer readable medium, a slower computer readable medium, a cheaper computer readable medium, a temporarily available computer readable medium, an intermittently available computer readable medium, a more secure computer readable medium, a less secure computer readable medium, a public computer readable medium, a private computer readable medium, and/or a computer readable medium that is less accessible in terms of a location and/or a rate and/or a format.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a preselected time has elapsed since the captured image at a first resolution was saved in the computer readable medium. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if available storage space in the computer readable medium is less than a preselected threshold. For example, the available storage space in the computer readable medium may include a presently available storage in the computer readable medium that is less than a preselected threshold, and/or predicted availability of storage in the computer readable medium that is less than a preselected threshold.

In another embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition established by a user is met. The condition established by a user may include a user-selected condition, a user-created condition, and/or a user-determined condition. In a further embodiment, the image administration circuit for saving the captured image in the computer readable medium at a second resolution that is less than the first resolution if a condition is met includes an image administration circuit for saving the captured image in the computer readable medium at a second resolution that is less than the first resolution if an image resolution changing criterion established by a storage administration criterion is met. In an embodiment, the storage administration criterion may correspond to image content, image content attributes, time, storage space, presence and/or absence of a selected subject, a frequent presence of a selected subject in other saved captured images, an at least substantial similarity to other saved captured images, and/or an at least substantial similarity to other saved captured images having a commonality; such as recently captured, captured in a time frame, and/or captured in temporal or spatial proximity. For example, a storage administration criterion may include keeping only one high resolution saved captured image of my son from all those captured during the month of December. In another example, a storage administration criterion may include keeping, i.e., not deceasing the resolution of sufficient images to enable some task or goal, such as keeping just enough images to construct a panorama, to create a high dynamic range composite, and/or an infinite depth of field image.

In an embodiment, the image administration circuit 730 for saving the captured image in the computer readable medium at a second resolution that is less than the first resolution if a condition is met includes an image administration circuit for saving the captured image in the computer readable medium at a second resolution that is less than the first resolution if a condition corresponding to data received from another digital device is met. In another embodiment, the image administration circuit for saving the captured image in the computer readable medium at a second resolution that is less than the first resolution if a condition is met includes an image administration circuit for saving the captured image in the computer readable medium at a second resolution that is less than the first resolution if a condition responsive to an examination of at least one other captured image saved in the computer readable medium is met. In a further embodiment, the another digital device includes an image acquisition module operable to capture an image. In another embodiment, the device includes a digital camera. In a further embodiment, the device includes a handheld digital camera.

In an embodiment, the an image administration circuit 730 further includes an image administration circuit for saving the captured image in the computer readable medium at a third resolution that is less than the second resolution and removing from the computer readable medium the captured image saved at the second resolution, if another condition is met.

Figure 11:
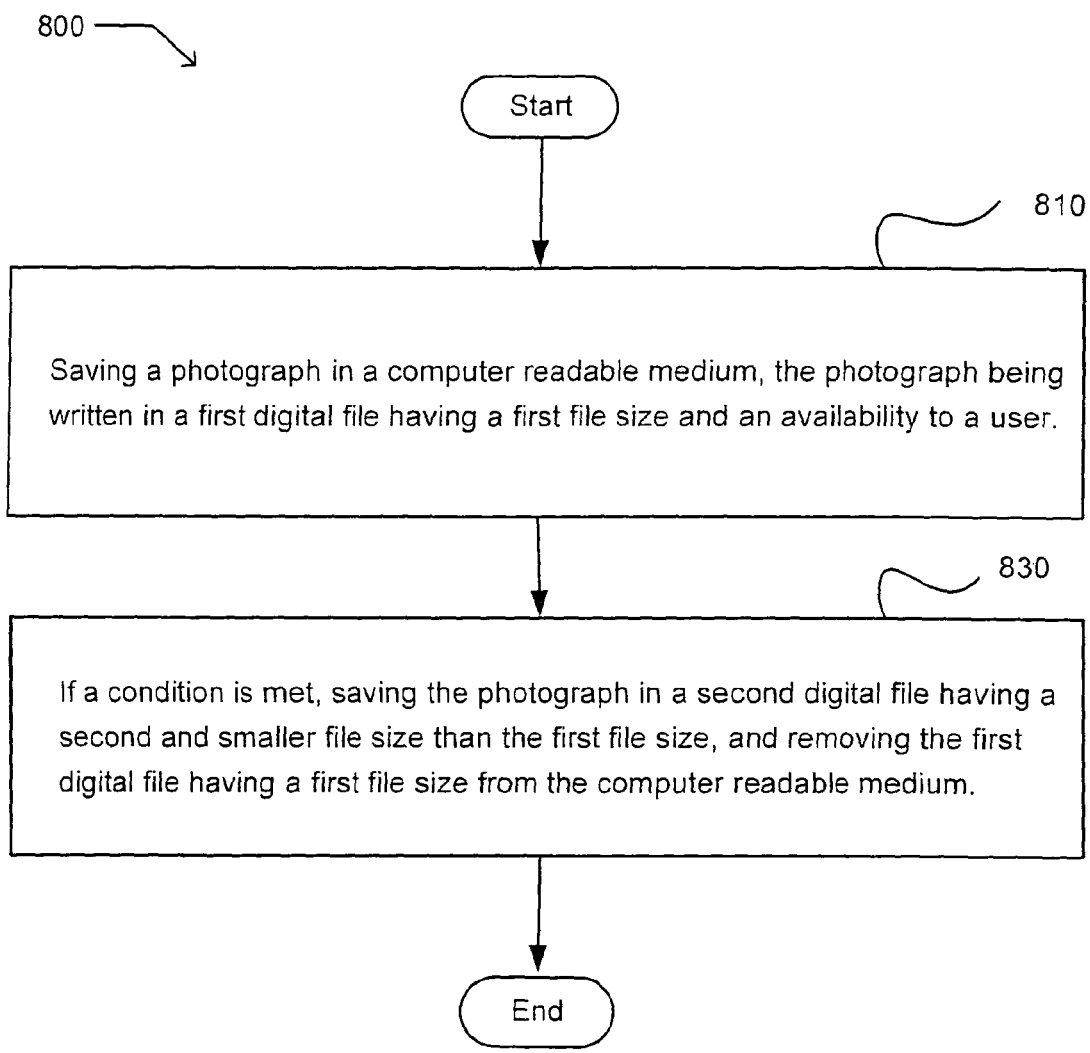
FIG. 11 illustrates an exemplary operational flow.

FIG. 11 illustrates an exemplary operational flow 800. After a start operation, a storage operation 810 saves a photograph in a computer readable medium, the photograph being written in a first digital file having a first file size and an availability to a user. For example, in an embodiment, after a raw image is processed, data representative of the photograph is written into a semi-permanent or permanent storage medium for a later retrieval. A reduction operation 830 saves the photograph in a second digital file having a second and smaller file size than the first file size, and removes the first digital file having a first file size from the computer readable medium, both if a condition is met. The operational flow then proceeds to an end operation.

In an embodiment, a photograph may include a single picture of a scene, a stream of pictures of a scene that may be static or dynamic, and/or a combination thereof. In another embodiment, the image acquisition module operable to capture an image includes an image acquisition module operable to capture at least one of a visual picture, a sound, and/or a combination thereof.

Figure 12:
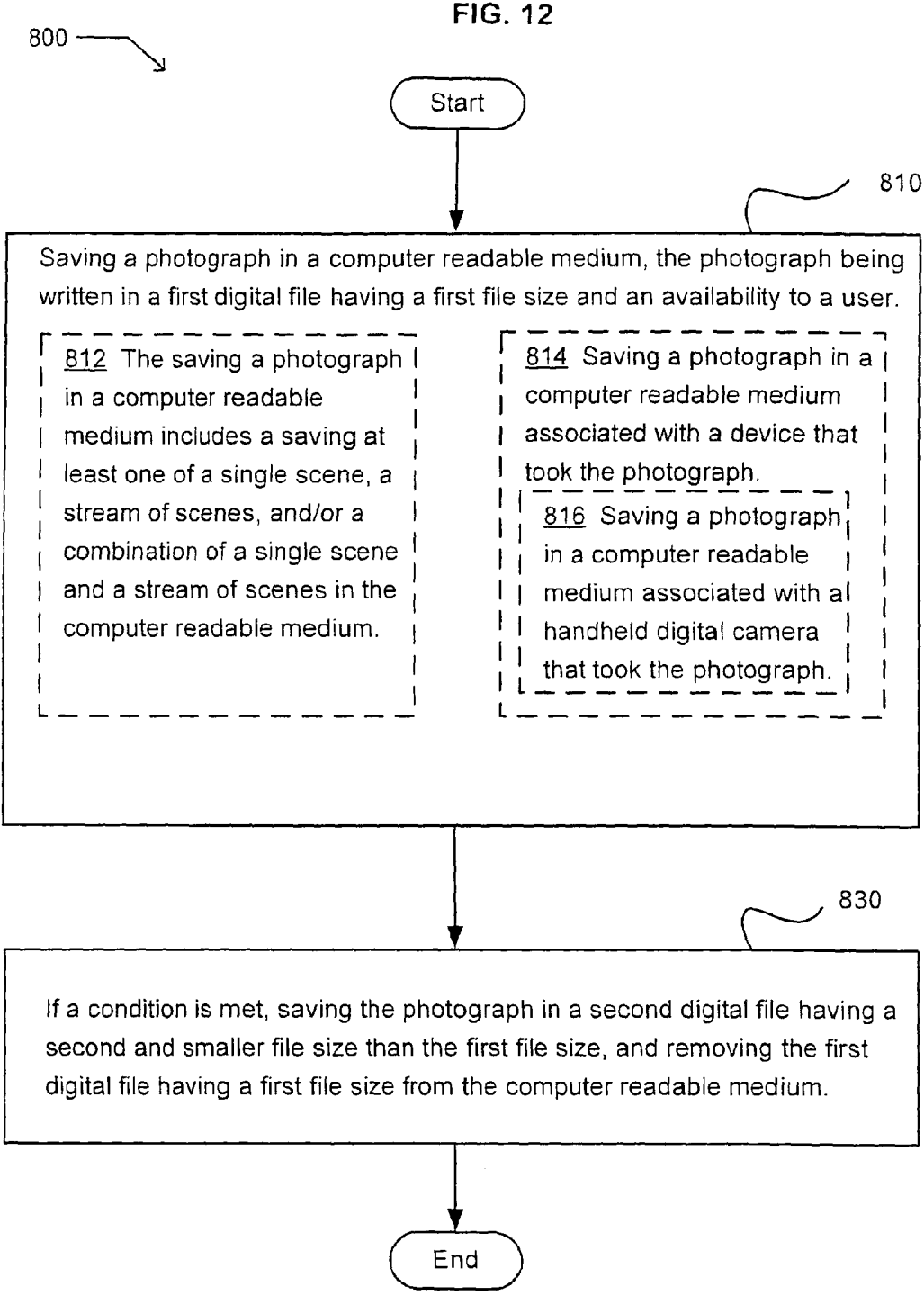
FIG. 12 illustrates an alternative embodiment of the exemplary operational flow of FIG. 11.

FIG. 12 illustrates an alternative embodiment of the exemplary operational flow 800 of FIG. 11. The storage operation 810 may include at least one additional operation. The at least one additional operation may include an operation 812 and/or an operation 814. At the operation 812, the saving a photograph in a computer readable medium includes a saving at least one of a single scene, a stream of scenes, and/or a combination of a single scene and a stream of scenes in the computer readable medium. The operation 814 saves a photograph in a computer readable medium associated with a device that took the photograph. The operation 814 may include at least one additional operation, such as the operation 816. The operation 816 saves a photograph in a computer readable medium associated with a handheld digital camera that took the photograph.

Figure 13:
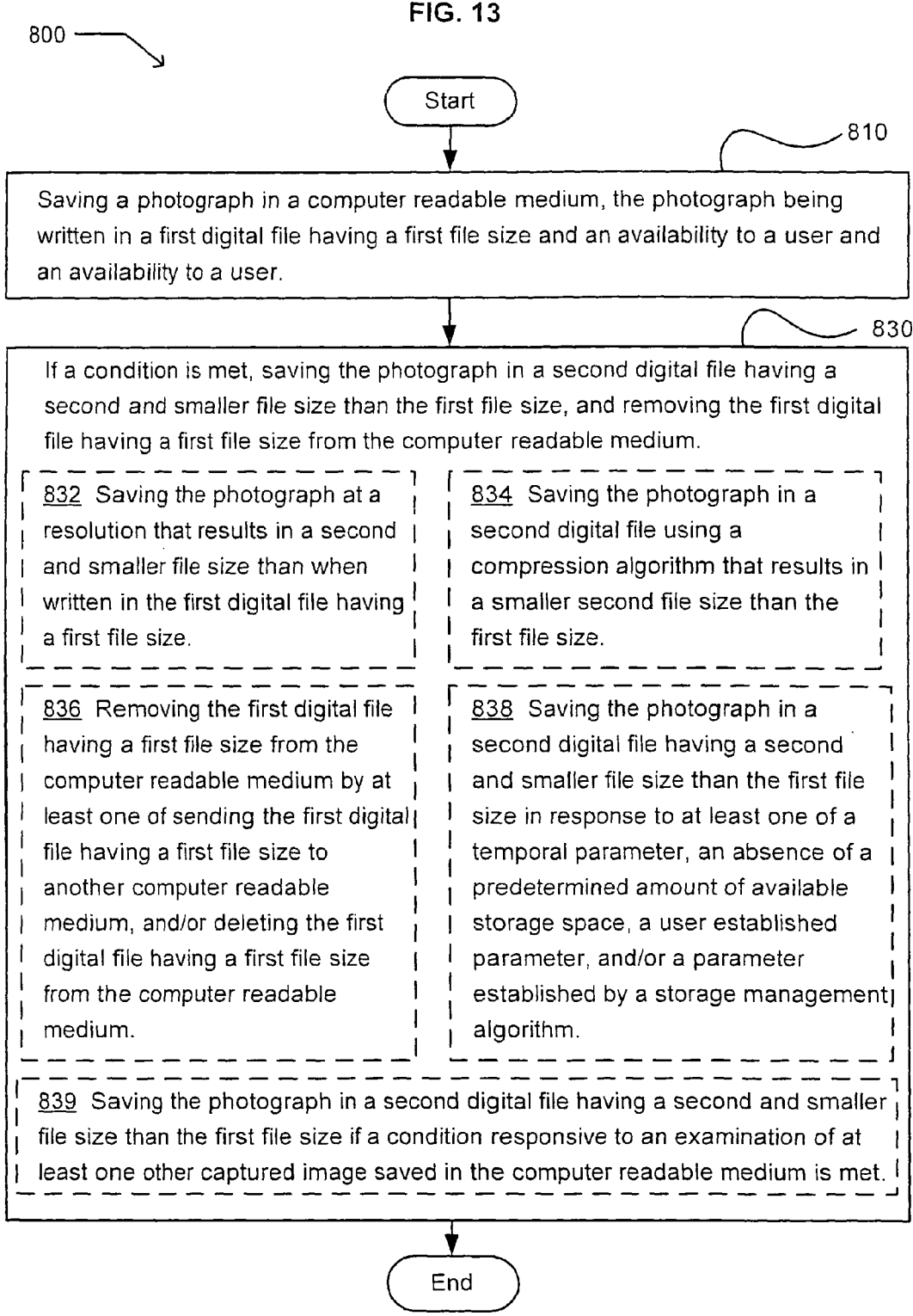
FIG. 13 illustrates an alternative embodiment of the exemplary operational flow of FIG. 11.

FIG. 13 illustrates an alternative embodiment of the exemplary operational flow 800 of FIG. 11. The reduction operation 830 may include at least one additional operation. The at least one additional operation may include an operation 832, an operation 834, and operation 836, an operation 838 and/or an operation 839. The operation 832 saves the photograph at a resolution that results in a second and smaller file size than when written in the first digital file having a first file size. The operation 834 saves the photograph in a second digital file using a compression algorithm that results in a smaller second file size than the first file size. The operation 836 removes the first digital file having a first file size from the computer readable medium by at least one of sending the first digital file having a first file size to another computer readable medium, and/or deleting the first digital file having a first file size from the computer readable medium. For example, the first digital file may be removed from the computer readable medium and sent to another computer readable medium. The another computer readable medium may be permanently or removably associated with an electronic device that is also associated with the computer readable medium, such as a flash memory card or an external hard drive. Alternatively, the another computer readable medium may be permanently or removably associated with another electronic device, such as a computing device or digital camera. The operation 838 saves the photograph in a second digital file having a second and smaller file size than the first file size in response to at least one of a temporal parameter, an absence of a predetermined amount of available storage space, a user established parameter, and/or a parameter established by a storage management algorithm. For example, a temporal parameter may include an elapsed time since the photograph was taken, or last viewed. An absence of a predetermined amount of available storage space may include less than a percentage of the computer readable medium being available for a storage of new data; e.g., less than 10% of a flash memory card being available. Alternatively, the absence of a predetermined amount of available storage space may include less than a preselected storage capacity being available, such as 500 KB, or 1 MB. A storage management algorithm may include an algorithm that characterizes factors that limit the amount of photographs, and alternatively other files, that may be saved on the computer readable medium, and manages the size of at least one of the digital files. The operation 839 saves the photograph in a second digital file having a second and smaller file size than the first file size if a condition responsive to an examination of at least one other captured image saved in the computer readable medium is met.

Figure 14:
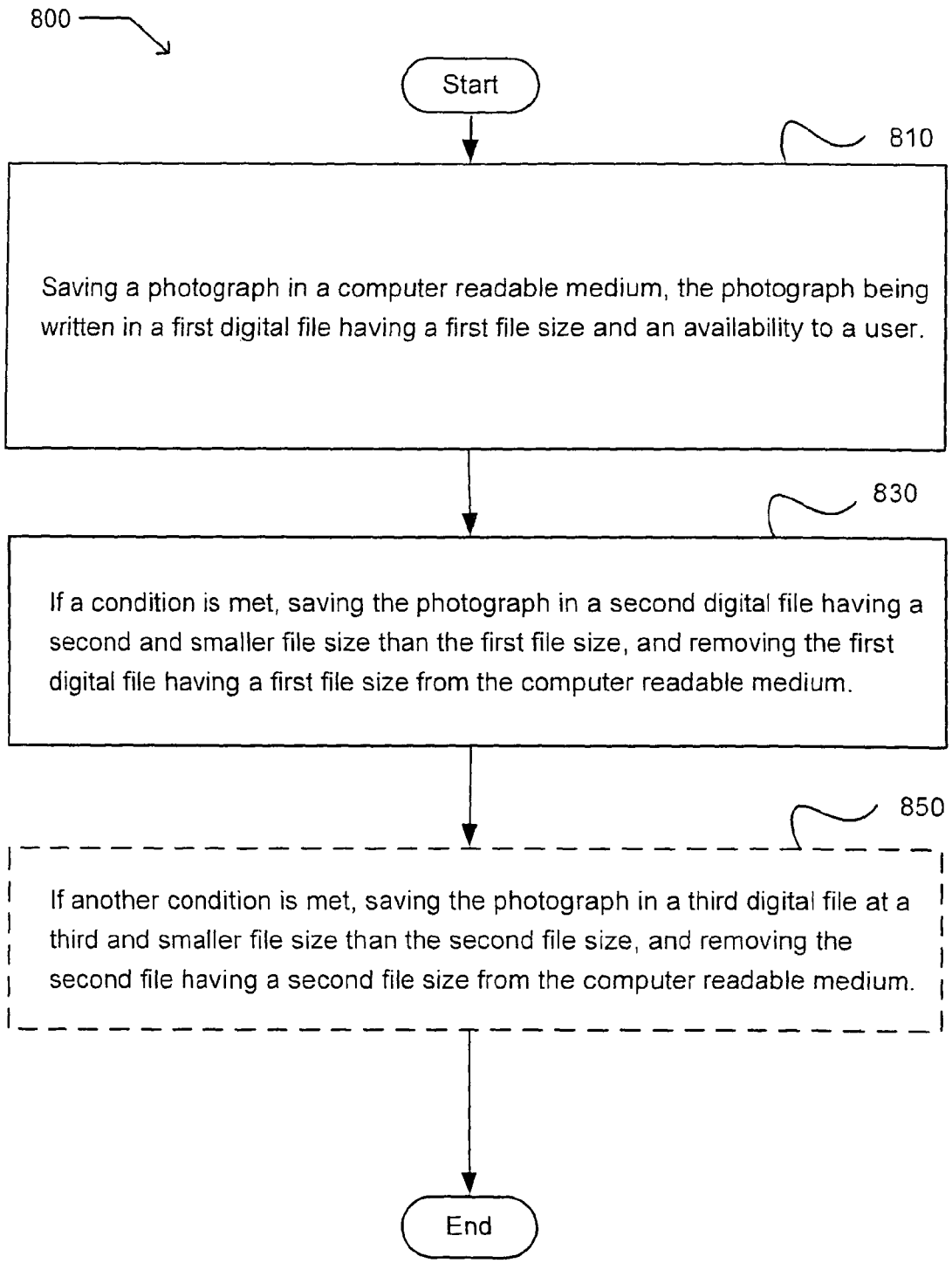
FIG. 14 illustrates another alternative embodiment of the exemplary operational flow of FIG. 11.

FIG. 14 illustrates another alternative embodiment of the exemplary operational flow 800 of FIG. 11. The exemplary operational flow may include at least one additional operation, such as another reduction operation 850. If another condition is met, the another reduction operation saves the photograph in a third digital file at a third and smaller file size than the second file size and removes the second file having a second file size from the computer readable medium.

FIG. 15 illustrates an exemplary operational flow 900. After a start operation, the exemplary operational flow moves to a first storage operation 910. The first storage operation saves a first image at a first resolution of the first image in a user-accessible data structure. A second storage operation 920 saves a second image at a first resolution of the second image in the user-accessible data structure. If a condition is met, a degradation operation 930 saves in the user-accessible data structure the first image at a second resolution of the first image that is a lesser resolution than the first resolution of the first image, and removes from the user-accessible data structure the first image saved at the first resolution of the first image. In an embodiment, the degradation operation 930 may be performed before or after the second storage operation. The operational flow then moves to an end operation.

FIG. 16 illustrates another embodiment of the exemplary operational flow 900 of FIG. 15. The exemplary operational flow may include at least one additional operation. An additional operation may include a third storage operation 940. The third storage operation 940 includes saving in the user-accessible data structure a third image at a first resolution of the third image. If a second condition is met, the third storage operation also includes saving in the user-accessible data structure a third resolution of the first image that is lesser resolution than the second resolution of the first image, and removing from the user-accessible data structure the first image saved at the second resolution of the first image.

FIG. 17 illustrates a further embodiment of the exemplary operational flow 900 of FIG. 15. The exemplary operational flow may include at least one another additional operation. Another additional operation may include another third storage operation 962. If a second condition is met, the another third storage operation includes saving in the user-accessible data structure a third resolution of the first image that is lesser resolution than the second resolution of the first image, and removing from the user-accessible data structure the first image saved at the second resolution of the first image. The operation 962 may include at least one additional operation, such as the operation 964. If a third condition is met, the operation 964 saves in the user-accessible data structure the second image at a second resolution of the second image that is a lesser resolution than first resolution of the second image, and removes from the user-accessible data structure the second image saved at the first resolution of the second image.

FIG. 18 illustrates a further embodiment of the exemplary operational flow 900 of FIG. 15. The exemplary operational flow may include at least one further additional operation. A further additional operation may include an operation 966. If a second condition is met, the operation 966 saves in the user-accessible data structure the first image at a third resolution of the first image that is a lesser resolution than the second resolution of the first image, and removes from the user-accessible data structure the first image saved at the second resolution of the first image. Also if the second condition is met, the operation 966 saves in the user-accessible data structure the second image at a second resolution of the second image that is a lesser resolution than first resolution of the second image, and removing from the user-accessible data structure the second image saved at the first resolution of the second image.

FIG. 19 illustrates another embodiment of the exemplary operational flow 900 of FIG. 15. The exemplary operational flow may include at least one further additional operation. A further additional operation may include an operation 968, which comprises an operation 986A and an operation 968B. At the operation 968A, the saving in a user-accessible data structure a first image at a first resolution of the first image includes saving in a user-accessible data structure a first image of a real-world scene at a first resolution of the first image. At the operation 968B, saving in the user-accessible data structure a second image at a first resolution of the second image includes saving in the user-accessible data structure a second image of a real-world scene at a first resolution of the second image.

FIGS. 20A-D illustrates an embodiment 870 of the exemplary operational flow 800 of FIG. 16. The embodiment 870 of the exemplary operational flow 800 is described using the exemplary system 300 and digital camera 310 of FIG. 3 as an example. In operation of an embodiment of the digital camera 310, a user may compose a first picture/image by orientating the lens 360 toward a subject in a first scene. The user may communicate their preferences about the first composed picture to the digital camera using elements of the user interface 370. Upon shutter activation, an imaging chip of the image acquisition module 320 generates electrical signals corresponding to the first picture/image in a raw format. A processing unit 350 and/or an image management module 330 of the digital camera decodes and/or processes the first image in the raw format into a format, such as a JPEG format, a GIF format, a TIFF format, or a PDF format. The decoding and/or processing typically involves the system memory 355 of FIG. 3. The image management module 330 then saves the first image 972 in a post-decoded/processed format, such as the JPEG format, at a first resolution of the first image in a user-accessible data structure, illustrated as the user-accessible data structure 340 of FIG. 3. FIG. 20A illustrates the first image in the post-decoded/processed format saved in a file at a first resolution of the first image in the user-accessible data structure 980, such as the JPEG format. In an alternative embodiment, the first image may be saved in a raw format in the user-accessible data structure.

For a second image, the user may compose a second picture/image by orientating the lens 360 toward a subject in a second scene as above. The image management module 330 saves the second image 974 at a first resolution of the second image in the computer readable medium 980. FIG. 20A illustrates the second image in a post-decoded/processed format in a saved file at a first resolution of the second image in the user-accessible data structure, such as a JPEG format.

FIG. 20B further illustrates an embodiment that may be implemented at any time, such as before the second image is saved at a first resolution of the second image or thereafter. If a first condition is met, the first image 972 is saved in the user-accessible data structure 980 at a second resolution of the first image that is a lesser resolution than the first resolution of the first image. Also if the first condition is met, the first image saved at the first resolution of the first image is removed from the user-accessible data structure. The first condition may include any condition described in this document. An exemplary first condition may include an absence of a predetermined amount of available storage space in the user-accessible data structure.

For a third image, the user may compose a third picture/image by orientating the lens 360 toward a subject in a third scene as above. The image management module 330 saves the third image 976 at a first resolution of the third image in the computer readable medium 980. FIG. 20C illustrates the third image in a post-decoded/processed format in a saved file at a first resolution of the third image in the user-accessible data structure, such as a JPEG format.

FIG. 20D illustrates an embodiment that may be implemented at any time, such as before the third image 976 is saved at a first resolution of the third image or thereafter. If a second condition is met, the first image 972 is saved in the user-accessible data structure 980 at a third resolution of the first image that is a lesser resolution than the second resolution of the first image. Also if the first condition is met, the first image saved at the second resolution of the first image is removed from the user-accessible data structure. The second condition may include any condition described in this document.

FIG. 20D also illustrates another embodiment that may be implemented at any time, such as before the third image 976 is saved at a first resolution of the third image or thereafter. If a third condition is met, the second image 974 is saved in the user-accessible data structure 980 at a second resolution of the second image that is a lesser resolution than the first resolution of the second image. Also if the second condition is met, the second image saved at the second resolution of the second image is removed from the user-accessible data structure. The second condition may include any condition described in this document.

In an embodiment, the first image 972, the second image 974, and/or the third image 976 may be saved in a digital photo album of images and/or a collection of digital images 985 in the user-accessible data structure. In another embodiment, the first image 972, the second image 974, and/or the third image 976 may be received from a source that may or may not have captured the images. These received images may be saved and managed as described in conjunction with FIGS. 16-19.

Figure 21:
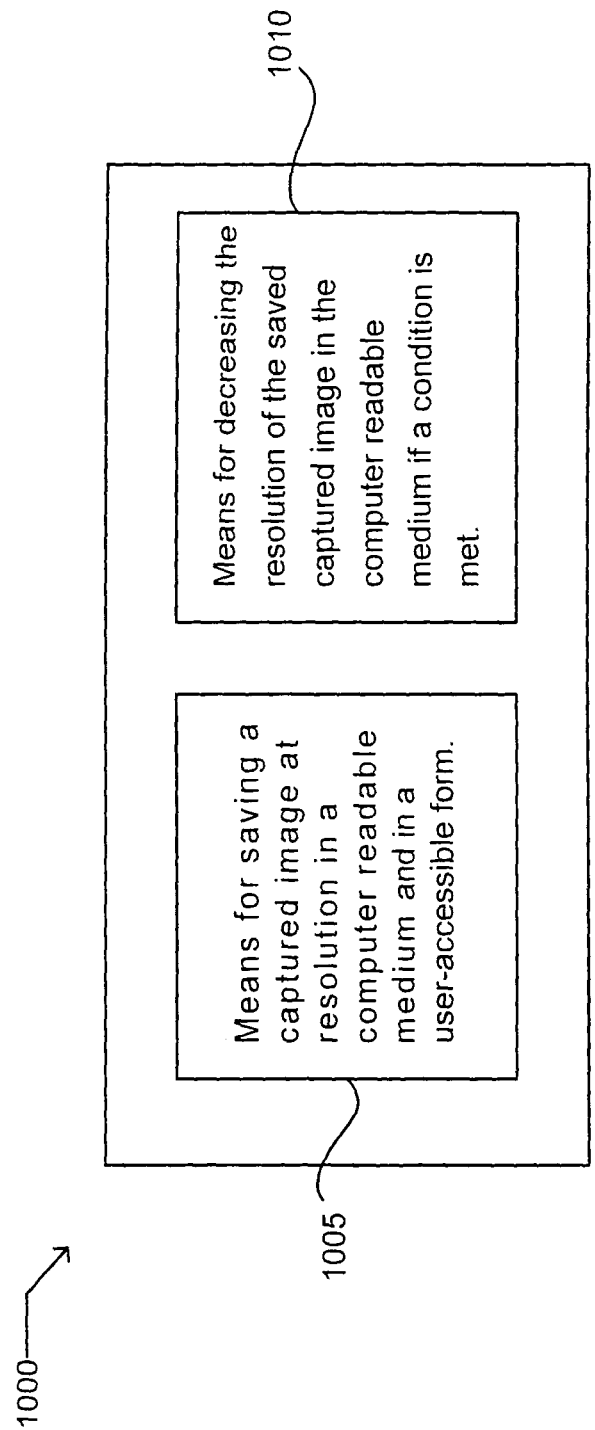
FIG. 21 illustrates an exemplary device in which embodiments may be implemented.

FIG. 21 illustrates an exemplary device 1000 in which embodiments may be implemented. The exemplary device includes means 1005 for saving a captured image at resolution in a computer readable medium and in a user-accessible form. The exemplary device 1010 also includes means 1010 for decreasing the resolution of the saved captured image in the computer readable medium if a condition is met.

Figure 22:
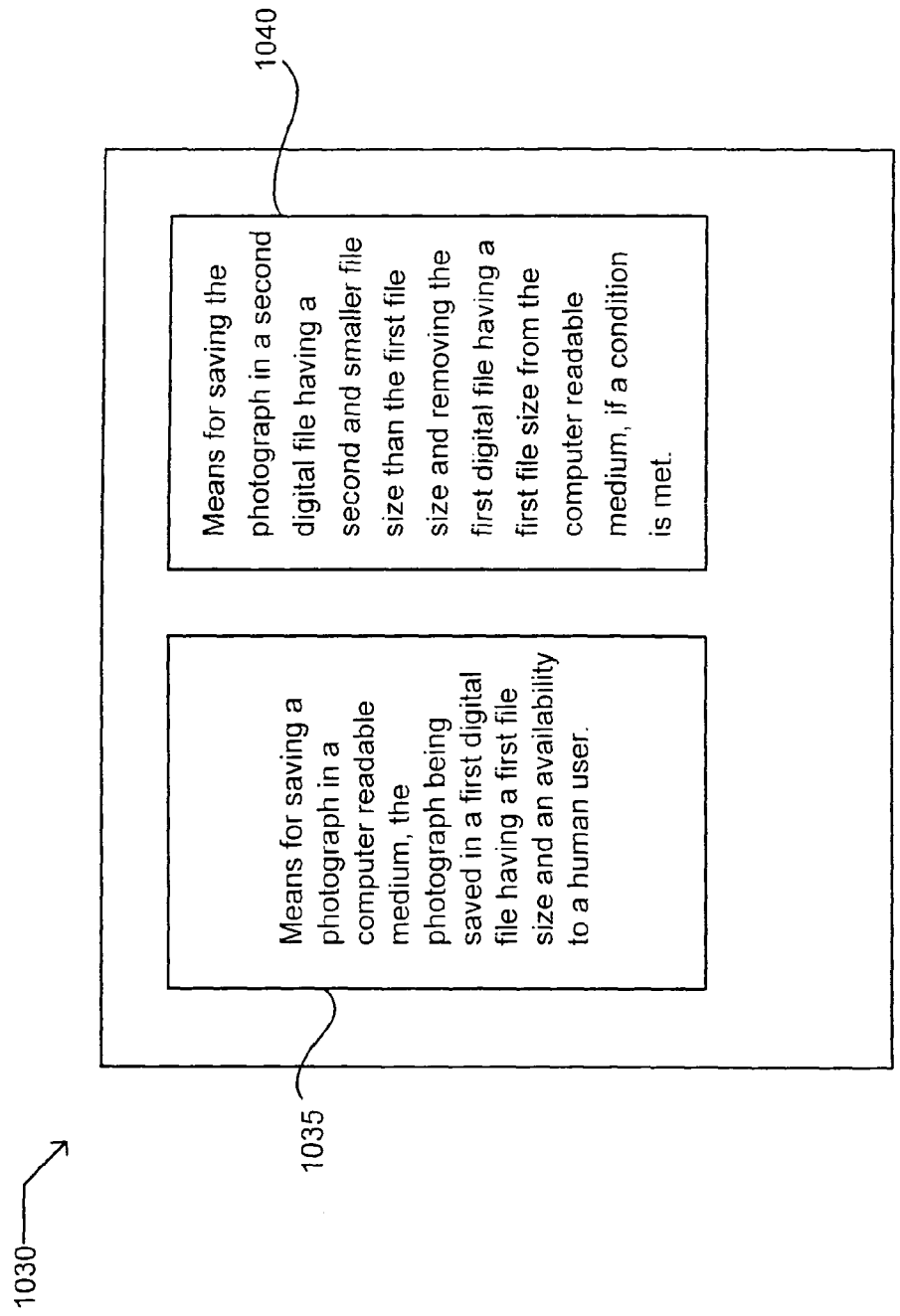
FIG. 22 illustrates another exemplary device in which embodiments may be implemented.

FIG. 22 illustrates another exemplary device 1030 in which embodiments may be implemented. The exemplary device includes means 1035 for saving a photograph in a computer readable medium, the photograph being saved in a first digital file having a first file size and availability to a human user. The exemplary device also includes means 1040 for saving the photograph in a second digital file having a second and smaller file size than the first file size and removing the first digital file having a first file size from the computer readable medium, if a condition is met.

Figure 23:
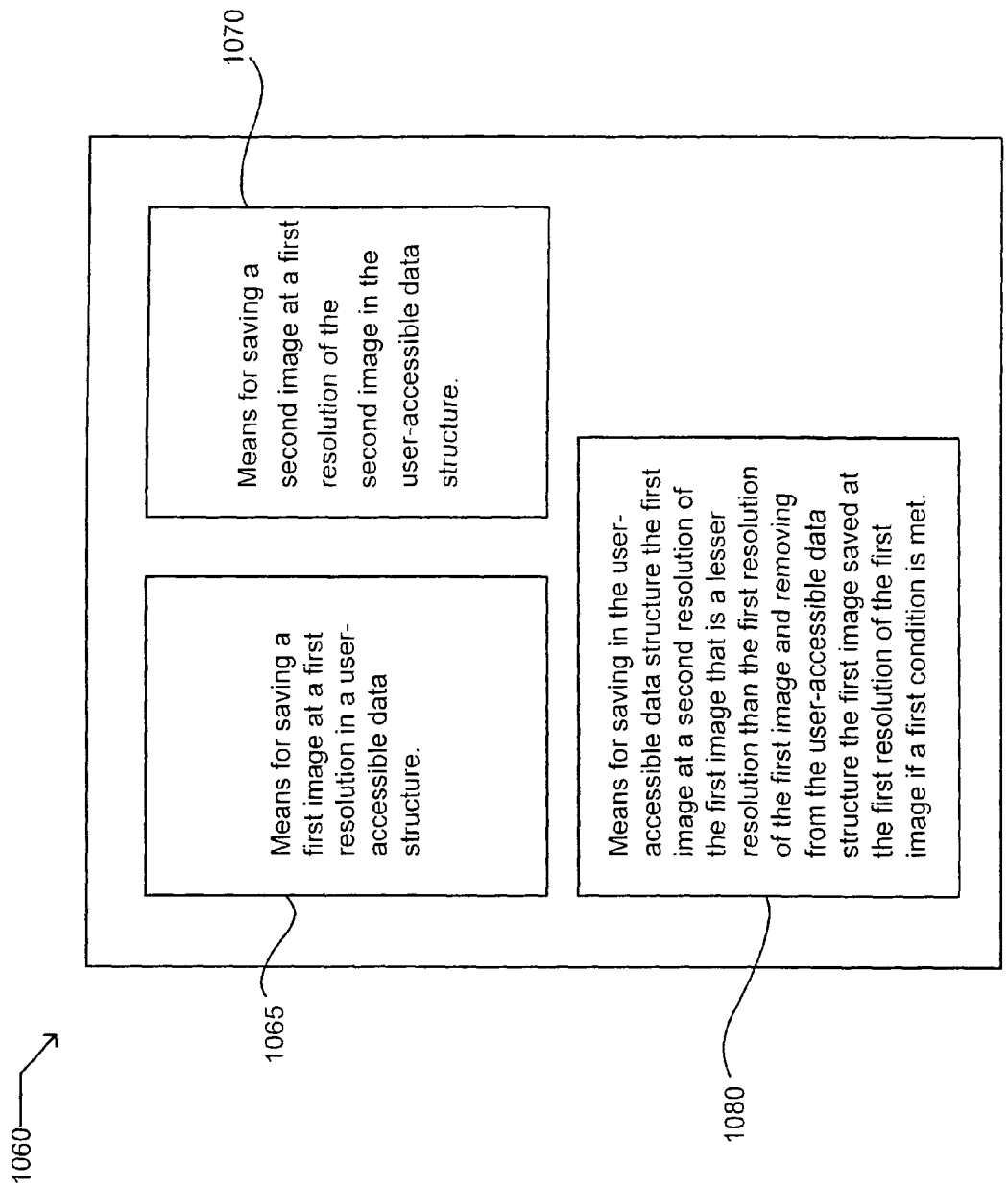
FIG. 23 illustrates a further exemplary device in which embodiments may be implemented.

FIG. 23 illustrates a further exemplary device 1060 in which embodiments may be implemented. The exemplary device includes means 1065 for saving a first image at a first resolution in a user-accessible data structure. The exemplary device also includes means 1070 for saving a second image at a first resolution of the second image in the user-accessible data structure. The exemplary device further includes means 1080 for saving in the user-accessible data structure the first image at a second resolution of the first image that is a lesser resolution than the first resolution of the first image and removing from the user-accessible data structure the first image saved at the first resolution of the first image if a first condition is met.

Figure 24:
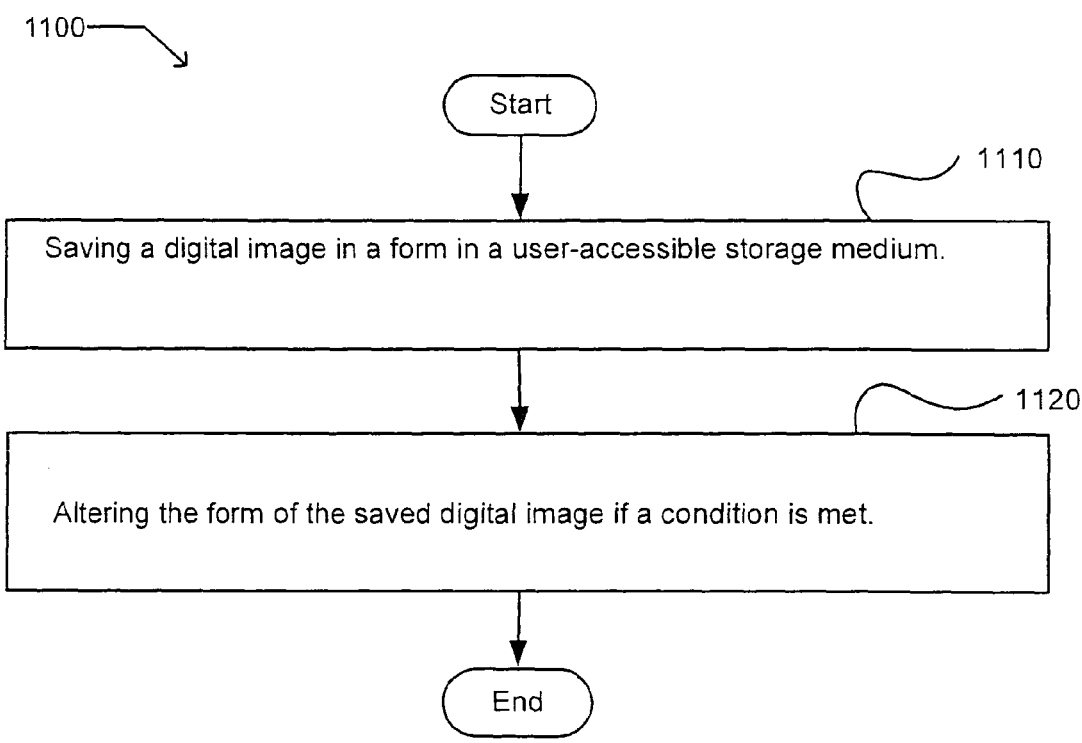
FIG. 24 illustrates an exemplary operational flow in which embodiments may be implemented.

FIG. 24 illustrates an exemplary operational flow 1100 in which embodiments may be implemented. After a start operation, the exemplary operational flow moves to a hold operation 1110. The hold operation saves a digital image in a form in a user-accessible storage medium. A change operation 1120 alters the form of the saved digital image if a condition is met. The operational flow then proceeds to an end operation.

Figure 25:
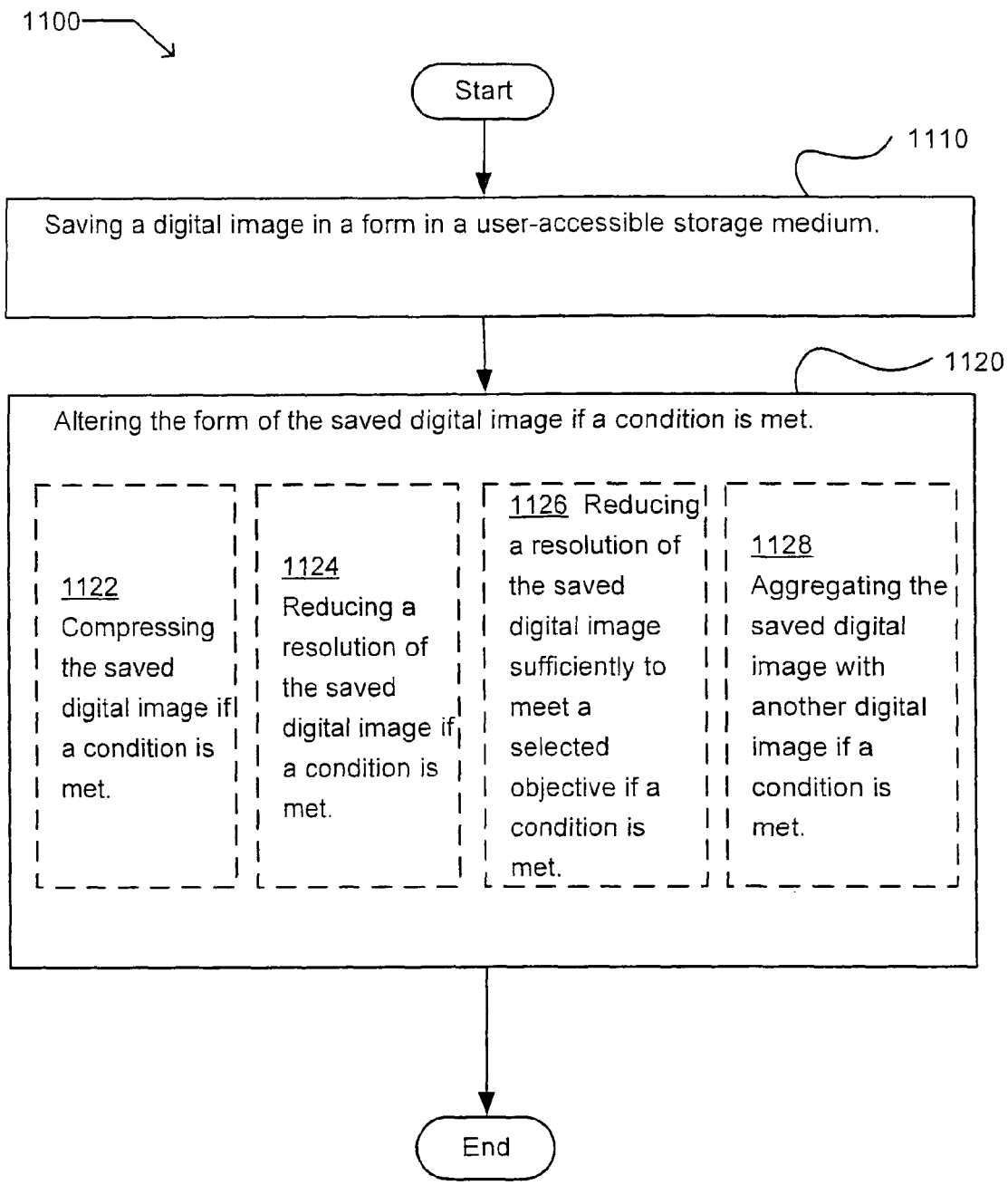
FIG. 25 illustrates an alternative embodiment of the exemplary operational flow of FIG. 24.

FIG. 25 illustrates an alternative embodiment of the exemplary operational flow 1100 of FIG. 24. The change operation 1120 may include at least one additional operation. The at least one additional operation may include an operation 1122, an operation 1124, an operation 1126, and/or an operation 1128. If a condition is met, the operation 1122 compresses the saved digital image. If a condition is met, the operation 1124 reduces a resolution of the saved digital image. If a condition is met, the operation 1126 reduces a resolution of the saved digital image sufficiently to meet a selected objective. For example, the selected objective may include a preselected objective or a substantially contemporaneously selected objective. By way of another example, a selected objective may include constructing a panorama that includes the digital image, creating a high dynamic range composite that includes the digital image, and/or a selected depth of field. If a condition is met, the operation 1128 aggregates the saved digital image with another digital image.

Figure 26:
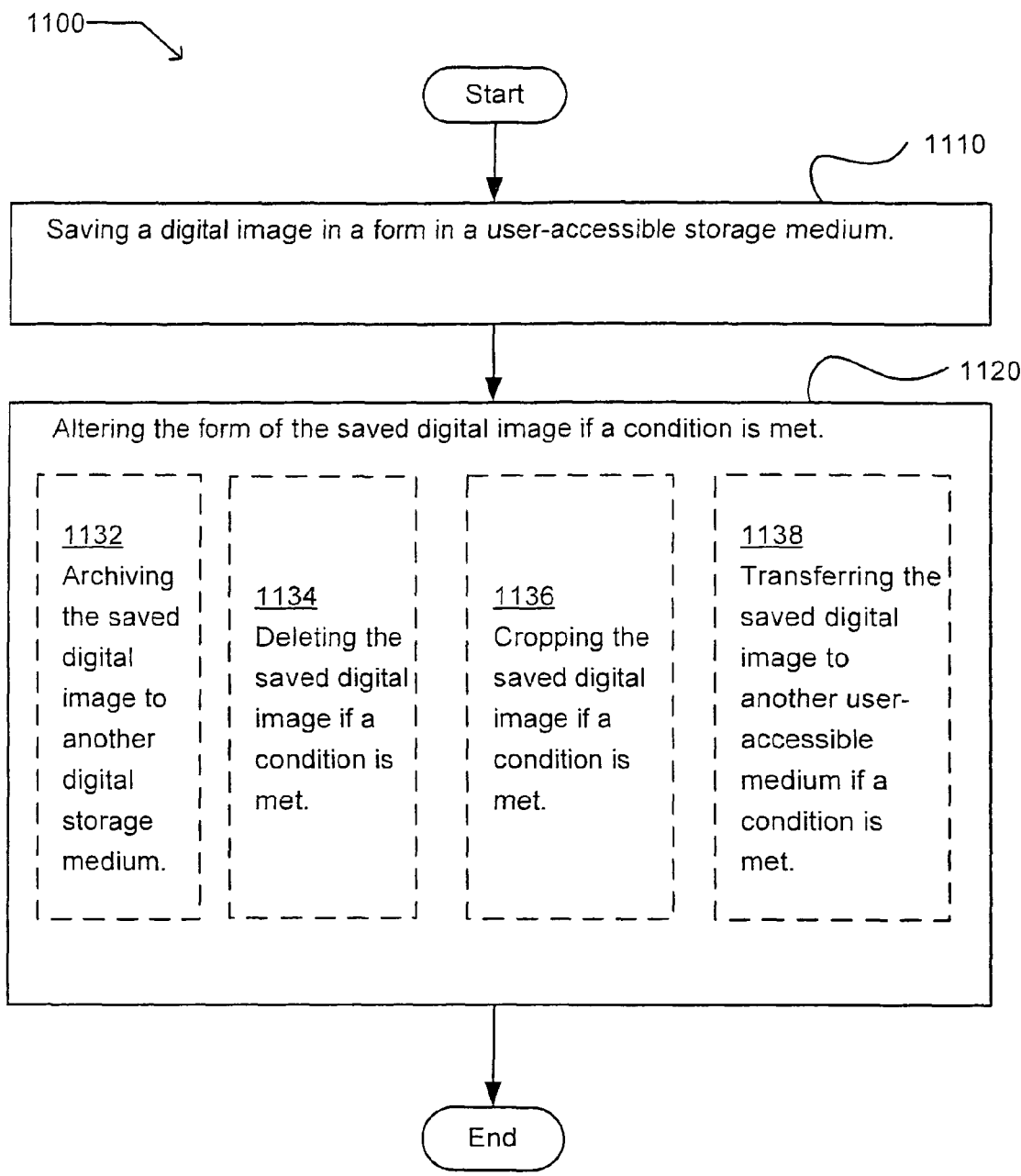
FIG. 26 illustrates another alternative embodiment of the exemplary operational flow of FIG. 24.

FIG. 26 illustrates another alternative embodiment of the exemplary operational flow 1100 of FIG. 24. The change operation 1120 may include at least one additional operation. The at least one additional operation may include an operation 1132, an operation 1134, an operation 1136, and/or an operation 1138. If a condition is met, the operation 1132 archives the saved digital image to another user-accessible storage medium. If a condition is met, the operation 1134 deletes the saved digital image. If a condition is met, the operation 1136 crops the saved digital image. If a condition is met, the operation 1138 transfers the saved digital image to another user-accessible storage medium.

Figure 27:
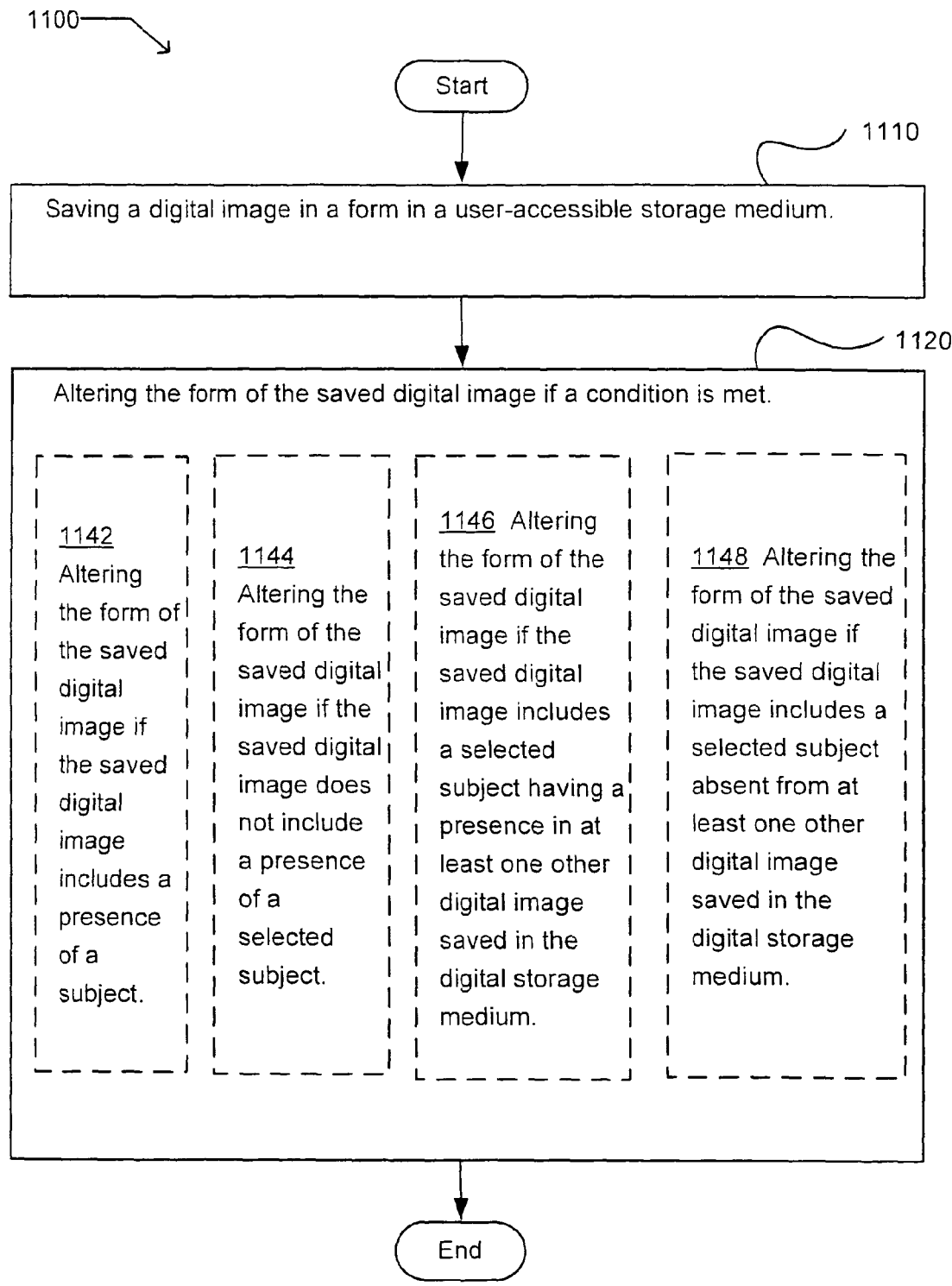
FIG. 27 illustrates a further alternative embodiment of the exemplary operational flow of FIG. 24.

FIG. 27 illustrates a further alternative embodiment of the exemplary operational flow 1100 of FIG. 24. The change operation 1120 may include at least one additional operation. The at least one additional operation may include an operation 1142, an operation 1144, an operation 1146, and/or an operation 1148. If a condition is met, the operation 1142 alters the form of the saved digital image if the saved digital image includes a presence of a selected subject. If a condition is met, the operation 1144 alters the form of the saved digital image if the saved digital image does not include a presence of a selected subject. If a condition is met, the operation 1146 alters the form of the saved digital image if the saved digital image includes a presence of a selected subject having a presence in at least one other digital image saved in the user-accessible storage medium. For example, a presence of a selected subject may include a selected frequency of a presence of a selected subject. If a condition is met, the operation 1148 alters the form of the saved digital image if the saved digital image includes a selected subject absent from at least one other digital image saved in the user-accessible storage medium.

Figure 28:
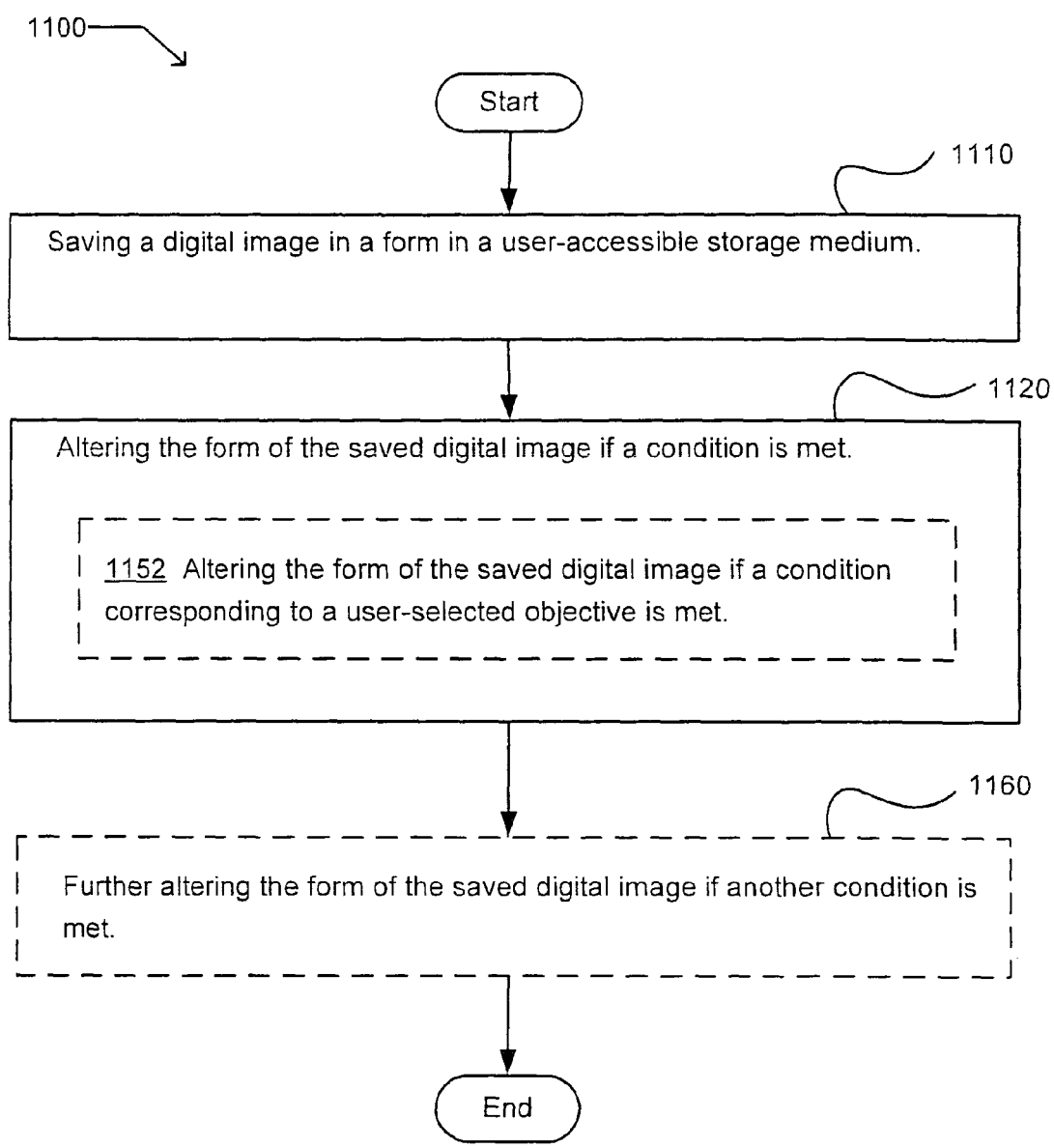
FIG. 28 illustrates an alternative embodiment of the exemplary operational flow of FIG. 24.

FIG. 28 illustrates an alternative embodiment of the exemplary operational flow 1100 of FIG. 24. The change operation 1120 may include at least one additional operation, such as the operation 1152. If a condition is met, the operation 1152 alters the form of the saved digital image if a condition corresponding to a user-selected objective. For example, a user-selected objective may include limiting saved images of my cat in an album or in the computer readable medium to X saved images, and/or saving the digital image to a contact sheet of exemplars and/or thumbnail display if more than Y pictures of subject Z are saved in the computer readable medium. The operational flow 1100 may include at least one additional operation, such as the operation 1160. If a condition is met, the operation 1160 further alters the form of the saved digital image.

Figure 29:
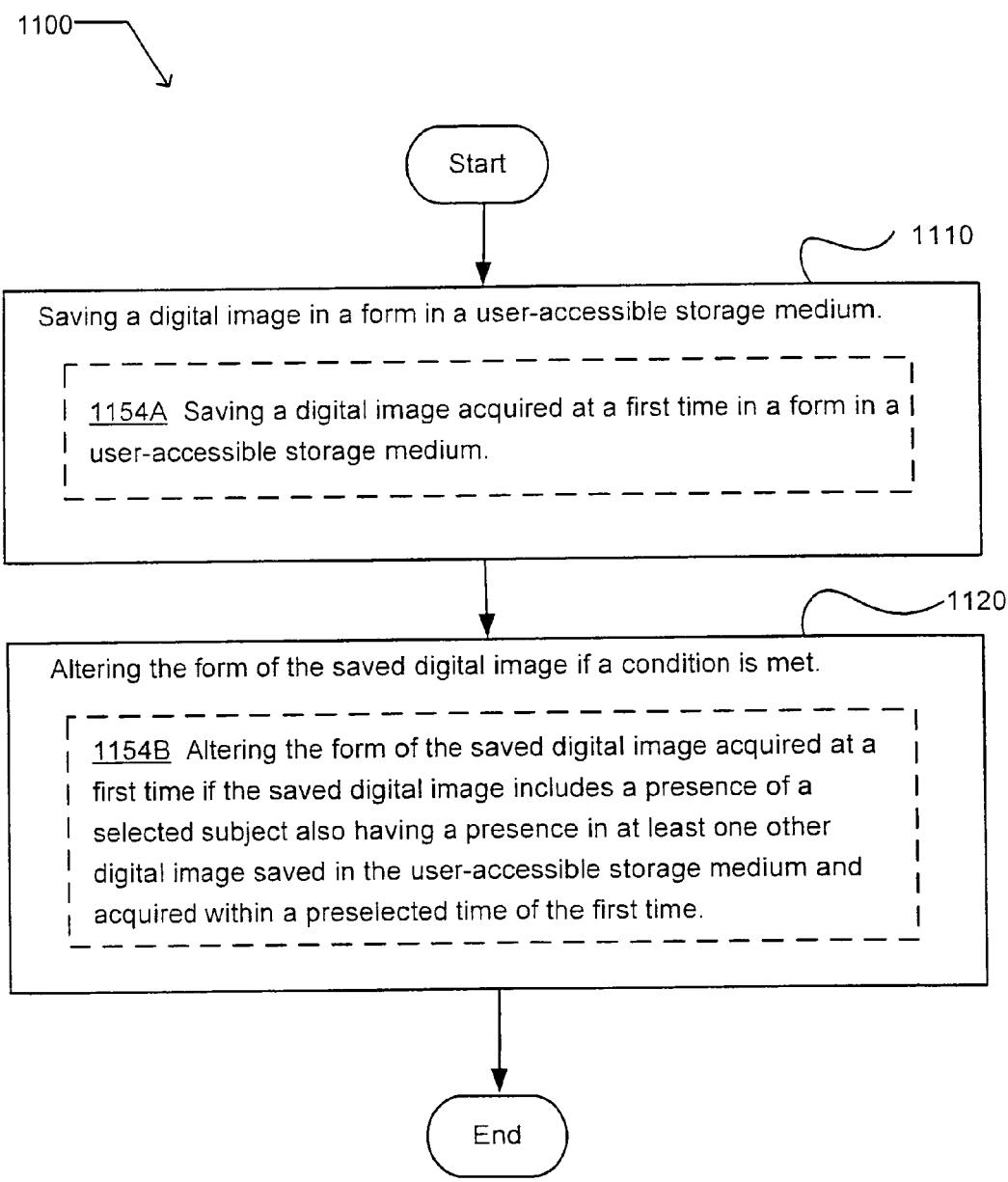
FIG. 29 illustrates an alternative embodiment of the exemplary operational flow of FIG. 24.

FIG. 29 illustrates an alternative embodiment of the exemplary operational flow 1100 of FIG. 24. An additional operation may include an operation 1154, which comprises an operation 1154A and an operation 1154B. At the operation 1154A, the saving a digital image in a form in a user-accessible storage medium includes saving a digital image acquired at a first time in a form in a user-accessible storage medium. The digital image acquired at a first time may include a digital image captured at a first time or a digital image saved at a first time. At the operation 1154B, the altering the form of the saved digital image if a condition is met includes altering the form of the saved digital image acquired at a first time if the saved digital image includes a presence of a selected subject also having a presence in at least one other digital image saved in the user-accessible storage medium and acquired within a preselected time of the first time.

Figure 30:
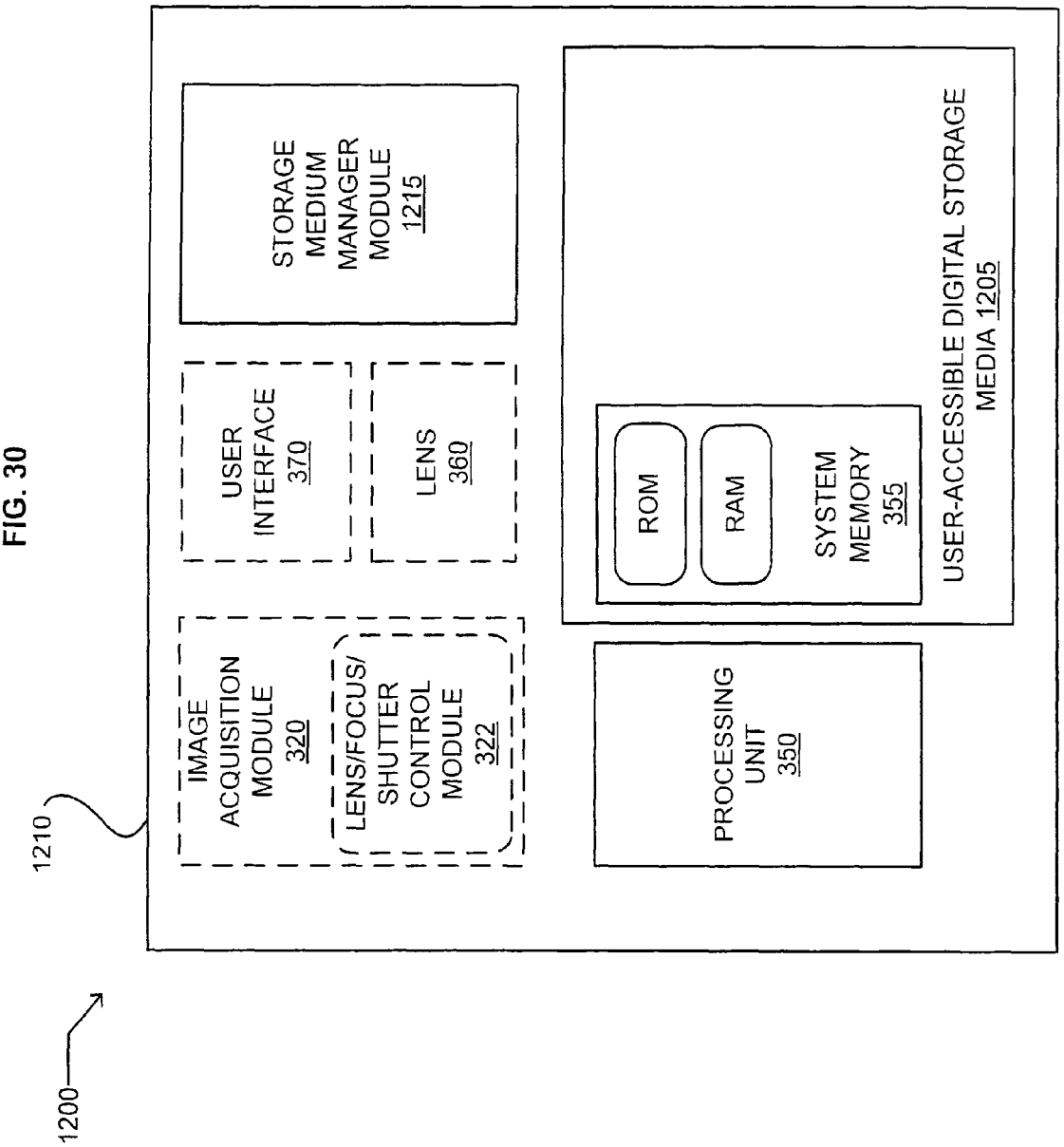
FIG. 30 illustrates an exemplary system in which embodiments may be implemented.

FIG. 30 illustrates an exemplary system 1200 in which embodiments may be implemented. The exemplary system includes a device 1210. The device includes a processing unit, such as the processing unit 350 of FIG. 3, a system memory, such as the system memory 355 of FIG. 3, a storage medium manager module 1230, and a user-accessible digital storage medium, illustrated as the user-accessible digital storage media 1240. In an alternative embodiment, the device may include an image acquisition module, such as the image acquisition module 320 of FIG. 3; a lens, such as the lens 360 of FIG. 3; and/or a user interface, such as the user interface 370 of FIG. 3.

The storage medium manager module 1230 is operable to save a digital image in a form in the user-accessible digital storage medium 1240. The storage medium manager module is also operable to alter the form of the saved digital image if a condition is met. The condition may include at least one of clarifying condition, a user-defined condition, an informed condition, an evaluated condition, and/or a computed condition. An informed condition may include a condition that employs obtained information, in contrast to a condition running autonomously or an uninformed condition. An evaluated condition may include a condition evaluated in response to an internal condition, an external condition, and/or both conditions. A computed condition may include any computed condition, in contrast with a standing condition and/or a normal or native condition related to the digital image and/or the storage medium.

In an embodiment, the storage medium manager module 1230 operable to save a digital image in a form in the user-accessible digital storage medium 1240 includes a storage medium manager module operable to save a digital image of a real-world event in a form in the user-accessible digital storage medium. In another embodiment, the user-accessible digital storage medium includes a user-accessible digital storage medium associated with a digital camera operable to capture the digital image. In a further embodiment, the device 1210 further includes the processing unit 350, In another embodiment, the storage medium manager module further includes a storage medium manager module operable to provide the altered form of the saved digital image.

An embodiment provides a computer program product. The computer program product includes a computer-readable signal-bearing medium bearing program instructions. The program instructions include instructions operable to perform a process in a computing device. The process includes saving a digital image in a form in a user-accessible storage medium, and altering the form of the saved digital image if a condition is met. The computer-readable signal-bearing medium bearing the program instructions may include a computer-storage medium bearing the program instructions. The computer-readable signal-bearing medium bearing the program instructions may include a communications medium bearing the program instructions.

Another embodiment provides a device. The device includes means for saving a digital image in a form in the digital storage medium. The device also includes means for altering the form of the saved digital image if a condition is met.

A further embodiment provides a method. The method includes saving a captured image in a user-accessible memory. The method also includes deallocating at least a portion of the user-accessible memory associated with the saved captured image if a condition is met. In an embodiment, the saving a captured image into a user-accessible memory includes saving a captured image at a resolution into a user-accessible memory. In another embodiment, the deallocating at least a portion of the user-accessible memory associated with the saved captured image if a condition is met includes deallocating at least a portion of the user-accessible memory associated with the saved captured image if a condition is met. In a further embodiment, the deallocating at least a portion of the user-accessible memory associated with the saved captured image if a condition is met includes deallocating at least a portion of the user-accessible memory associated with the saved captured image if a condition is met that includes at least one of a clarifying condition, a user-defined condition, an informed condition, an evaluated condition, and/or a computed condition.

An embodiment provides a device. The device includes a memory and a memory manager. The memory manager includes operability to save a captured image into a user-accessible memory. The memory manager also includes operability to deallocate at least a portion of the memory associated with the resolution if a condition is met.

Another embodiment provides a device. The device includes first means for a holding user-accessible digital data representative of an image. The device also includes second means for saving user-accessible digital data representative of an image in the first means. The device further includes third means for altering the saved user-accessible digital data representative of the saved digital image if a condition is met.

A further embodiment provides a computer program product. The computer program product includes a computer-readable signal-bearing medium bearing program instructions. The program instructions are operable to perform a process in a computing device. The process includes saving a captured image in a memory and in a user-accessible form. The process also includes deallocating at least a portion of the memory associated with the saved captured image if a condition is met. The computer-readable signal-bearing medium bearing the program instructions may include a computer-storage medium bearing the program instructions. The computer-readable signal-bearing medium bearing the program instructions may include a communications medium bearing the program instructions.

An embodiment provides a method. The method includes directing digital data representative of an image to a managed means for holding the digital data representative of an image. The method also includes accepting modified digital data representative of the image, the digital data representative of the image having been modified by deallocating at least a portion of the digital data representative of the image by the managed means for holding digital data upon occurrence of a condition.

Figure 31:
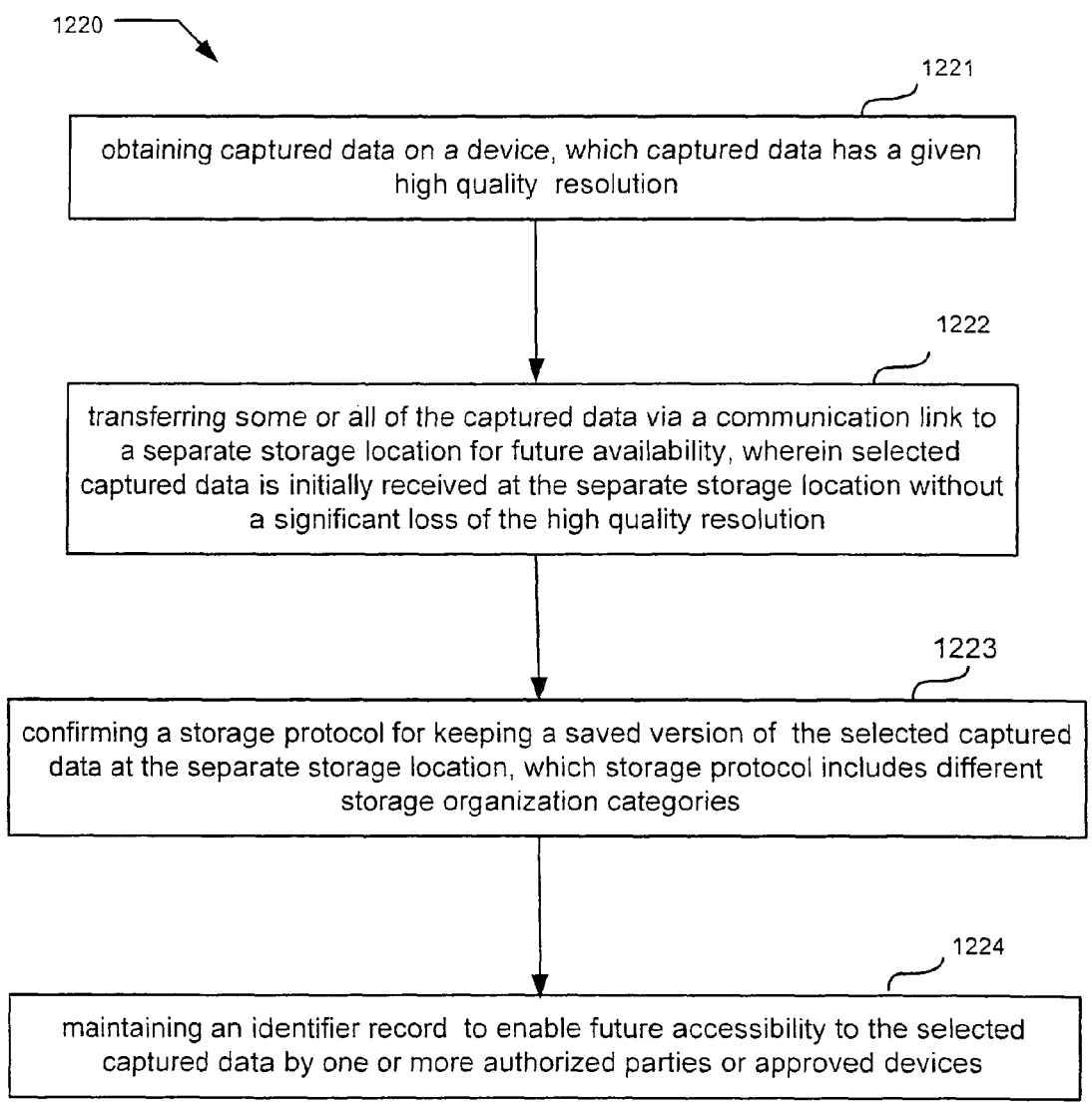
FIG. 31 is a high level flow chart showing an exemplary data storage access embodiment.

Referring to an exemplary high level embodiment 1220 shown in FIG. 31, process components may include obtaining captured data on a device, which captured data has a given high quality resolution (block 1221); transferring some or all of the captured data via a communication link to a separate storage location for future availability, wherein selected captured data is initially received at the separate storage location without a significant loss of the high quality resolution (block 1222); confirming a storage protocol for keeping a saved version of the selected captured data at the separate storage location, which storage protocol includes different storage organization categories (block 1223); and maintaining an identifier record to enable future accessibility to the selected captured data by one or more authorized parties or approved devices (block 1224).

Figure 32:
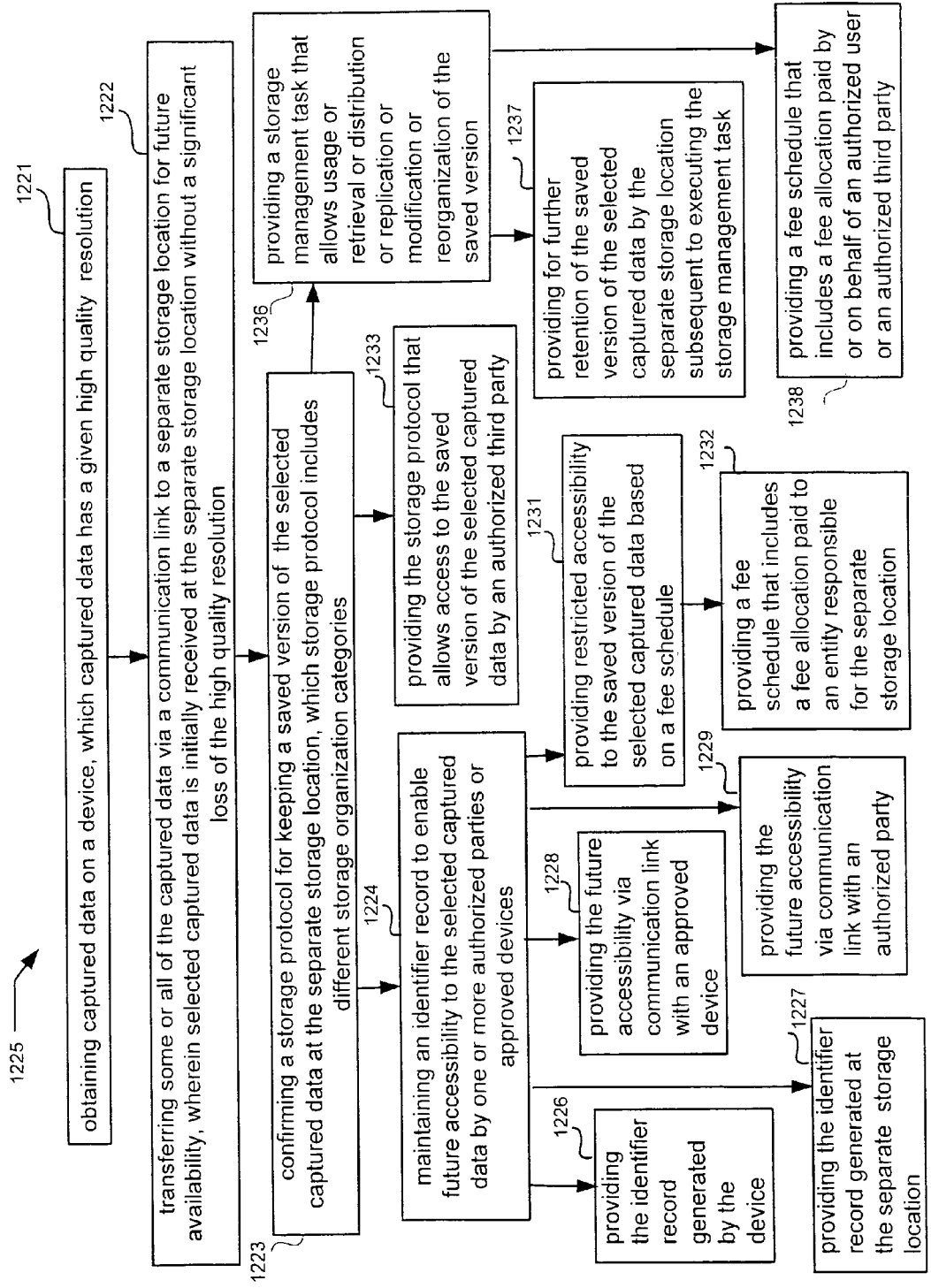
FIGS. 32-41 are more detailed flow charts illustrating further exemplary embodiments.

The flow chart of FIG. 32 discloses additional exemplary embodiments 1225 which may include previously described process features 1221, 1222, 1223, 1224 along with possible attributes relating to the identifier record. For example, an implementation may include providing the identifier record generated by the device (block 1226), and in some instances providing the identifier record generated at the separate storage location (block 1227).

Additional features may include providing the future accessibility via a communication link with an approved device (block 1228), and providing the future accessibility via a communication link with an authorized party (block 1229). Further features may include providing restricted accessibility to the saved version of the selected captured data based on a fee schedule (block 1231) and providing a fee schedule that includes a fee allocation paid to an entity responsible for the separate storage location (block 1232).

Some implementations may provide a storage protocol that allows access to the saved version of the selected captured data by an authorized third party (block 1233). Other possible features may include providing a storage management task that allows usage or retrieval or distribution or replication or modification or reorganization of the saved version of the selected captured data (block 1236), providing for further retention of the saved version of the selected captured data by the separate storage location subsequent to executing the storage management task (block 1237), and providing a fee schedule that includes a fee allocation paid by or on behalf of an authorized user or an authorized third party (block 1238).

Figure 33:
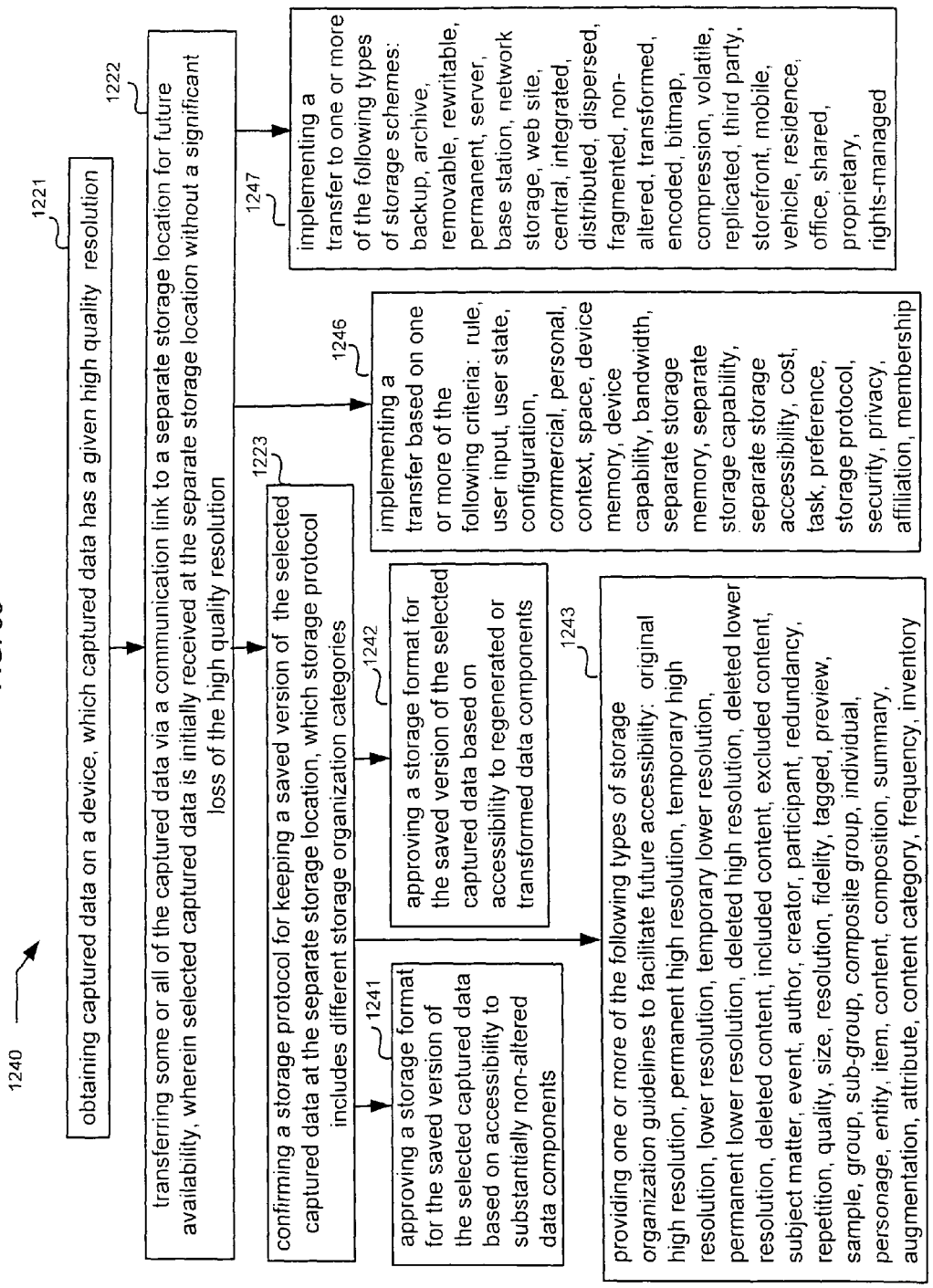

Referring to detailed embodiments 1240 shown in FIG. 33, other embodiments may include previously described process components 1221, 1222, 1223 along with providing one or more of the following types of storage organization guidelines to facilitate future accessibility: original high resolution, permanent high resolution, temporary high resolution, lower resolution, temporary lower resolution, permanent lower resolution, deleted high resolution, deleted lower resolution, deleted content, included content, excluded content, subject matter, event, author, creator, participant, redundancy, repetition, quality, size, resolution, fidelity, tagged, preview, sample, group, sub-group, composite group, individual, personage, entity, item, content, composition, summary, augmentation, attribute, content category, frequency, and inventory (block 1243).

Additional aspects may include approving a storage format for the saved version of the selected captured data based on accessibility to substantially non-altered data components (block 1241), and in some instances accessibility to regenerated or transformed data components (block 1242).

Further possible aspects shown in FIG. 33 may include implementing a transfer based on one or more of the following criteria: rule, user input, user state, configuration, commercial, personal, context, space, device memory, device capability, bandwidth, separate storage memory, separate storage capability, separate storage accessibility, cost, task, preference, storage protocol, security, privacy, affiliation, and membership (block 1246).

Another feature may include implementing a transfer to one or more of the following types of storage schemes: backup, archive, removable, rewritable, permanent, server, base station, network storage, web site, central, integrated, distributed, dispersed, fragmented, non-altered, transformed, encoded, bitmap, compression, volatile, replicated, third party, storefront, mobile, vehicle, residence, office, shared, proprietary, and rights-managed (block 1247).

Figure 34:
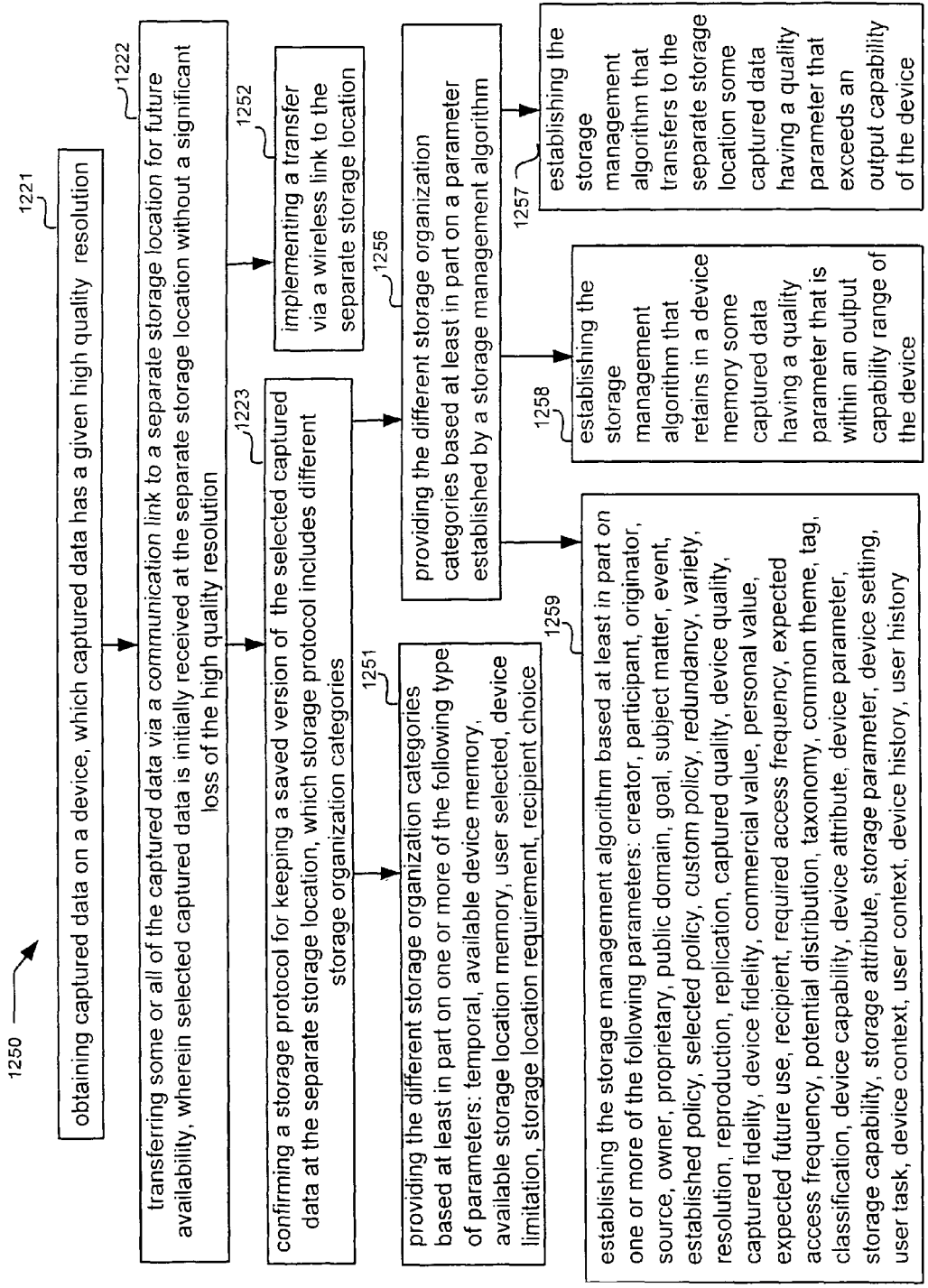

The embodiments 1250 of FIG. 34 may include previously disclosed features 1221, 1222, 1223 in combination with related aspects concerning the storage protocol. For example, a possible aspect may include providing the different storage organization categories based at least in part on one or more of the following type of parameters: temporal, available device memory, available storage location memory, user selected, device limitation, storage location requirement, and recipient choice (block 1251).

Another process features may include implementing a transfer via a wireless link to the separate storage location (block 1252). Further aspects may include providing the different storage organization categories based at least in part on a parameter established by a storage management algorithm (block 1256). Related possible aspects may establish the storage management algorithm that retains in a device memory some captured data having a quality parameter that is within an output capability range of the device (block 1258), and in some instance may establish the storage management algorithm that transfers to the separate storage location some captured data having a quality parameter that exceeds an output capability of the device (block 1257).

Another possible feature includes establishing the storage management algorithm based at least in part on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, and user history (block 1259).

Figure 35:
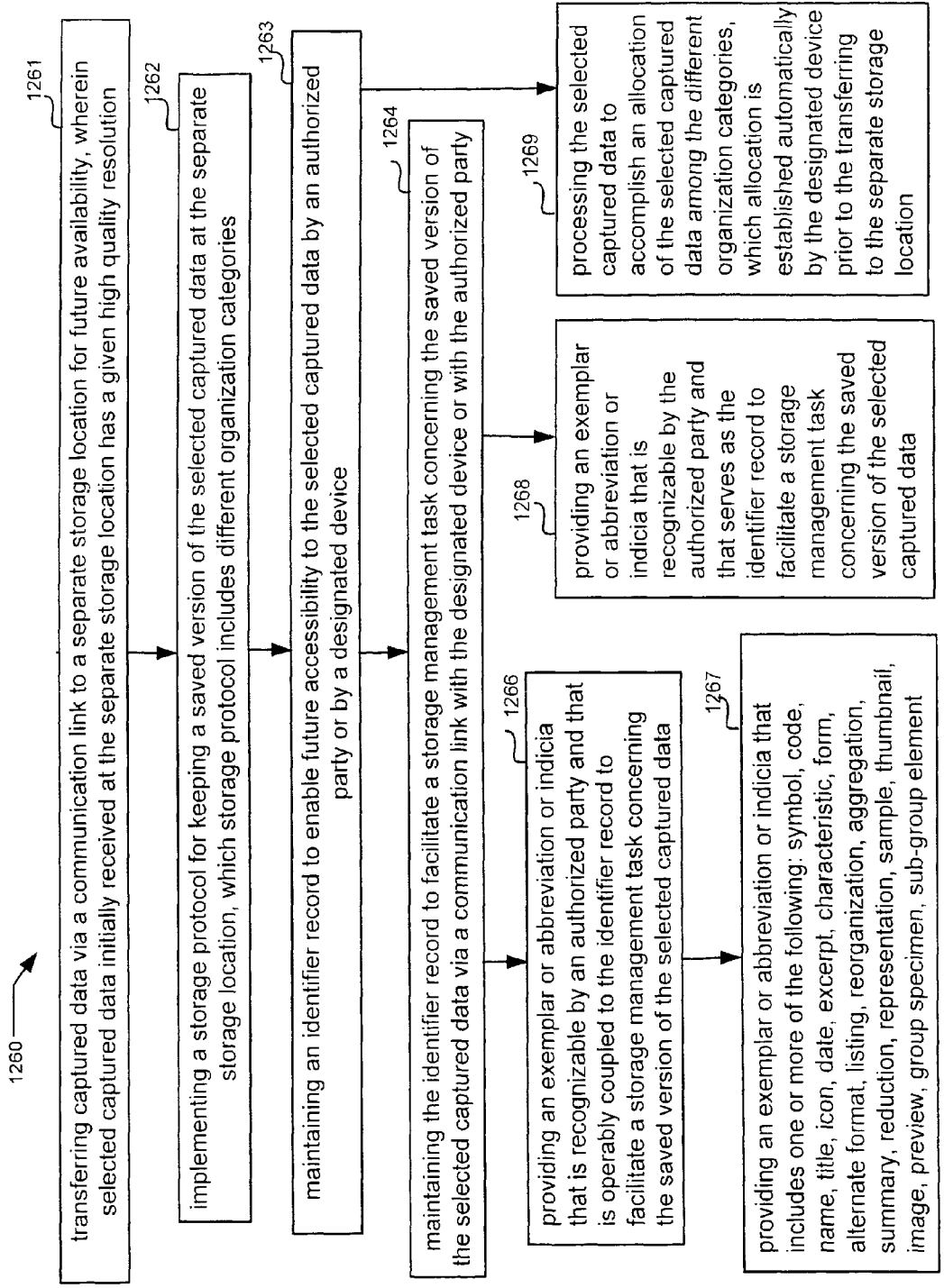

Referring to FIG. 35, additional detailed embodiments 1260 may include transferring some or all of the captured data via a communication link to a separate storage location for future availability, wherein selected captured data initially received at the separate storage location has a given high quality resolution (block 1261). Other possible process features may include implementing a storage protocol for keeping a saved version of the selected captured data at the separate storage location, which storage protocol includes different organization categories (block 1262). A further aspect may include maintaining an identifier record to enable future accessibility to the selected captured data by an authorized party or by a designated device (block 1263).

Some implementations may further provide for maintaining the identifier record to facilitate a storage management task concerning the saved version of the selected captured data via a communication link with the designated device or with an authorized party (block 1264). Further aspects may include providing an exemplar or abbreviation or indicia that is recognizable by the authorized party and that is operably coupled to the identifier record to facilitate a storage management task concerning the saved version of the selected captured data (block 1266).

Another possible feature disclosed in FIG. 35 may provide an exemplar or abbreviation or indicia including one or more of the following: symbol, code, name, title, icon, date, excerpt, characteristic, form, alternate format, listing, reorganization, aggregation, summary, reduction, representation, sample, thumbnail, image, preview, group specimen, and sub-group element (block 1267). Further aspects may include providing an exemplar or abbreviation or indicia that is recognizable by the authorized party and that serves as the identifier record to facilitate a storage management task concerning the saved version of the selected captured data (block 1268).

Some implementations may include processing the selected captured data to accomplish an allocation of the selected captured data among the one or more storage organization categories, which allocation is established automatically by the device prior to the transferring to the separate storage location (block 1269).

Figure 36:
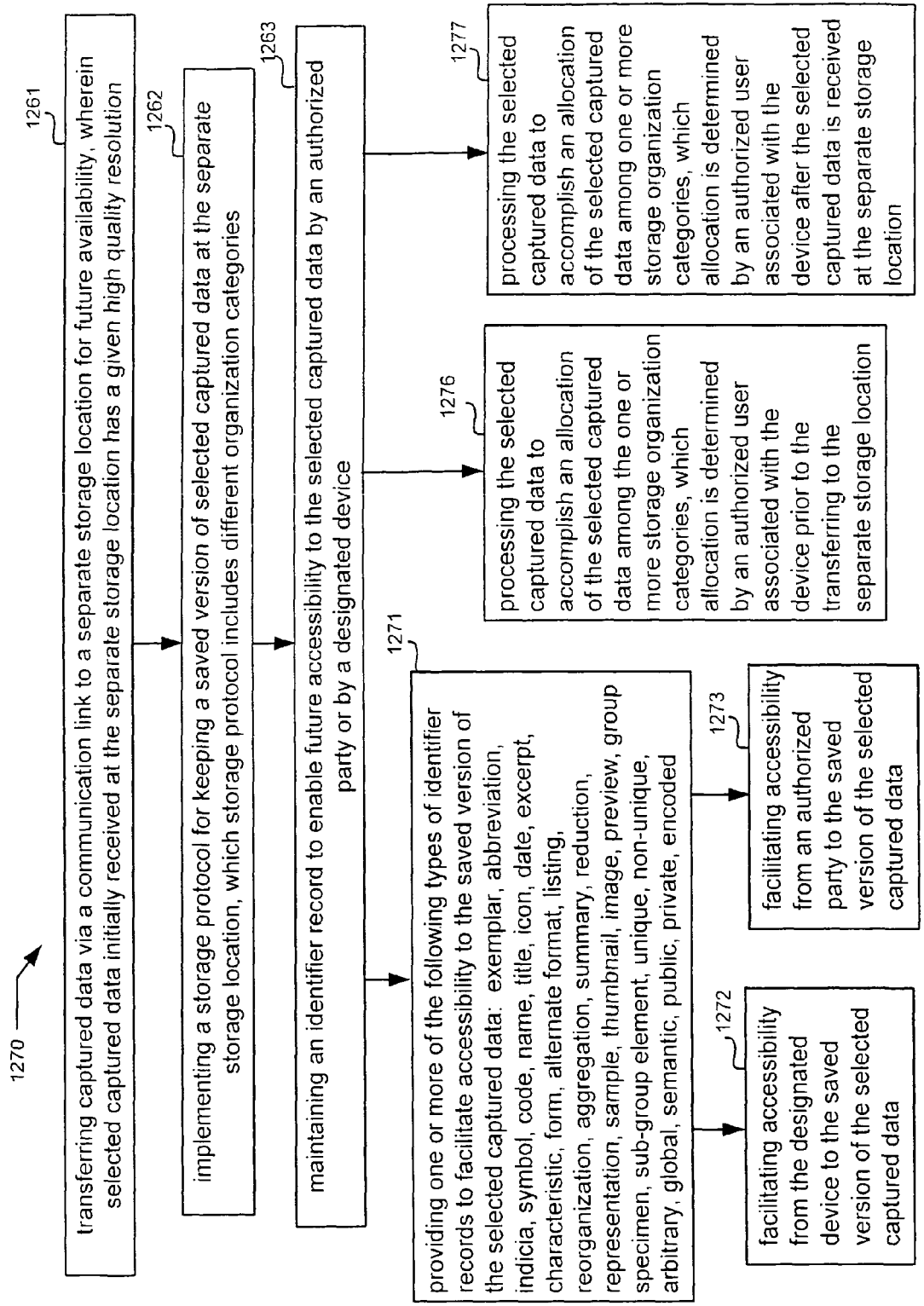

Referring to FIG. 36, various embodiments 1270 may include previously described process components 1261, 1262, 1263 in combination with possible aspects relating to the identifier record. For example, a possible aspect may include providing one or more of the following types of identifier records to facilitate accessibility to the saved version of the selected captured data: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1271). Such accessibility may be facilitated to the saved version of the selected captured data from the designated device (block 1272), and also may be facilitated from an authorized party (block 1273).

As further illustrated in FIG. 36, additional implementation features may include processing the selected captured data to accomplish an allocation of the selected captured data among the one or more storage organization categories, which allocation is determined by an authorized user associated with the device prior to the transferring to the separate storage location (block 1276). In some instances such allocation is determined by an authorized user associated with the device after the selected captured data is received at the separate storage location (block 1277).

Figure 37:
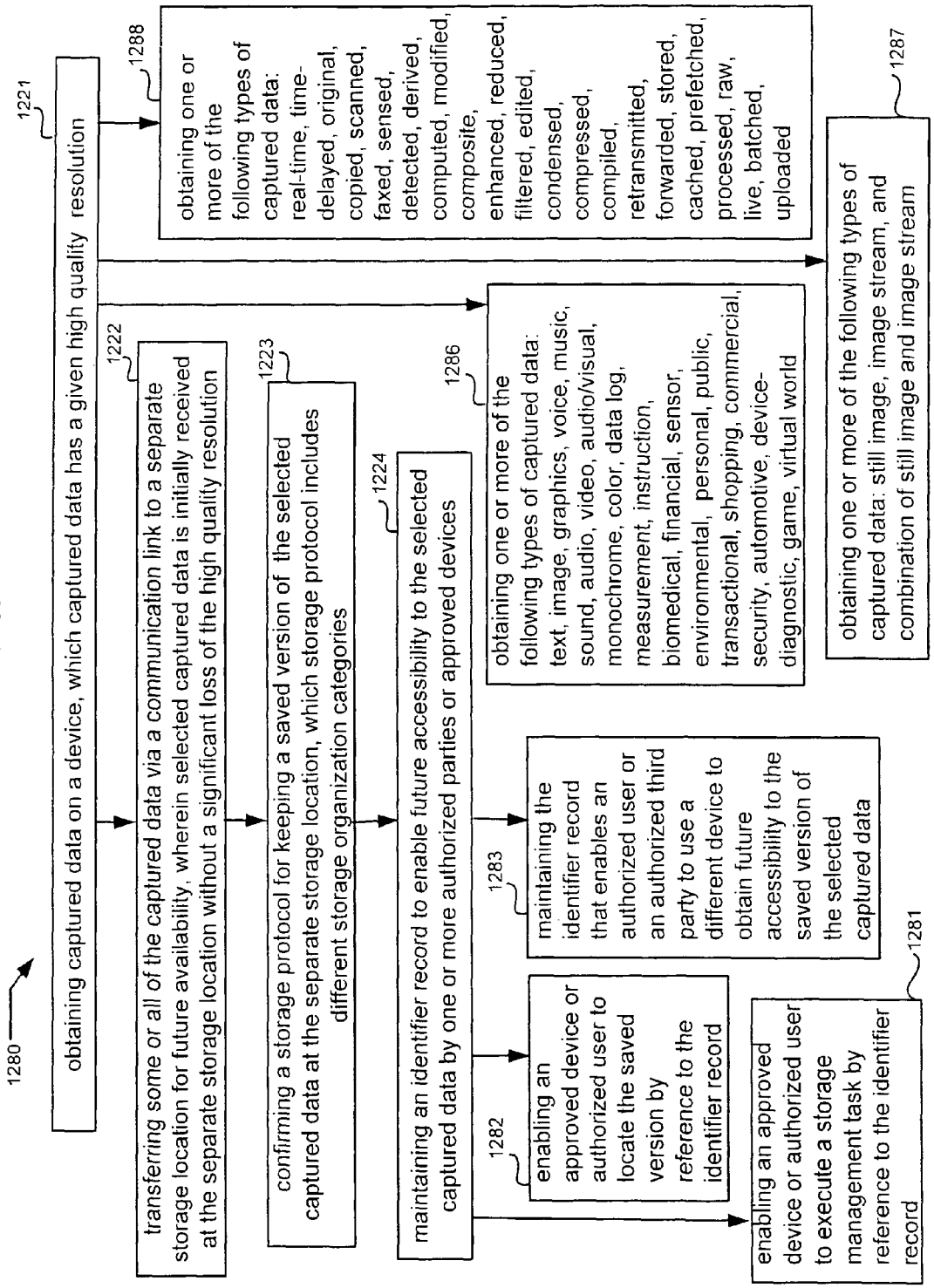

The exemplary embodiments 1280 disclosed in FIG. 37 include previously discussed process components 1221, 1222, 1223, 1224 as well as various features related to the identifier record. For example, a possible aspect may include enabling an approved device or authorized user to locate the saved version by reference to the identifier record (block 1282). Another possible aspect may include enabling an approved device or authorized user to execute a storage management task by reference to the identifier record (block 1281).

Other possible features may include maintaining the identifier record that enables an authorized user or an authorized third party to use a different device to obtain future accessibility to the saved version of the selected captured data (block 1283).

Additional implementations may include obtaining one or more of the following types of captured data: text, image, graphics, voice, music, sound, audio, video, audio/visual, monochrome, color, data log, measurement, instruction, biomedical, financial, sensor environmental, personal, public, transactional, shopping, commercial, security, automotive, device-diagnostic, game, and virtual world (block 1286). Another possible aspect may include obtaining one or more of the following types of captured data: still image, image stream, and combination of still image and image stream (block 1287).

Further illustrated aspects may include obtaining one or more of the following types of captured data: real-time, time-delayed, original, copied, scanned, faxed, sensed, detected, derived, computed, modified, composite, enhanced, reduced, filtered, edited, condensed, compressed, compiled, retransmitted, forwarded, stored, cached, prefetched, processed, raw, live, batched, and uploaded (block 1288).

Figure 38:
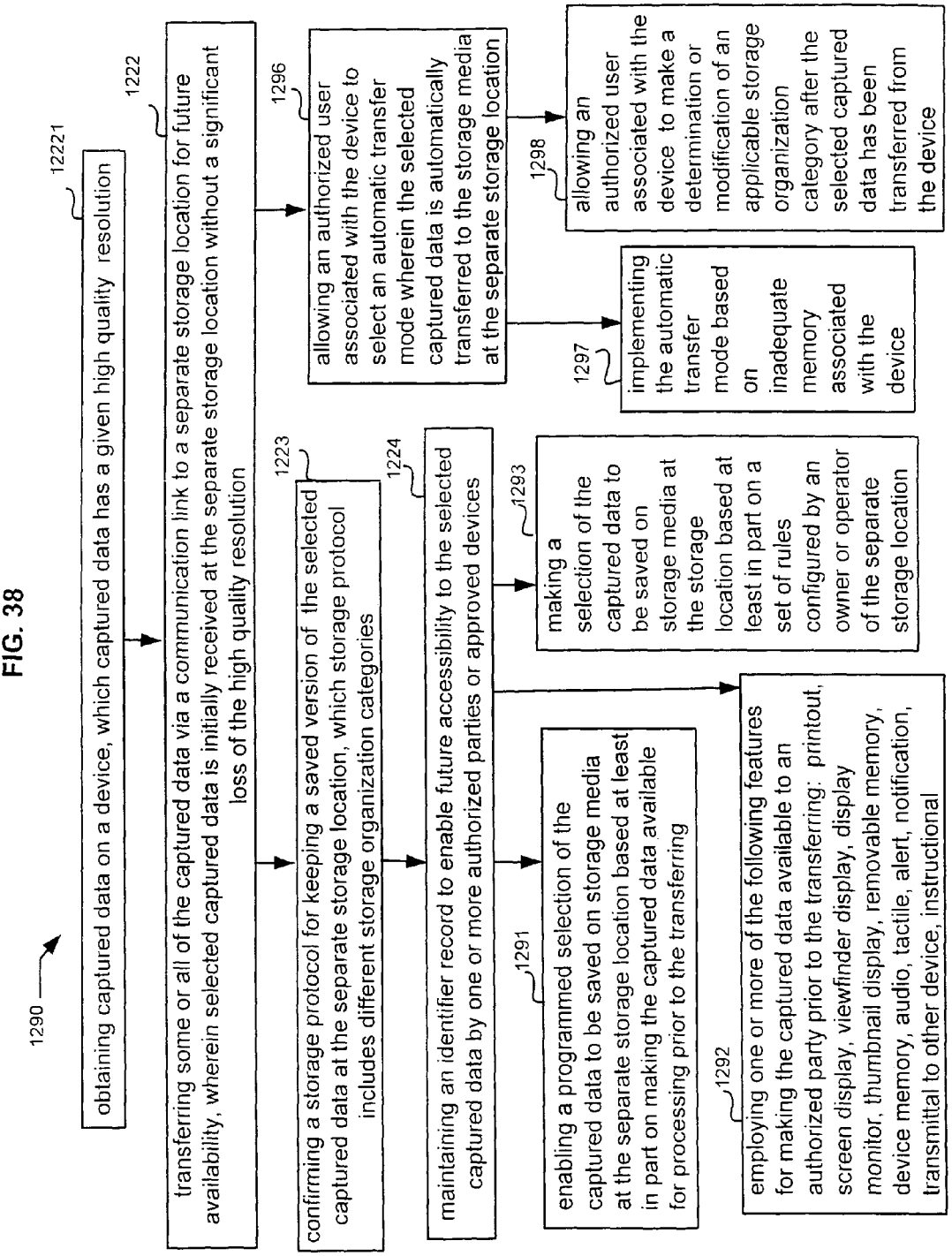

The detailed flow chart of FIG. 38 shows exemplary embodiments 1290 that include previously discussed process components 1221, 1222, 1223, 1224 in combination with other possible aspects. For example, some implementations may include enabling a programmed selection of the captured data to be saved on storage media at the separate storage location based at least in part on making the captured data available for processing prior to the transferring (block 1291). A further aspect may include employing one or more of the following features for making the captured data available to an authorized party prior to the transferring: printout, screen display, viewfinder display, display monitor, thumbnail display, removable memory, device memory, audio, tactile, alert, notification, transmittal to other device, and instructional (block 1292).

Further possible features may include making a selection of the captured data to be saved on storage media at the storage location based at least in part on a set of rules configured by an owner or operator of the separate storage location (block 1293).

Other illustrated process components shown in FIG. 38 include may include allowing an authorized user associated with the device to select an automatic transfer mode wherein the selected captured data is automatically transferred to the storage media at the separate storage location (block 1296), and implementing the automatic transfer mode based on inadequate memory associated with the device (block 1297).

A further possible aspect may include allowing an authorized user associated with the device to make a determination or modification of an applicable storage organization category after the selected captured data has been transferred from the device (block 1298).

Figure 39:
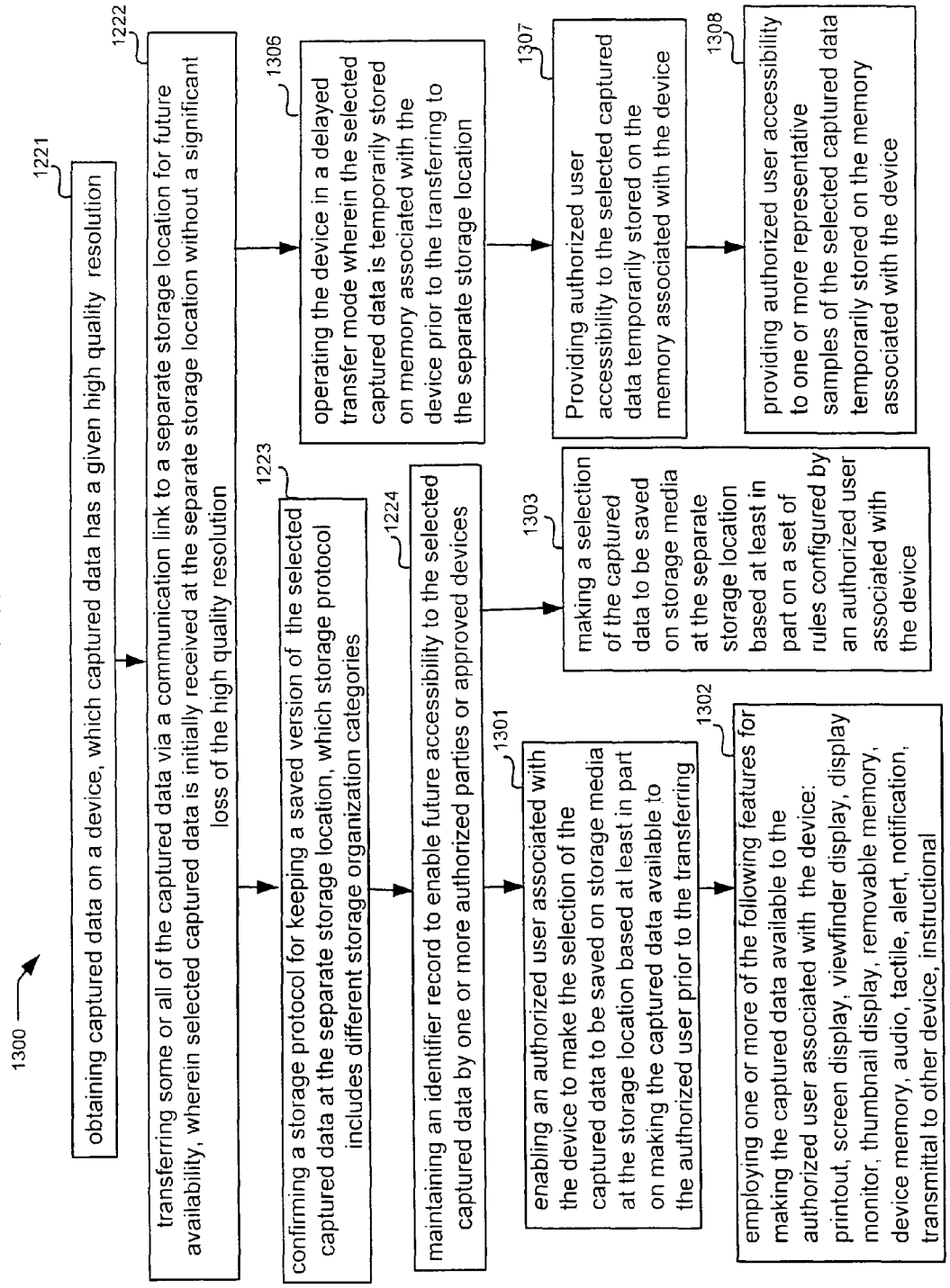

Referring to the various embodiments 1300 of FIG. 39, previously discussed process features 1221, 1222, 1223, 1224 are combined with further possible aspects relating to the identifier record. For example, some implementations may include enabling an authorized user associated with the device to make the selection of the captured data to be saved on storage media at the storage location based at least in part on making the captured data available to the authorized user associated with the device prior to the transferring (block 1301).

A further related aspect may include employing one or more of the following features for making the captured data available to an authorized user associated with the device: printout, screen display, viewfinder display, display monitor, thumbnail display, removable memory, device memory, audio, tactile, alert, notification, transmittal to other device, and instructional (block 1302).

Another possible feature may include making a selection of the captured data to be saved on storage media at the separate storage location based at least in part on a set of rules configured by an authorized user associated with the device (block 1303).

FIG. 39 illustrates additional possible aspects including operating the device in a delayed transfer mode wherein the selected captured data is temporarily stored on memory associated with the device prior to the transferring to the separate storage location (block 1306), and providing authorized user accessibility to the selected captured data temporarily stored on the memory associated with the device (block 1307). Another related aspect may include providing authorized user accessibility to one or more representative samples of the selected captured data temporarily stored on the memory associated with the device (block 1308).

Figure 40:
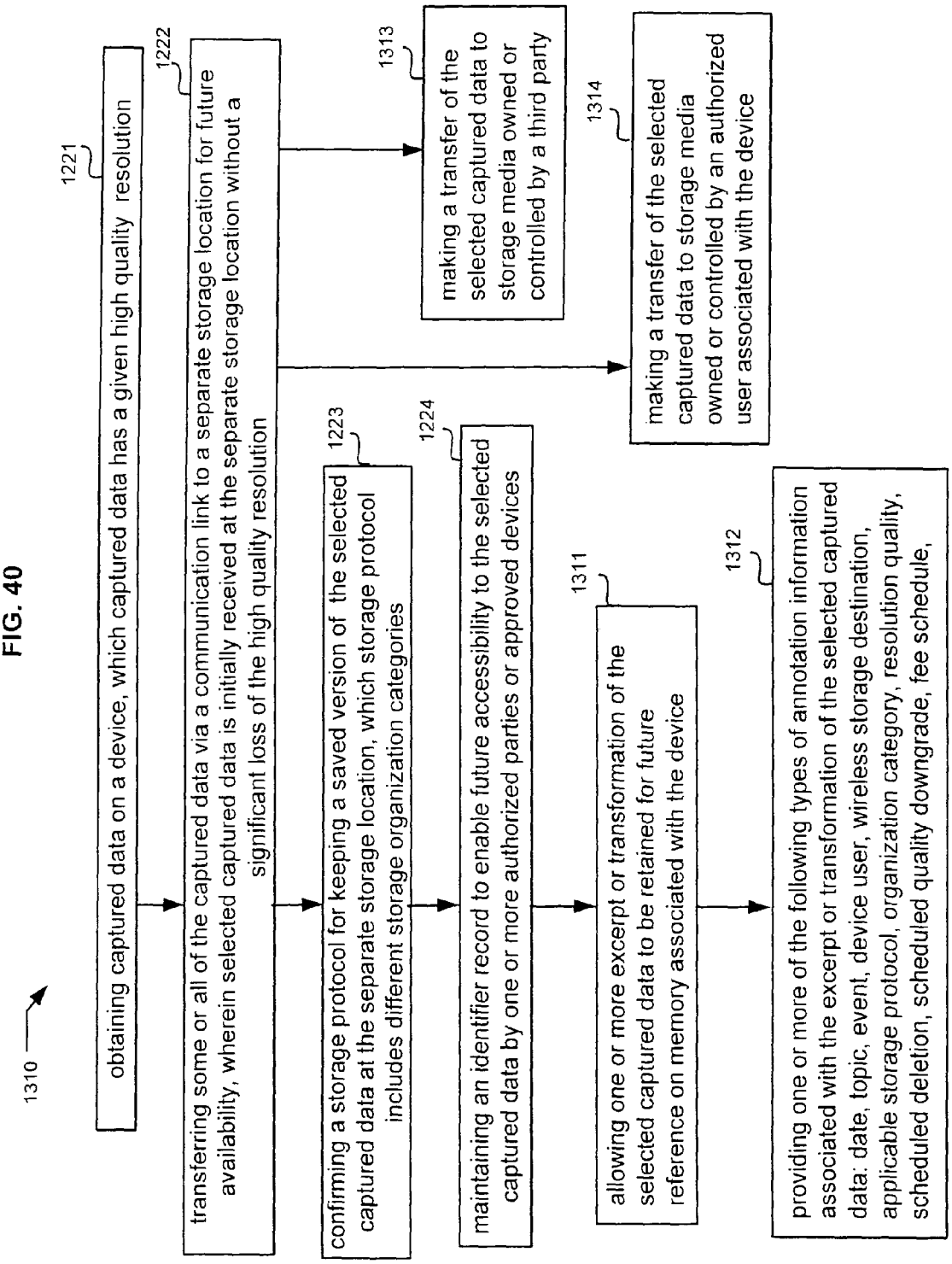

The flow chart of FIG. 40 shows exemplary embodiments 1310 that include previously described process components 1221, 1222, 1293, 1224 in combination with other possible aspects including allowing one or more excerpt or transformation of the selected captured data to be retained for future reference on memory associated with the device (block 1311). A further related aspect may include providing one or more of the following types of annotation information associated with the excerpt or transformation of the selected captured data: date, topic, event, device user, wireless storage destination, applicable storage protocol, organization category, resolution quality, scheduled deletion, scheduled quality downgrade, and fee schedule (block 1312).

Additional implementations may include making a transfer of the selected captured data to storage media owned or controlled by an authorized user associated with the device (block 1314), and making a transfer of the selected captured data to a storage media owned or controlled by a third party (block 1313).

Figure 41:
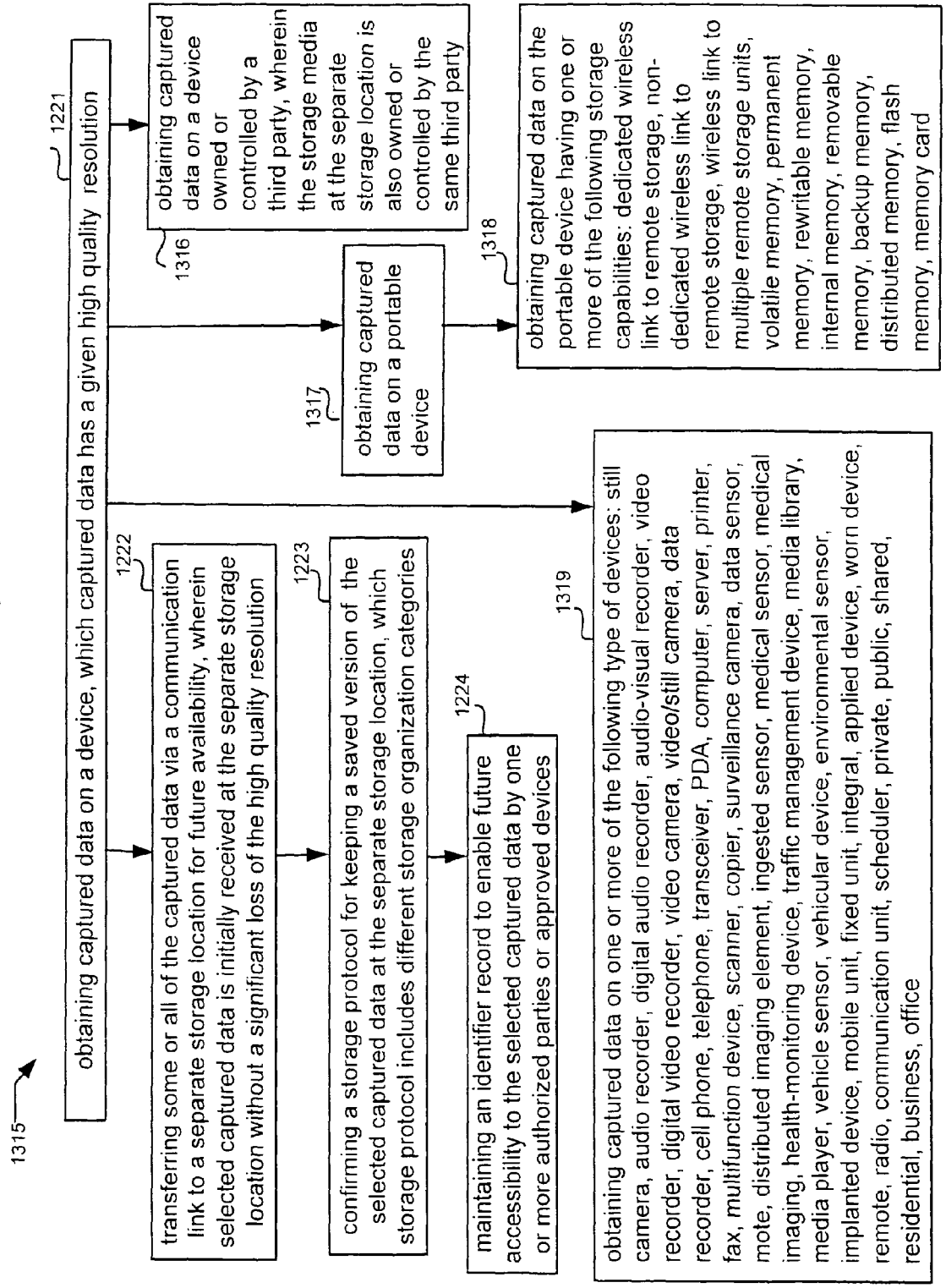

Referring to the exemplary embodiments 1315 of FIG. 41, previously discussed process features 1221, 1222, 1223, 1224 may be implemented with possible aspects that include obtaining captured data on one or more of the following type of devices: still camera, audio recorder, digital audio recorder, audio-visual recorder, video recorder, digital video recorder, video camera, video/still camera, data recorder, telephone, cell phone, transceiver, PDA, computer, server, printer, fax, multi-function device, scanner, copier, surveillance camera, data sensor, mote, distributed imaging element, ingested sensor, medical sensor, medical imaging, health-monitoring device, traffic management device, media library, media player, vehicle sensor, vehicular device, environmental sensor, implanted device, mobile unit, fixed unit, integral, applied device, worn device, remote, radio, communication unit, scheduler, private, public, shared, residential, business, and office (block 1319).

Additional possible features may include obtaining captured data on a portable device (block 1317), and obtaining captured data on the portable device having one or more of the following storage capabilities: dedicated wireless link to remote storage, non-dedicated wireless link to remote storage, wireless link to multiple remote storage units, volatile memory, permanent memory, rewritable memory, internal memory, removable memory, backup memory, distributed memory, flash memory, and memory card (block 1311).

Further aspects may include obtaining captured data on a device owned or controlled by a third party, wherein the storage media at the storage location is also owned or controlled by the same third party (block 1316).

Figure 42:
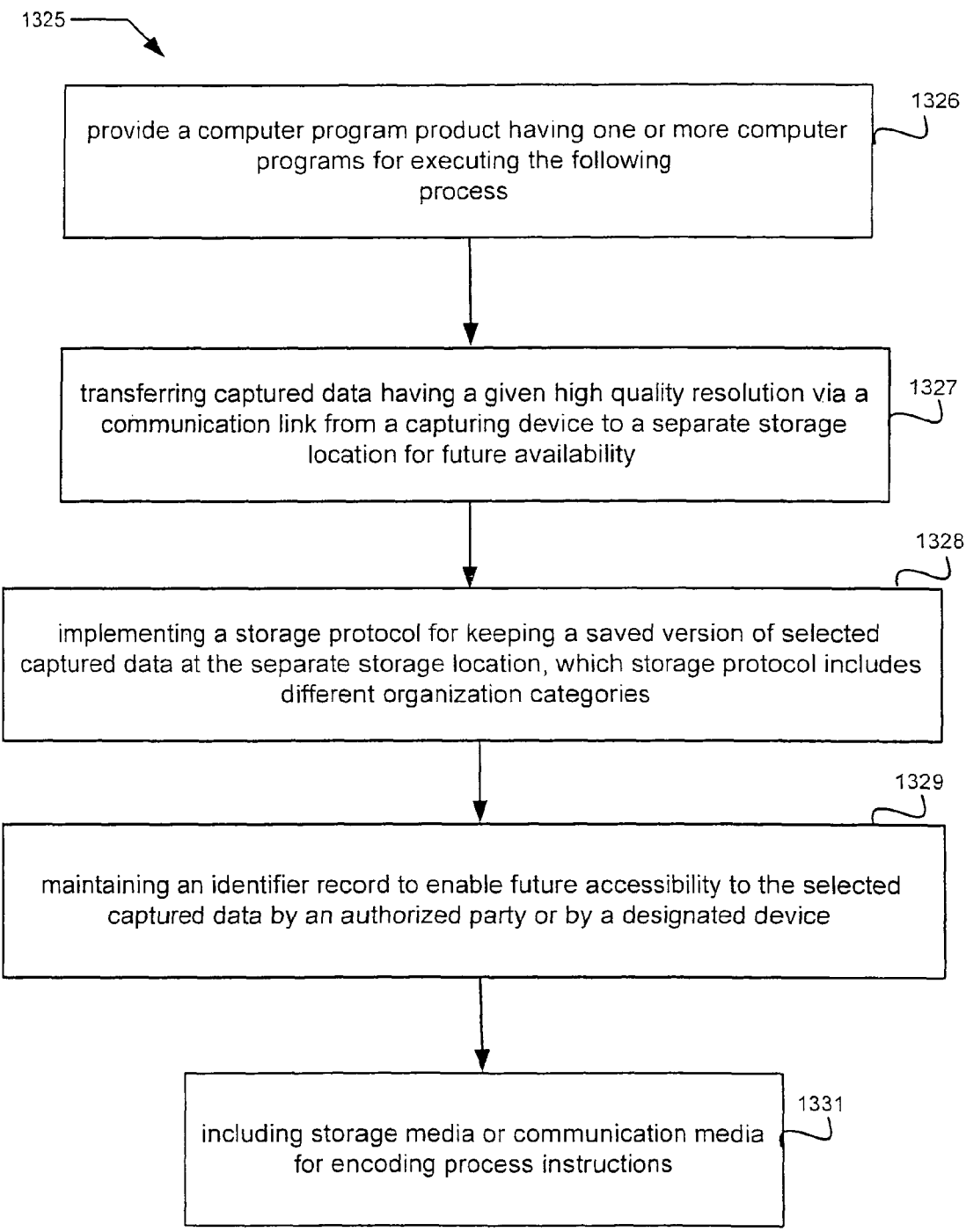
FIG. 42 illustrates an exemplary computer program product embodiment.

The high level flow chart of FIG. 42 shows an exemplary embodiment 1325 for a computer program product having one or more computer programs for executing a process (block 1326). An exemplary process may include transferring captured data having a given high quality resolution via a communication link from a capturing device to a separate storage location for future availability (block 1327).

Additional process features may include implementing a storage protocol for keeping a saved version of selected captured data at the separate storage location, which storage protocol includes different organization categories (block 1328). A further process feature may include maintaining an identifier record to enable future accessibility to the selected captured data by an authorized party or by a designated device (block 1329). The exemplary computer program product may include storage media or communication media for encoding the process instructions (block 1331).

Figure 43:
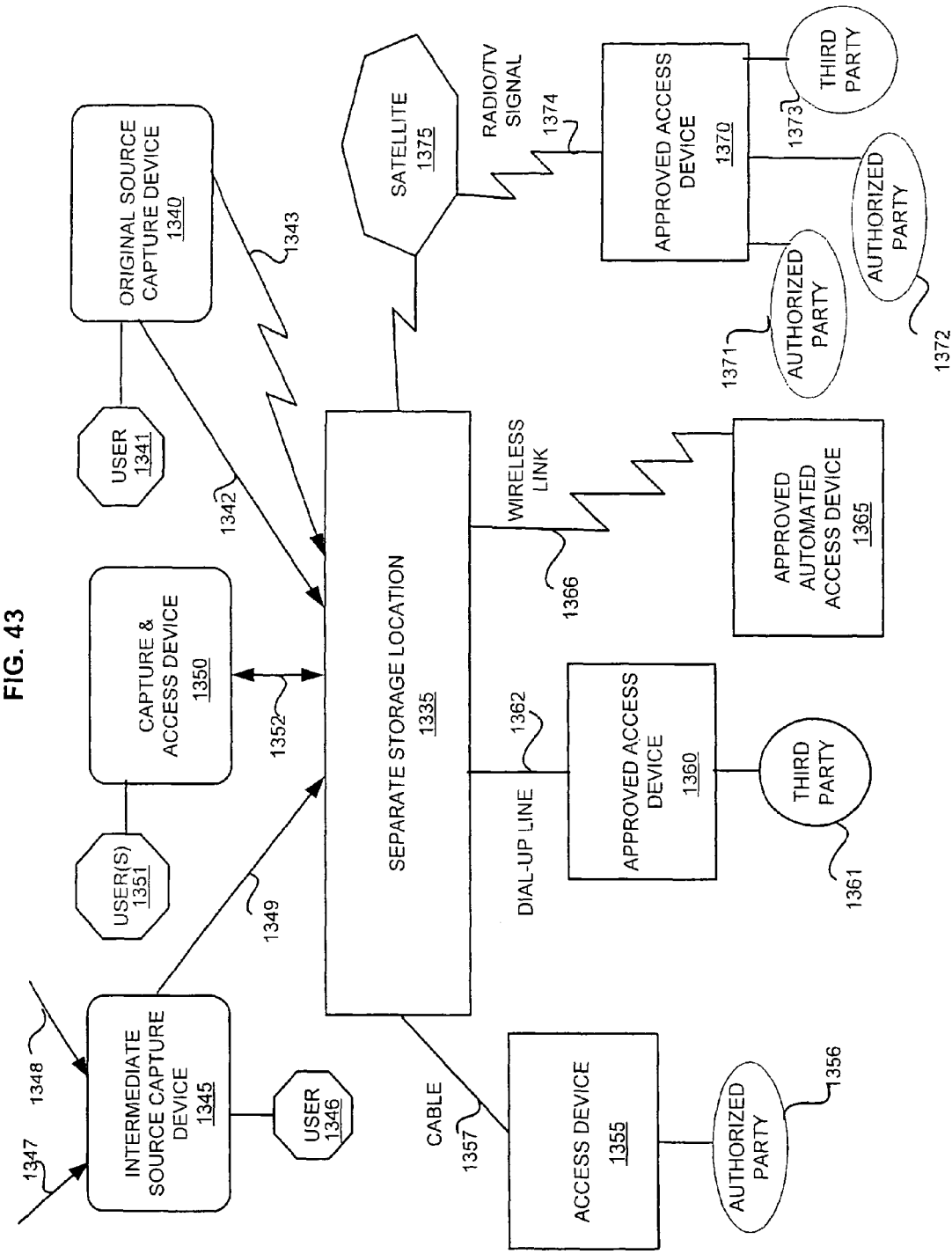
FIG. 43 is a schematic block diagram showing exemplary data storage communication embodiments.

The schematic block diagram of FIG. 43 illustrates various features of exemplary embodiments including separate storage location 1335, original source capture device 1340, intermediate source capture device 1345, and capture & access device 1350. A system implementation may include various combinations of features shown in FIG. 43. For example, original source capture device 1340 associated with user 1341 may have capability for transferring selected captured data via communication link 1342 to separate storage location 1335. A wireless communication link 1343 may also be used for such transfer to separate storage location 1335.

The intermediate source capture device 1345 associated with user 1346 is shown receiving data inputs 1347, 1348 and may have capability for transferring selected captured data via communication link 1349 to separate storage location 1335. The hybrid capture/access device 1350 associated with one or more users 1351 may have capability for both transferring selected captured data to separate storage location 1335 as well as accessing saved versions of the selected captured data available at the separate storage location (see bidirectional communication link 1352).

In some instances a designated device may be approved for implementing a transfer and/or access to the separate storage location 1335. In other instances an authorized party (e.g., user associated with the capture device or with access device, authorized third party, etc.) may be authorized for implementing a transfer and/or access from many types of designated devices to the separate storage location 1335.

The schematic diagram of FIG. 43 shows exemplary system embodiment components that may include access device 1355, approved access device 1360, approved automated access device 1365, and approved access device 1370.

Possible aspects may include an authorized party 1356 associated with access device 1355 having a communication link 1357 via cable to separate storage location 1335. Another possible aspect may include a third party 1361 associated with approved access device 1360 having a communication link 1362 via dial-up line to separate storage location 1335. A further possible aspect may include the approved automated access device 1365 having a wireless communication link 1366 to separate storage location 1335.

Another possible aspect may include multiple entities such as authorized party 1371, authorized party 1372, and third party 1373 associated with approved access device 1370 having a communication link 1374 (e.g., radio signal, television signal, etc.) via satellite 1375 to separate storage location 1335.

Figure 44:
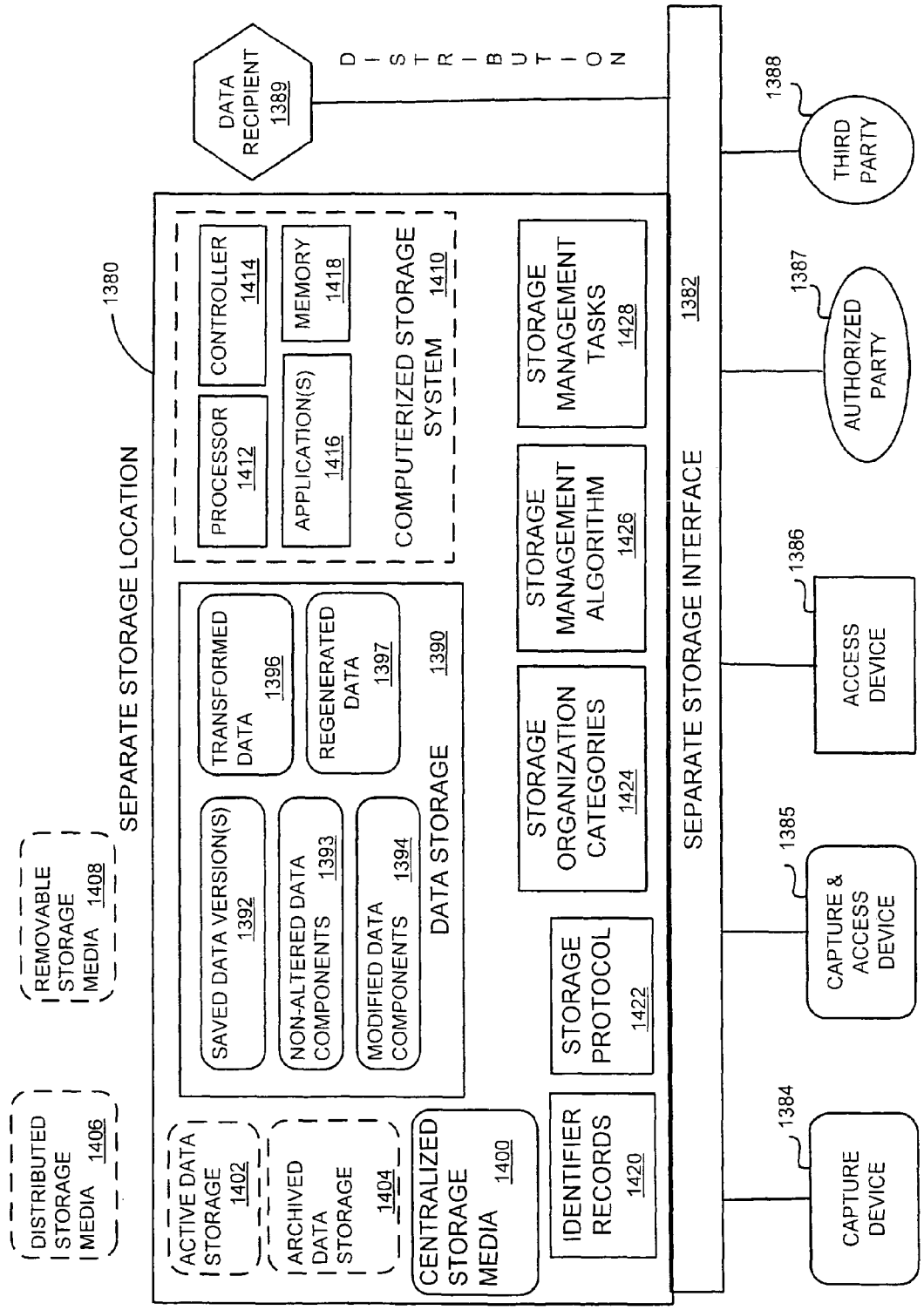
FIG. 44 schematically illustrates other possible features incorporated in an exemplary separate storage location.

Referring to the schematic block diagram of FIG. 44, various exemplary embodiment features related to separate storage location 1380 may include a separate storage interface 1382 that has possible communication links with capture device 1384, capture & access device 1385, access device 1386, authorized party 1387 and third party 1388. In some implementations a data recipient 1389 may be connected via a distribution link to the separate storage interface 1382.

An exemplary data storage module 1390 may include one or more saved data versions 1392, non-altered data components 1393, modified data components 1394, transformed data 1396 and regenerated data 1397. An illustrated possible feature may include centralized storage media 1400, and in some instances active data storage files 1402 and archived data storage files 1404. Further aspects in some implementations may include distributed storage media 1406 and removable storage media 1408.

Processing of data may be accomplished by an exemplary computerized storage system 1410 incorporated as an integral part of the separate storage location 1380 or remotely linked to the separate storage location 1380. The computerized storage system 1410 may include processor 1412, controller 1414, one or more applications 1416, and memory 1418.

Additional types of storage-related modules may include identifier records 1420, storage protocol 1422, storage organization categories 1424, storage management algorithm 1426, and storage management tasks 1428.

Referring to the schematic block diagram of FIG. 45, exemplary embodiment features incorporated in a capture device 1430 include user interface 1432 for authorized users 1434, 1436 as well as for authorized party 1438. In some instances such user interface 1432 may also be available to an owner or operator of a separate storage location 1440 that is linked (see 1446) to the capture device 1430.

Other communication links to the capture device 1430 may include an input channel for original captured data 1442, and another input channel for transmitted captured data 1444.

It will be understood that various functional aspects may be incorporated with the capture device and/or with the separate storage location. Accordingly the illustrated embodiment features of FIG. 45 may include previously described identifier records 1420, storage protocol 1422, storage organization categories 1424, storage management algorithm 1426, and storage management tasks 1428.

A computer apparatus 1450 incorporated in the capture device 1430, or in some instances remotely linked to the capture device 1430, may include processor 1452, controller 1454, one or more applications 1456, and memory 1458. Additional aspects operably coupled with the capture device 1430 may include integrated storage media 1460, temporary storage 1466, distributed storage media 1462, and removable storage media 1464.

Further types of data storage files may include actual captured data 1467, modified captured data 1468, one or more data exemplars 1472, one or more data samples 1474, and in some instances various transformed data excerpts 1476. Depending on the circumstances additional aspects may include data selection rules 1478, and a data selection program 1479 to process the captured data and facilitate a determination of which captured data will be immediately or ultimately transferred to the separate storage location.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments disclosed herein including FIGS. 1-4C and FIG. 10 and FIGS. 20A-23 and FIG. 30 and FIGS. 43-45 along with other components, devices, know-how, skill and techniques that are known in the art have the capability of implementing and practicing the methods and processes shown in FIGS. 5-9 and FIGS. 11-19 and FIGS. 24-29 and FIGS. 31-42. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

It will be understood that variations may be incorporated in the methods, systems and program products disclosed herein for determining what data to transfer to the separate storage location, and what data to be retained by the capture device. Some predetermined guidelines or real-time decisions may be employed to determine how and whether to organize and reorganize the transferred data as well as how and whether to organize and reorganize the retained data. Possible factors may include rule guidelines, user input, context at the capture (e.g., transferring) device and/or at the separate storage location. Other types of factors may include space, bandwidth, device capabilities, accessibility of remote storage, cost task, preferences, etc.

It will be further understood that a possible return transfer (e.g., retrieval, etc.) from the separate storage location back to the capture device or other designated device (e.g., another device being used by an authorized user or other authorized third party) may depend on various factors such as freed-up or added device storage, bandwidth opportunities, tasks, context, etc.

Various computer program product embodiments and process components may include allowing accessibility to the selected captured data by an authorized party, as well as accessibility to the selected captured data by a designated device. Other possible features may include storage media or communication media for encoding process instructions.

It will be understood from the illustrative examples herein that a technique as disclosed herein processes captured data on a device, wherein selected captured data of a given quality resolution is transferred via a communication link to a separate storage location for future availability. A storage protocol may include different storage organization categories. A possible aspect includes an identifier record to enable future accessibility to selected captured data by one or more authorized parties or approved devices.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

As a further definition of "open" terms in the present specification and claims, it will be understood that usage of a language construction "A or B" is generally interpreted as a non-exclusive "open term" meaning: A alone, B alone, A and B together.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for data management comprising:
   obtaining captured data on a device;
   transferring some or all of the captured data via a communication link to a separate storage location for future availability, including at least:
     determining that some or all of the captured data has a quality parameter value that exceeds a display capability of the device;
     transferring the some or all of the captured data to a separate storage location when the quality parameter value for the some or all of the captured data exceeds the display capability of the device; and
     maintaining the quality parameter value for the some or all of the captured data that exceeds the display capability of the device during the transferring to the separate storage location;
   maintaining an identifier record to enable future accessibility to selected captured data; and
   facilitating a storage management task concerning a saved version of the selected captured data by one or more authorized parties or one or more approved devices.

2. The method of claim 1 wherein said maintaining the identifier record includes:
   providing the identifier record generated by the device.

3. The method of claim 1 wherein said maintaining the identifier record includes:
   providing the identifier record generated at the separate storage location.

4. The method of claim 1 further comprising:
   providing storage location accessibility via a communication link with an approved device.

5. The method of claim 1 further comprising:
   providing accessibility to the saved version of the selected captured data via a communication link with an authorized owner or operator of the separate storage location.

6. The method of claim 1 further comprising:
   providing restricted accessibility to the saved version of the selected captured data based on a fee schedule.

7. The method of claim 6 wherein said providing restricted accessibility includes:
providing a fee schedule that includes a fee allocation paid to an entity responsible for the separate storage location.

8. The method of claim 1 wherein said facilitating the management task includes:
providing restricted accessibility to the saved version of the selected captured data to facilitate the storage management task by an authorized third party.

9. The method of claim 1 wherein said facilitating the storage management task includes:
facilitating the storage management task that allows usage or retrieval or distribution or replication or modification or reorganization of the saved version of the selected captured data.

10. The method of claim 9 wherein said providing the storage protocol includes:
providing for further retention of the saved version of the selected captured data by the separate storage location subsequent to executing the storage management task.

11. The method of claim 9 further comprising:
providing a fee schedule that includes a fee allocation paid by or on behalf of an authorized user or an authorized third party.

12. The method of claim 1 further comprising:
approving a storage format for the saved version of the selected captured data based on accessibility to regenerated or transformed data components.

13. The method of claim 1 wherein said maintaining the identifier record includes:
maintaining the identifier record to facilitate the storage management task concerning the saved version of the selected captured data via a communication link with the device.

14. The method of claim 1 further comprising:
providing an exemplar or abbreviation or indicia that is recognizable by the authorized party and that is operably coupled to the identifier record to facilitate the storage management task concerning the saved version of the selected captured data.

15. The method of claim 14 wherein said providing the exemplar or abbreviation or indicia includes providing one or more of the following: symbol, code, name, title, icon, date, excerpt, characteristic, form, alternate format, listing, reorganization, aggregation, summary, reduction, representation, sample, thumbnail,
image, preview, group specimen, and sub-group element.

16. The method of claim 1 further comprising:
providing an exemplar or abbreviation or indicia that is recognizable by the approved device and that serves as the identifier record to facilitate the storage management task concerning the saved version of the selected captured data.

17. The method of claim 1 wherein said maintaining the identifier record includes:
providing one or more of the following types of identifier records to facilitate accessibility from the approved device to the saved version of the selected captured data:
exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded.

18. The method of claim 1 wherein said maintaining the identifier record includes:
providing one or more of the following types of identifier records to facilitate accessibility by the authorized user to the saved version of the selected captured data: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded.

19. The method of claim 1 further comprising:
enabling the approved device or the authorized party to locate the saved version and/or execute the storage management task concerning the saved version of the selected captured data by reference to the identifier record.

20. The method of claim 1 wherein said maintaining the identifier record includes:
maintaining the identifier record that enables an authorized user or an authorized third party to use a different device to obtain future accessibility to the saved version of the selected captured data.

21. The method of claim 1 further comprising:
providing one or more different storage organization categories based at least in part on a parameter established by a storage management algorithm.

22. The method of claim 21 further comprising:
establishing the storage management algorithm based at least in part on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, or user history.

23. The method of claim 21 further comprising:
establishing the storage management algorithm that retains in the device memory some captured data having the quality parameter value that is within an output capability range of the device.

24. The method of claim 21 further comprising:
establishing the storage management algorithm that transfers to the separate storage location some captured data having the quality parameter value that exceeds an output capability of the device.

25. The method of claim 1 wherein said maintaining the identifier record includes:
allowing one or more excerpt or transformation of the selected captured data to be retained for future reference on memory associated with the device.

26. The method of claim 25 further comprising:
providing one or more of the following types of annotation information associated with the excerpt or transformation of the selected captured data: date, topic, event, device user, wireless storage destination, applicable storage protocol, organization category, resolution quality, scheduled deletion, scheduled quality downgrade, and fee schedule.

27. The method of claim 1, wherein transferring some or all of the captured data via a communication link to a separate storage location for future availability, including at least transferring some or all of the captured data to a separate storage location when a quality parameter value for some or all of the captured data exceeds an output capability of the device comprises:
transferring some or all of the captured data via a communication link to a separate storage location for future availability, including at least transferring some or all of the captured data to the separate storage location when a captured quality parameter value exceeds an output capability of the device.

28. The method of claim 1, wherein transferring some or all of the captured data via a communication link to a separate storage location for future availability, including at least transferring some or all of the captured data to a separate storage location when a quality parameter value for some or all of the captured data exceeds an output capability of the device comprises:
transferring some or all of the captured data via a communication link to a separate storage location for future availability, including at least transferring some or all of the captured data to the separate storage location when a device quality value exceeds an output capability of the device.

29. The method of claim 1, wherein transferring some or all of the captured data via a communication link to a separate storage location for future availability, including at least transferring some or all of the captured data to a separate storage location when a quality parameter value for some or all of the captured data exceeds an output capability of the device comprises:
transferring at least some of the captured data to a storage location on the device when the quality parameter of the at least some of the captured data is within the output capability range of the device.

30. A system for captured data storage management comprising:
a capture device configured to capture data;
a communication link for transferring some or all of the captured data to a separate storage location for future availability, at least one of the capture device or the communication link being configured to:
determine that some or all of the captured data has a quality parameter value that exceeds a display capability of the device;
transfer to the separate storage location the some or all of the captured data when the quality parameter value for the some or all of the captured data exceeds the display capability of the capture device; and
maintain the quality parameter value for the some or all of the captured data that exceeds the display capability of the device during the transfer to the separate storage location; and
an identifier record to facilitate a storage management task concerning the selected captured data by one or more authorized parties or approved devices.

31. The system of claim 30 wherein said identifier record includes:
an identifier record maintained at the separate storage location, which identifier record includes one or more excerpt or transformation of the selected captured data retained for future reference.

32. The system of claim 31 wherein said identifier record maintained at the separate storage location includes:
one or more of the following types of annotation information associated with the excerpt or transformation of the selected captured data: date, topic, event, device user, wireless storage destination, applicable storage protocol, organization category, resolution quality, scheduled deletion, scheduled quality downgrade, and fee schedule.

33. The system of claim 30, wherein the capture device is further configured to:
display the some or all of the captured data at a reduced quality parameter value that does not exceed the display capability of the device.

34. The system of claim 30, wherein determine that some or all of the captured data has a quality parameter value that exceeds a display capability of the device comprises:
determine that some or all of the captured data has a quality parameter value that exceeds a display capability of at least one of a screen display, a viewfinder display, a display monitor, or a thumbnail display.

35. The system of claim 30, wherein determine that some or all of the captured data has a quality parameter value that exceeds a display capability of the device comprises:
determine that some or all of the captured data has a quality parameter value that exceeds a display capability of the device, the quality parameter value including at least one of a resolution, a resolution quality, or a pixel-related value.

36. A computer program product comprising:
a non-transitory signal bearing medium including at least:
one or more instructions for obtaining captured data on a device;
one or more instructions for transferring some or all of the captured data via a communication link to a separate storage location for future availability, including at least:
one or more instructions for determining that some or all of the captured data has a quality parameter value that exceeds a display capability of the device;
one or more instructions for transferring to the separate storage location the some or all of the captured data when the quality parameter value for the some or all of the captured data exceeds the display capability of the device; and
one or more instructions for maintaining the quality parameter value for the some or all of the captured data that exceeds the display capability of the device during the transferring to the separate storage location; and
one or more instructions for implementing a storage protocol for keeping a saved version of the selected captured data at the separate storage location, which the storage protocol includes at least different organization categories.

37. The computer program product of claim 36 further including:
one or more instructions for allowing accessibility to the selected captured data by an authorized party.

38. The computer program product of claim 36 further including:
one or more instructions for allowing accessibility to the selected captured data by a designated device.

39. The computer program product of claim 36 further including:
one or more instructions for facilitating a storage management task that allows usage or retrieval or distribution or replication or modification or reorganization of the saved version of the selected captured data.

40. The computer program product of claim 36 one or more instructions for implementing the storage protocol includes:
one or more instructions for providing for further retention of the saved version of the selected captured data by the separate storage location subsequent to executing a storage management task.

41. The computer program product of claim 36 one or more instructions for implementing the storage protocol includes:
one or more instructions for providing a storage format for the saved version of the selected captured data based on accessibility to regenerated or transformed data components.

42. The computer program product of claim 36 further comprising:
one or more instructions for maintaining an identifier record to facilitate a storage management task concerning the saved version of the selected captured data via a communication link with a capturing device.

43. The computer program product of claim 36 further includes:
one or more instructions for providing an exemplar or abbreviation or indicia that is recognizable and that is operably coupled to an identifier record to facilitate the storage management task concerning the selected captured data.

44. The computer program product of claim 43 one or more instructions for providing the exemplar or abbreviation or indicia includes:
one or more instructions for providing one or more of the following: symbol, code, name, title, icon, date, excerpt, characteristic, form, alternate format, listing, reorganization, aggregation, summary, reduction, representation, sample, thumbnail, image, preview, group specimen, and sub-group element.

45. The computer program product of claim 36 further includes:
one or more instructions for processing the selected captured data to accomplish an allocation of the selected captured data among the one or more storage organization categories, which allocation is established prior to the transferring to the separate storage location.

46. The computer program product of claim 36 further includes:
one or more instructions for enabling an approved device to locate the saved version and/or execute the storage management task concerning the saved version of the selected captured data by reference to an identifier record.

47. The computer program product of claim 36 further includes:
one or more instructions for enabling an authorized party to locate the saved version and/or execute the storage management task concerning the saved version of the selected captured data by reference to an identifier record.

48. The computer program product of claim 36 further comprising:
one or more instructions for maintaining an identifier record that enables an authorized user or an authorized third party to use a different device to obtain future accessibility to the saved version of the selected captured data.

49. The computer program product of claim 36 further includes:
one or more instructions for employing one or more of the following features to make the captured data available to an authorized user associated with the capturing device prior to the transferring: printout, screen display, viewfinder display, display monitor, thumbnail display, removable memory, device memory, audio, tactile, alert, notification, transmittal to other device, and instructional.

50. The computer program product of claim 36 one or more instructions for implementing the storage protocol includes:
one or more instructions for providing the different storage organization categories based at least in part on a parameter established by a storage management algorithm.

51. The computer program product of claim 50 further includes:
one or more instructions for establishing the storage management algorithm based at least in part on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, or user history.

52. The computer program product of claim 36, further comprising one or more instructions for maintaining an identifier record to enable restricted accessibility to facilitate a management task concerning the selected captured data pursuant to the storage protocol.

53. The computer program product of claim 52 further including:
one or more instructions for providing one or more of the following types of annotation information associated with the excerpt or transformation of the selected captured data: date, topic, event, device user, wireless storage destination, applicable storage protocol, organization category, resolution quality, scheduled deletion, scheduled quality downgrade, or fee schedule.

54. The computer program product of claim 52 wherein said identifier record includes:
an identifier record that is at least one of (i) maintained at the capture device to facilitate the storage management task that allows usage or retrieval or distribution or replication or modification or reorganization of the saved version of the selected captured data, (ii) maintained at the separate storage location to facilitate the storage management task that allows usage or retrieval or distribution or replication or modification or reorganization of the saved version of the selected captured data, (iii) an exemplar or abbreviation or indicia that is recognizable to facilitate the storage management task concerning the saved version of the selected captured data, or (iv) one or more excerpts or transformations of the selected captured data retained for future reference on memory associated with the capture device.

55. The computer program product of claim 54 wherein said exemplar or abbreviation or indicia includes one or more of the following: symbol, code, name, title, icon, date, excerpt, characteristic, form, alternate format, listing, reorganization, aggregation, summary, reduction, representation, sample, thumbnail, image, preview, group specimen, and subgroup element.

\* \* \* \* \*